(12) United States Patent
Andrakin

(10) Patent No.: US 10,312,026 B2
(45) Date of Patent: Jun. 4, 2019

(54) HIGH ENERGY DENSITY CAPACITOR WITH HIGH ASPECT MICROMETER STRUCTURES AND A GIANT COLOSSAL DIELECTRIC MATERIAL

(71) Applicant: Smart Hybird Systems Incorporated, Burlingame, CA (US)

(72) Inventor: James W. Andrakin, Branscomb, CA (US)

(73) Assignee: Smart Hybird Systems Incorporated, Burlingame, CA (US)

(*) Notice: Subject to any disclaimer, the term of this patent is extended or adjusted under 35 U.S.C. 154(b) by 19 days.

(21) Appl. No.: 15/287,662

(22) Filed: Oct. 6, 2016

(65) Prior Publication Data

US 2017/0025225 A1 Jan. 26, 2017

Related U.S. Application Data

(63) Continuation-in-part of application No. 14/735,077, filed on Jun. 9, 2015, now Pat. No. 10,102,977.

(60) Provisional application No. 62/284,747, filed on Oct. 7, 2015.

(51) Int. Cl.
*H01G 4/224* (2006.01)
*H01G 4/38* (2006.01)
*H01G 4/30* (2006.01)
*H01G 4/12* (2006.01)
*H01G 4/232* (2006.01)
*H01G 2/10* (2006.01)
*H01G 2/08* (2006.01)

(52) U.S. Cl.
CPC ............. *H01G 4/385* (2013.01); *H01G 2/106* (2013.01); *H01G 4/1218* (2013.01); *H01G 4/224* (2013.01); *H01G 4/232* (2013.01); *H01G 4/30* (2013.01); *H01G 4/38* (2013.01); *H01G 2/08* (2013.01)

(58) Field of Classification Search
CPC .......... H01G 4/38; H01G 4/005; H01G 4/224; H01G 4/385; H01G 4/228; H01G 11/52; H01G 11/36; H01G 11/40; H01G 11/78
See application file for complete search history.

(56) References Cited

U.S. PATENT DOCUMENTS

| 3,183,419 A | 5/1965 | Rieth |
| 4,049,859 A | 9/1977 | Yoshikawa et al. |
| 5,834,357 A | 11/1998 | Kang |
| 5,843,822 A | 12/1998 | Hsia et al. |

(Continued)

FOREIGN PATENT DOCUMENTS

| EP | 0966747 A1 | 12/1999 |
| EP | 1692709 B1 | 5/2007 |

(Continued)

OTHER PUBLICATIONS

"Dielectric Properties of Colossal Permittivity Materials: An Update", by: Chafe Cheballah et al., Journal of Energy and Power Engineering 7, 2013, pp. 726-732.

(Continued)

*Primary Examiner* — Nguyen T Ha
(74) *Attorney, Agent, or Firm* — Haverstock & Owens LLP

(57) ABSTRACT

A high density energy storage system including a giant-colossal dielectric thin film material electrically insulating between two electrodes configured to have increased overlapping surface area.

27 Claims, 26 Drawing Sheets

(56) References Cited

U.S. PATENT DOCUMENTS

| | | | |
|---|---|---|---|
| 5,898,561 A | 4/1999 | Mandelcorn et al. | |
| 6,029,525 A | 2/2000 | Grudzien | |
| 6,063,140 A | 5/2000 | Price | |
| 6,184,324 B1 | 2/2001 | Benz et al. | |
| 6,426,861 B1 | 7/2002 | Munshi | |
| 6,476,437 B2 | 11/2002 | Liaw | |
| 6,661,638 B2 | 12/2003 | Jackson et al. | |
| 6,680,237 B2 | 1/2004 | Chen et al. | |
| 6,737,698 B1 | 5/2004 | Paul et al. | |
| 6,791,334 B2 | 9/2004 | Horie et al. | |
| 6,891,209 B2 | 5/2005 | Bulsara et al. | |
| 7,033,406 B2 | 4/2006 | Weir et al. | |
| 7,466,536 B1 | 12/2008 | Weir et al. | |
| 7,542,265 B2 | 6/2009 | Tan et al. | |
| 7,595,109 B2 | 9/2009 | Weir et al. | |
| 7,714,371 B2 | 5/2010 | Paul et al. | |
| 7,729,811 B1 | 6/2010 | Weir et al. | |
| 7,754,606 B2 | 7/2010 | Paul et al. | |
| 7,787,233 B1 | 8/2010 | Chen et al. | |
| 7,864,505 B1 | 1/2011 | O'Brien et al. | |
| 8,145,362 B2 | 3/2012 | Weir et al. | |
| 8,263,515 B2 | 9/2012 | Dogan | |
| 8,268,019 B2 | 9/2012 | Poltorak | |
| 8,269,566 B2 | 9/2012 | Upadhyaya et al. | |
| 8,390,987 B2 | 3/2013 | Haight et al. | |
| 8,493,708 B2 | 7/2013 | Lu | |
| 8,537,523 B1 | 9/2013 | Chen et al. | |
| 8,547,681 B2 | 10/2013 | Logan et al. | |
| 8,558,350 B2 | 10/2013 | Huang et al. | |
| 2002/0176989 A1 | 11/2002 | Knudsen | |
| 2005/0030699 A1 | 2/2005 | Paul et al. | |
| 2006/0134515 A1* | 6/2006 | Kumashiro | H01G 9/22 429/209 |
| 2008/0096363 A1 | 4/2008 | Govindarajan | |
| 2008/0117602 A1* | 5/2008 | Korich | H01G 2/08 361/715 |
| 2008/0128857 A1 | 6/2008 | Bi | |
| 2008/0287796 A1 | 11/2008 | Kiraly et al. | |
| 2009/0141423 A1 | 6/2009 | Lai | |
| 2010/0020467 A1* | 1/2010 | Yoon | H01G 4/224 361/305 |
| 2012/0087060 A1* | 4/2012 | Ra | H01G 9/155 361/502 |
| 2012/0115019 A1* | 5/2012 | Cho | H01G 9/10 429/163 |
| 2012/0211865 A1 | 8/2012 | Tian et al. | |
| 2012/0286393 A1 | 11/2012 | Lin et al. | |
| 2013/0001747 A1 | 1/2013 | Wang et al. | |
| 2013/0077205 A1* | 3/2013 | Yoon | H01G 9/008 361/434 |
| 2013/0113077 A1 | 5/2013 | Woo et al. | |
| 2013/0120901 A1 | 5/2013 | Masuda | |
| 2013/0120910 A1* | 5/2013 | Watanabe | H01G 9/155 361/517 |
| 2013/0136977 A1* | 5/2013 | Masuda | H01M 2/0202 429/179 |
| 2013/0164578 A1* | 6/2013 | Sweet | H01M 10/0413 429/82 |
| 2013/0164599 A1* | 6/2013 | Kim | H01M 2/1077 429/158 |
| 2013/0183805 A1 | 7/2013 | Wong et al. | |
| 2013/0264680 A1 | 10/2013 | Auciello et al. | |
| 2013/0320494 A1 | 12/2013 | Zhu et al. | |
| 2014/0042547 A1 | 2/2014 | Khakifirooz et al. | |
| 2014/0120392 A1 | 5/2014 | Ueno | |
| 2014/0293506 A1 | 10/2014 | Hu et al. | |

FOREIGN PATENT DOCUMENTS

| | | |
|---|---|---|
| WO | 2013037010 A1 | 3/2013 |
| WO | 2014074122 A2 | 5/2014 |

OTHER PUBLICATIONS

"Electron-Pinned defect-dipoles for high-performance colossal permittivity materials", by: Wanbiao Hu et al., Nature Materials Published: Jun. 30, 2013, 6 pages.

"201st Meeting of the Electrochemical Society, Inc.," Philadelphia, Pennsylvania, May 12-17, 2002, Published Abstracts : Abstract 243 Anode Formation of TiO2 Dielectric Films; (0.75V/nm), 16 Pages.

* cited by examiner

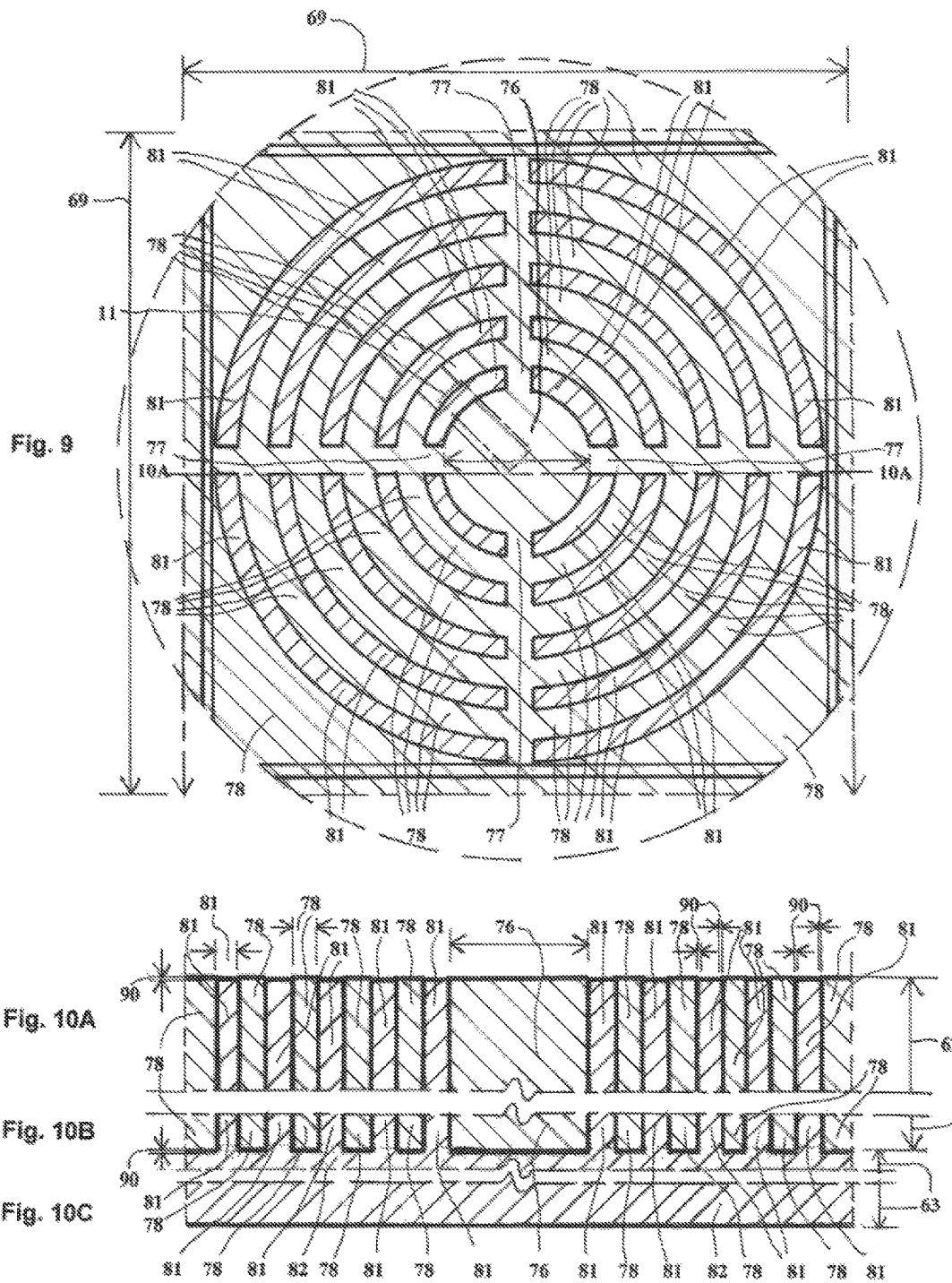

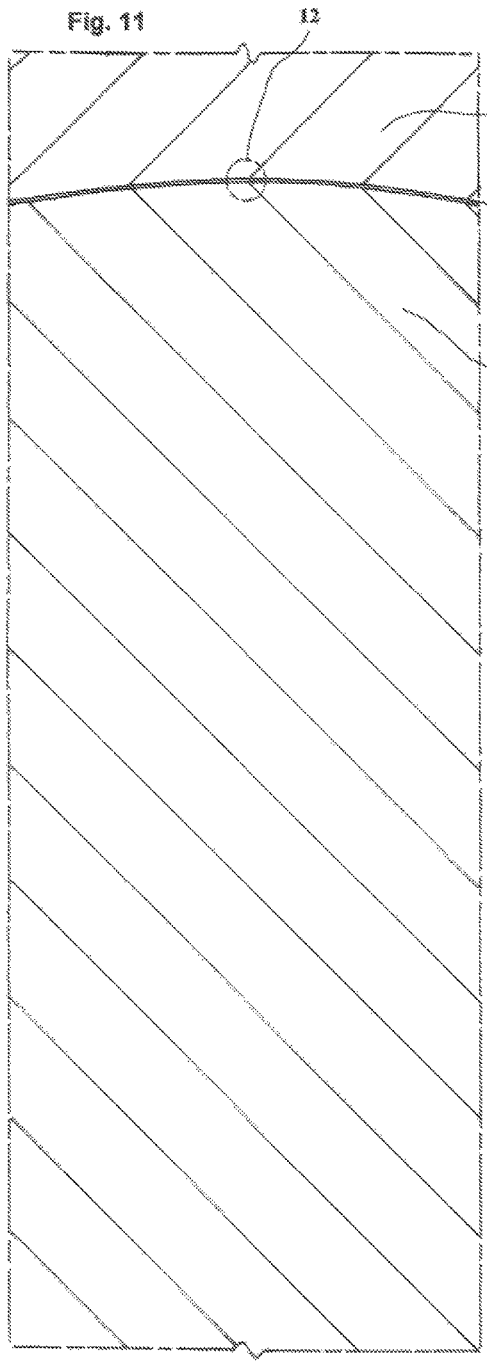
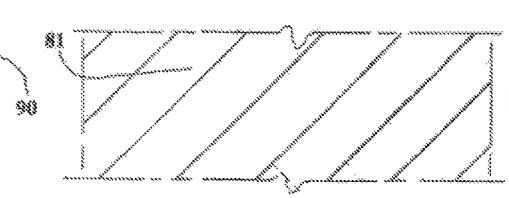
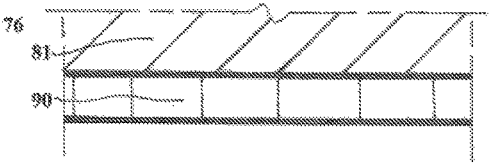
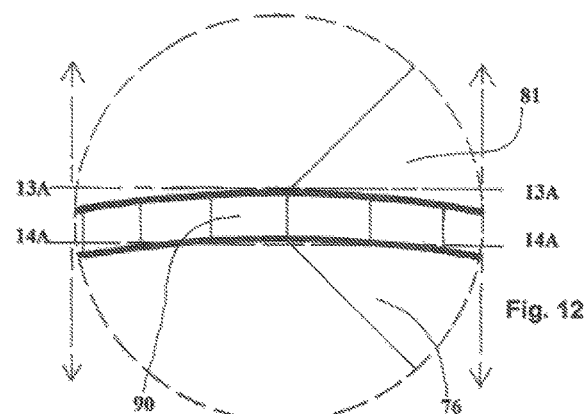
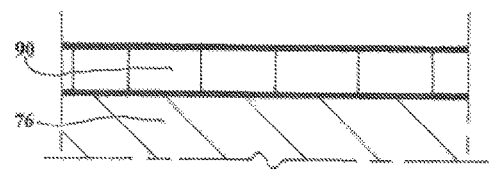
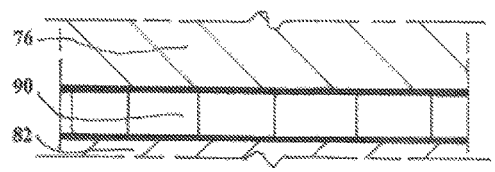

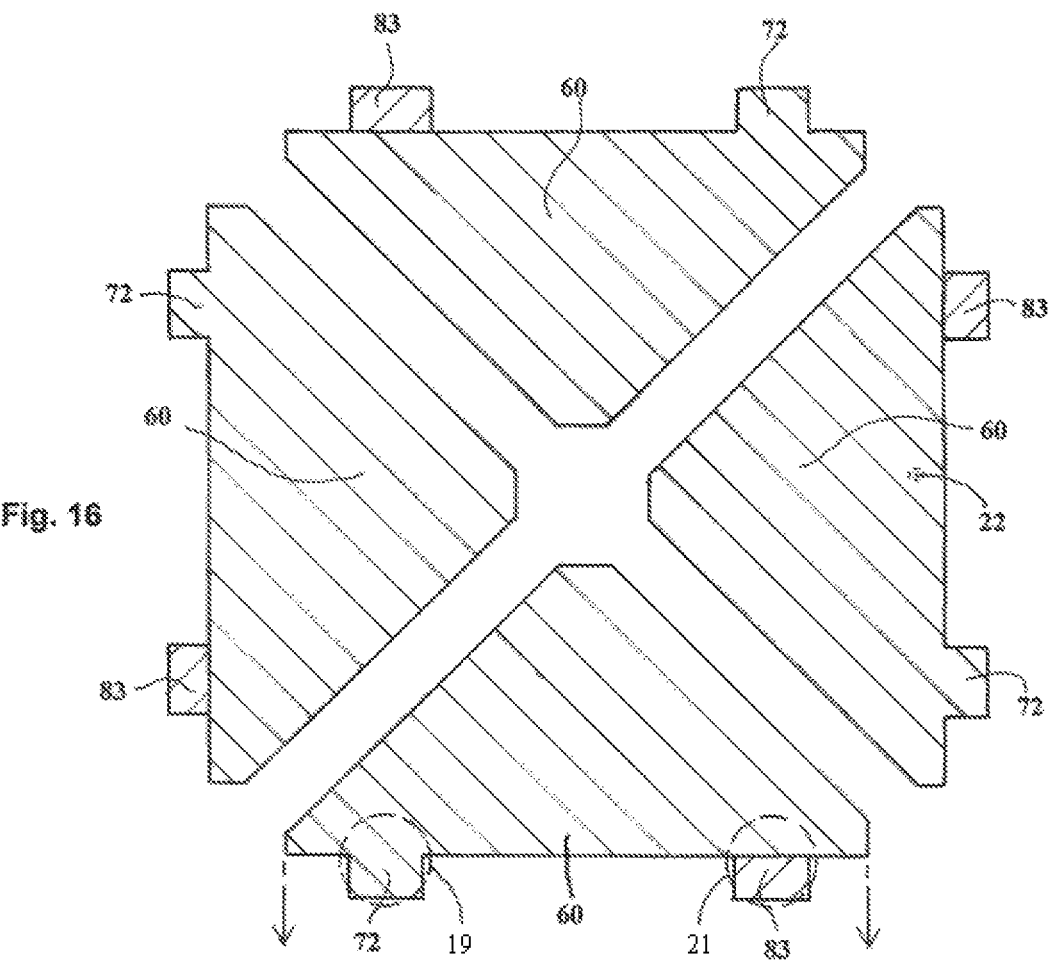
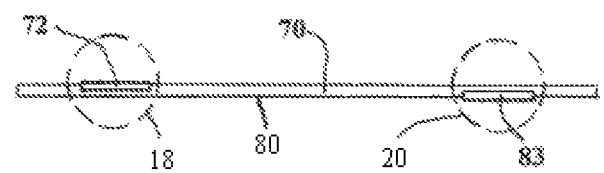

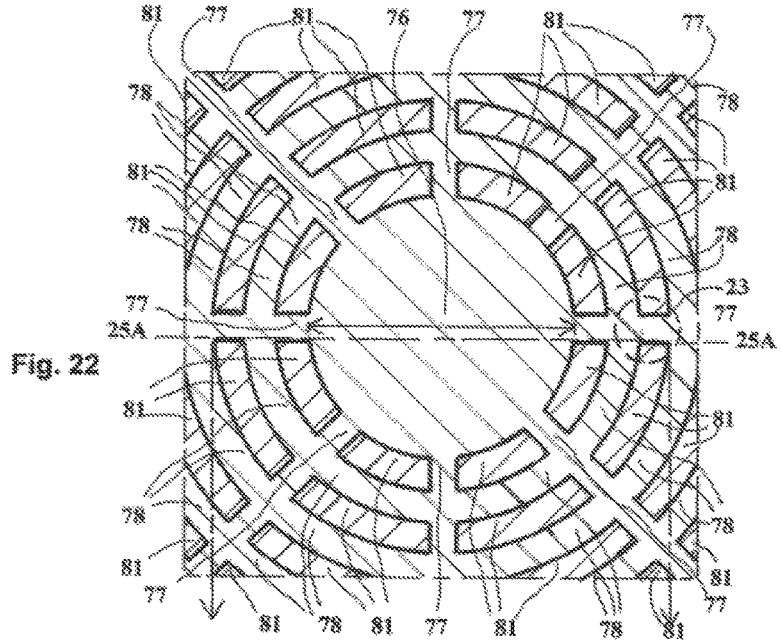
Fig. 22
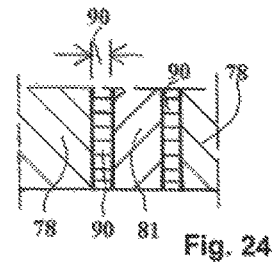
Fig. 24
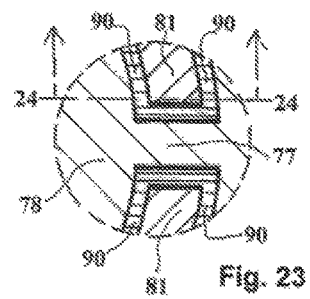
Fig. 23
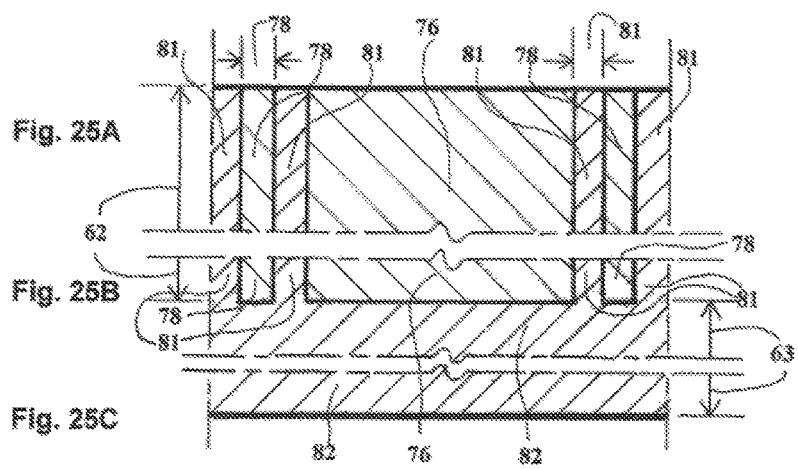
Fig. 25A
Fig. 25B
Fig. 25C

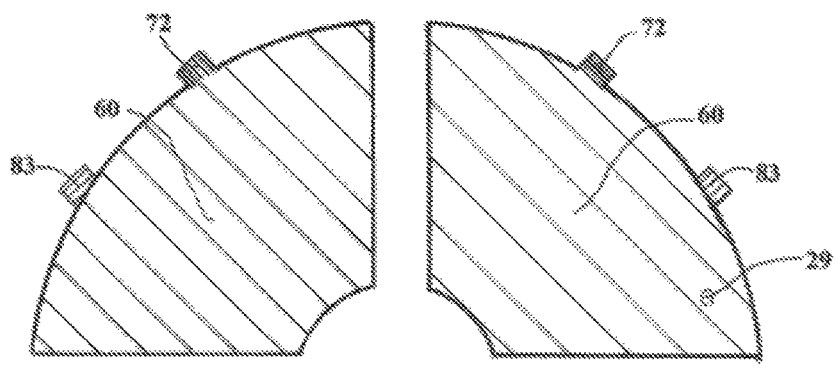
Fig. 26
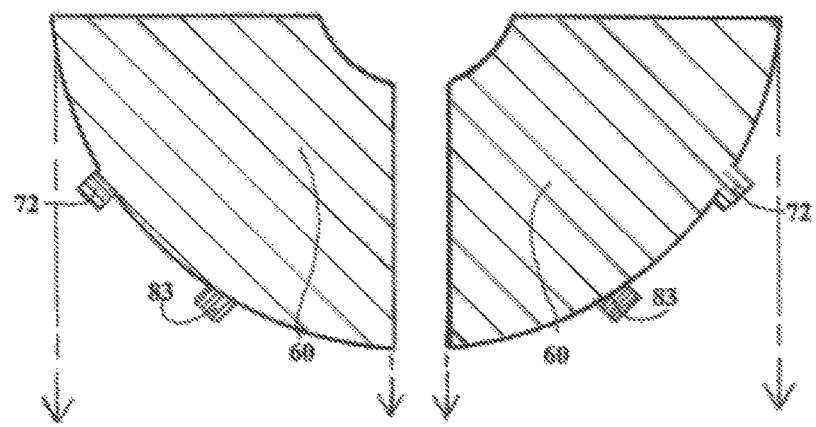
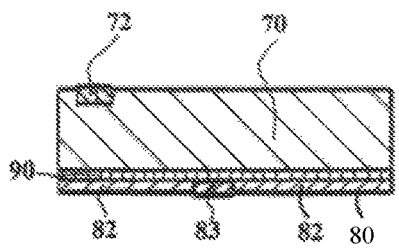
Fig. 27
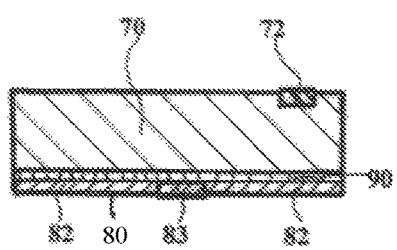
Fig. 28

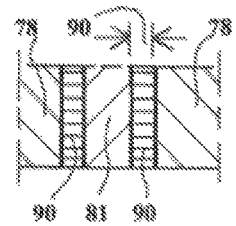
Fig. 31
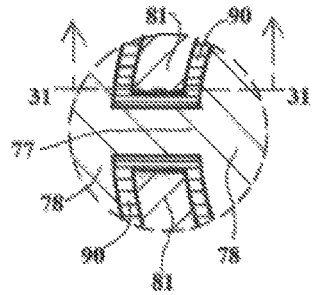
Fig. 30
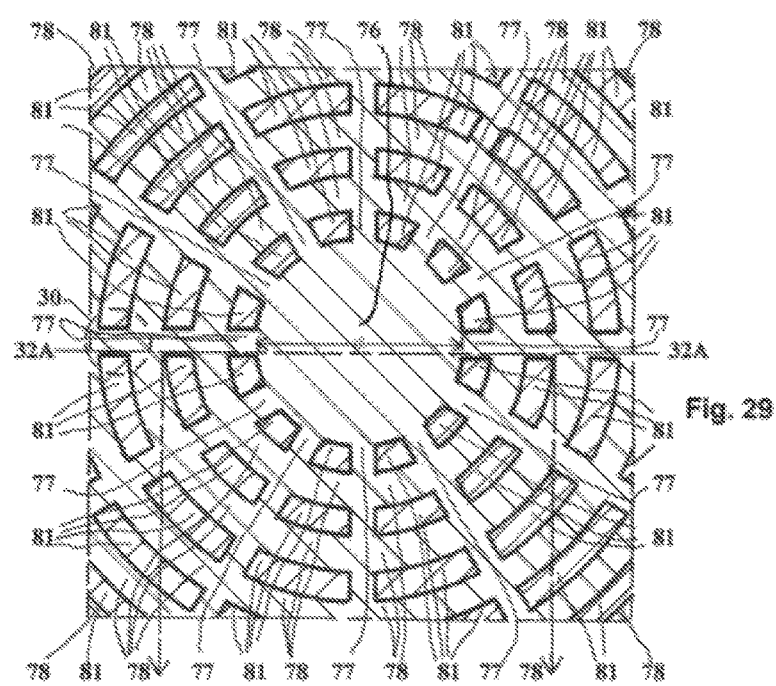
Fig. 29
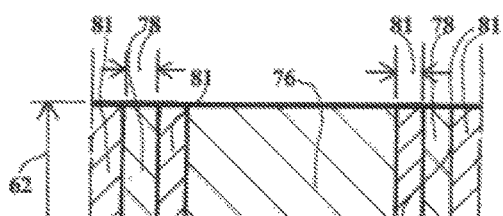
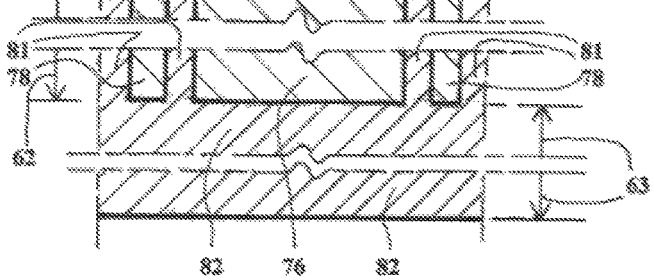
Fig. 32A
Fig. 32B
Fig. 32C

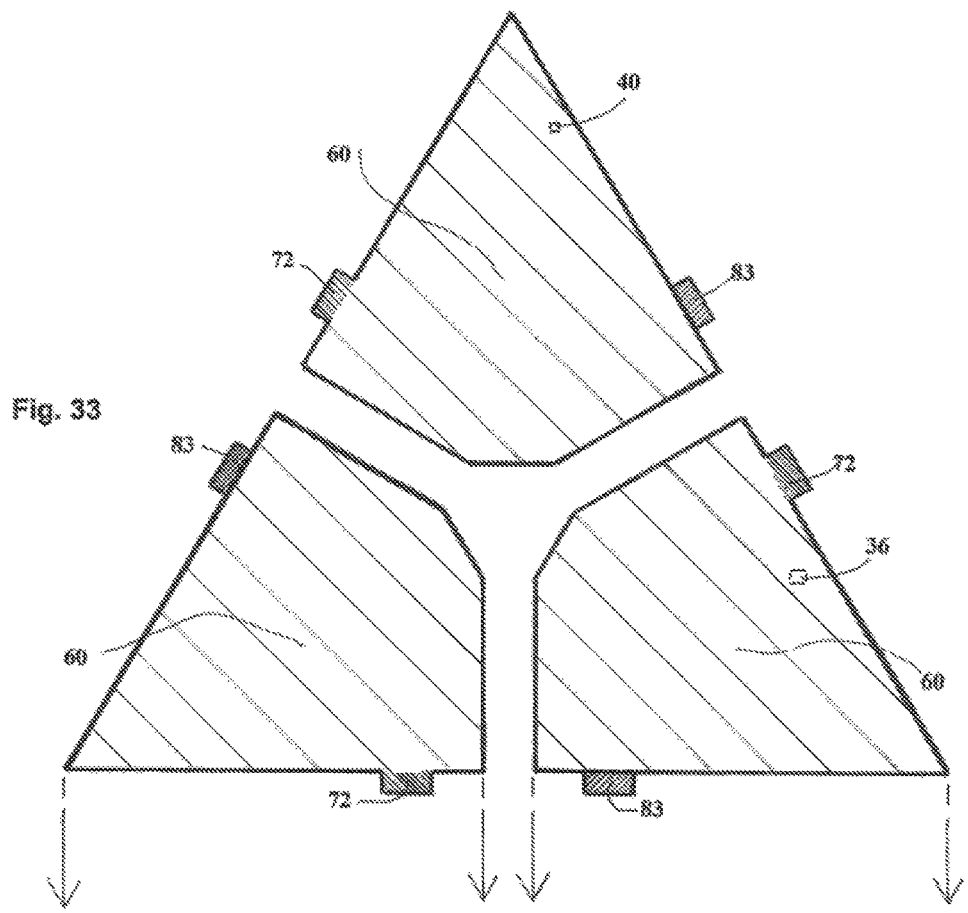
Fig. 33
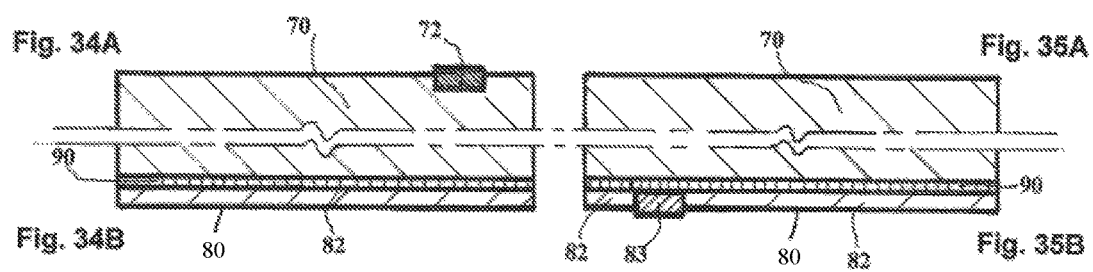
Fig. 34A  Fig. 35A
Fig. 34B  Fig. 35B

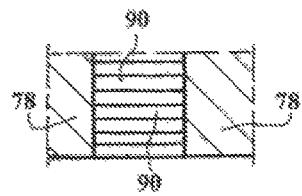
Fig. 38
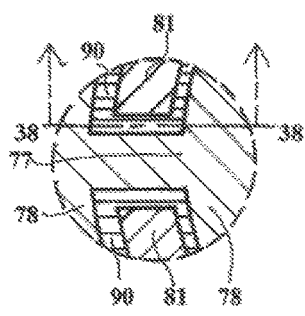
Fig. 37
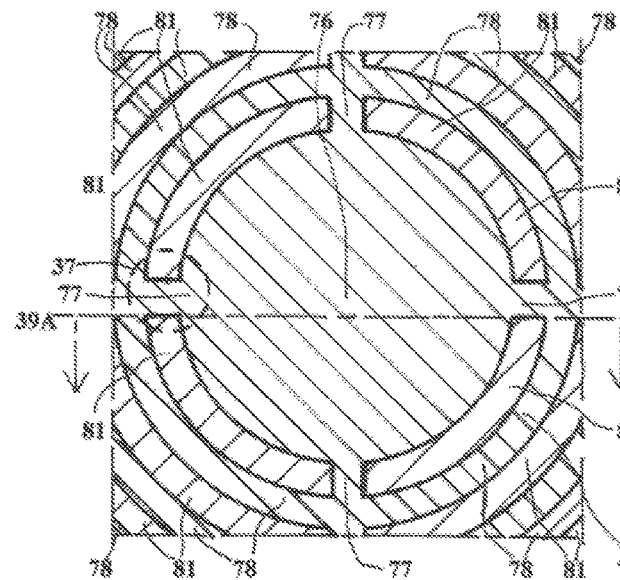
Fig. 36
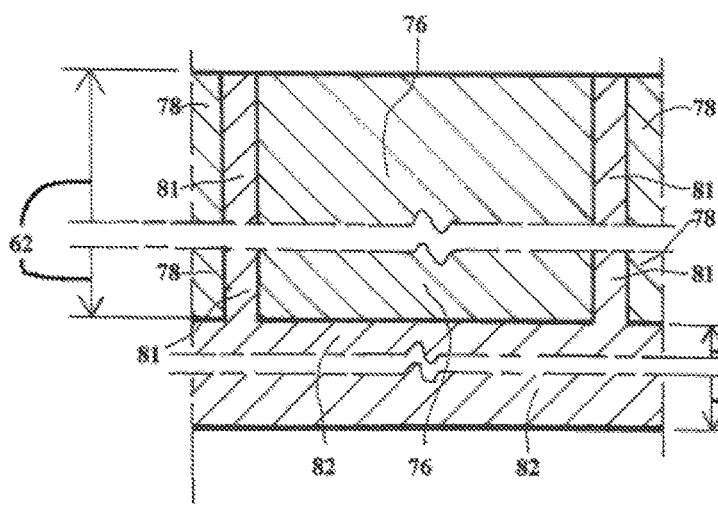
Fig. 39A
Fig. 39B
Fig. 39C

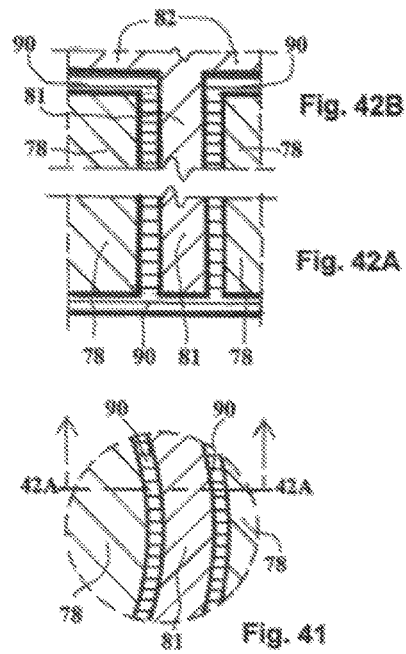
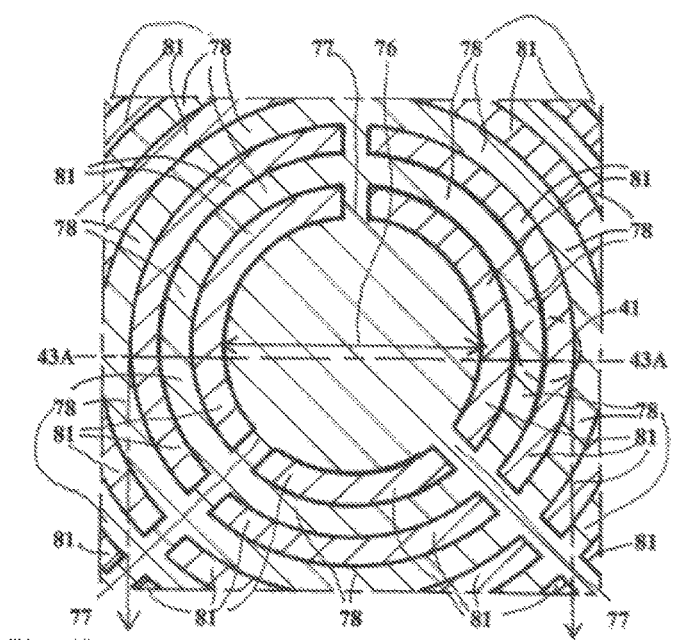
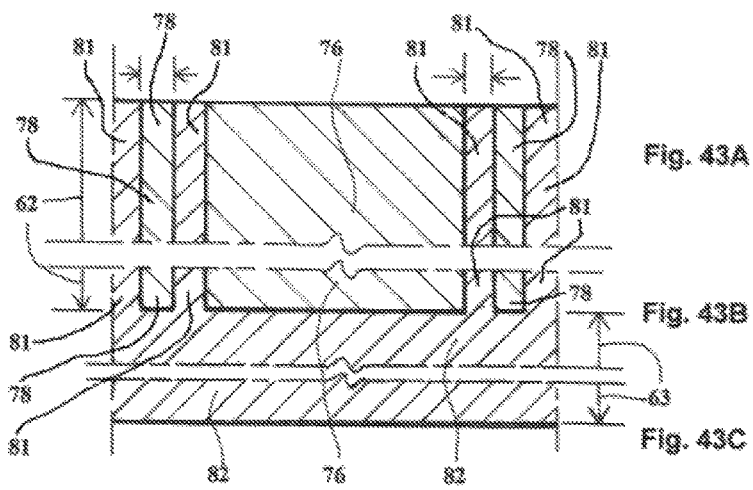

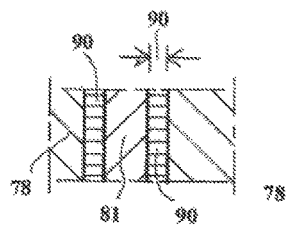
Fig. 47
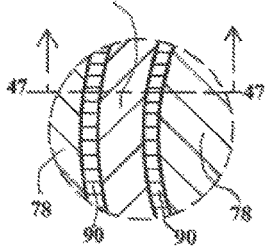
Fig. 46
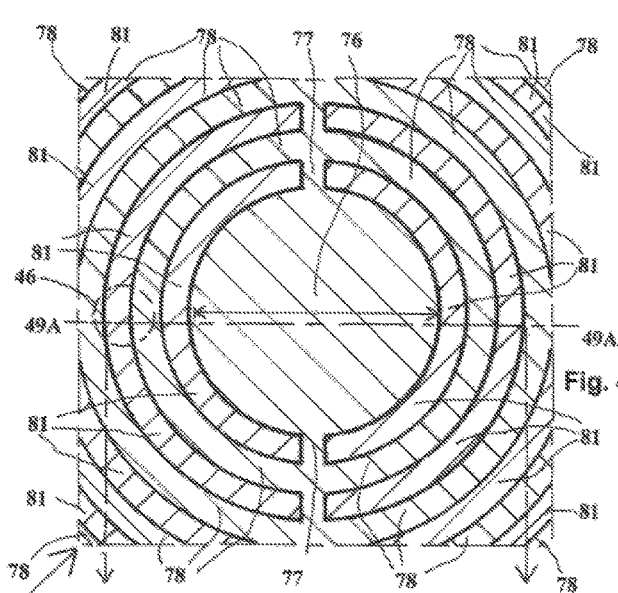
Fig. 45
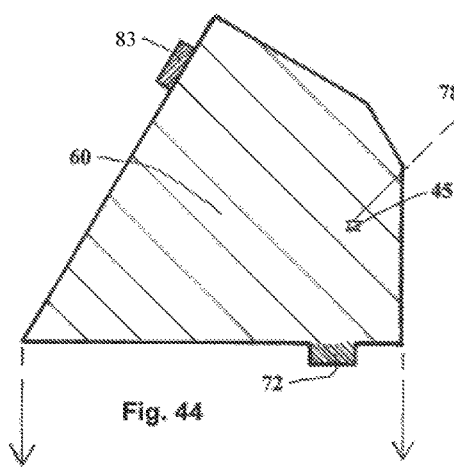
Fig. 44
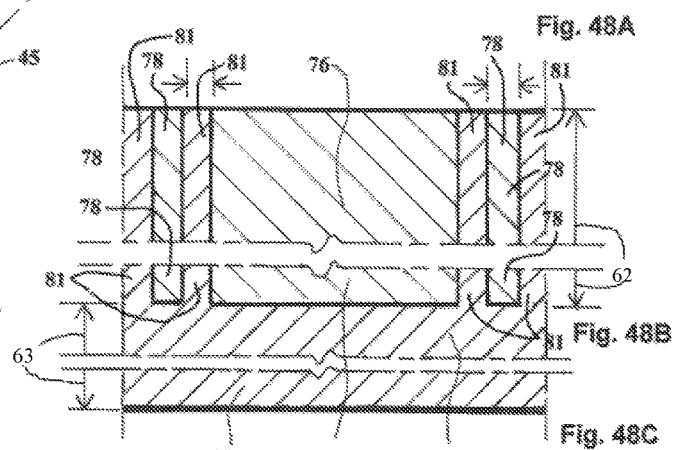
Fig. 48A
Fig. 48B
Fig. 48C
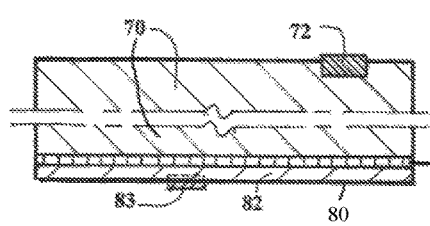
Fig. 49A
Fig. 49B

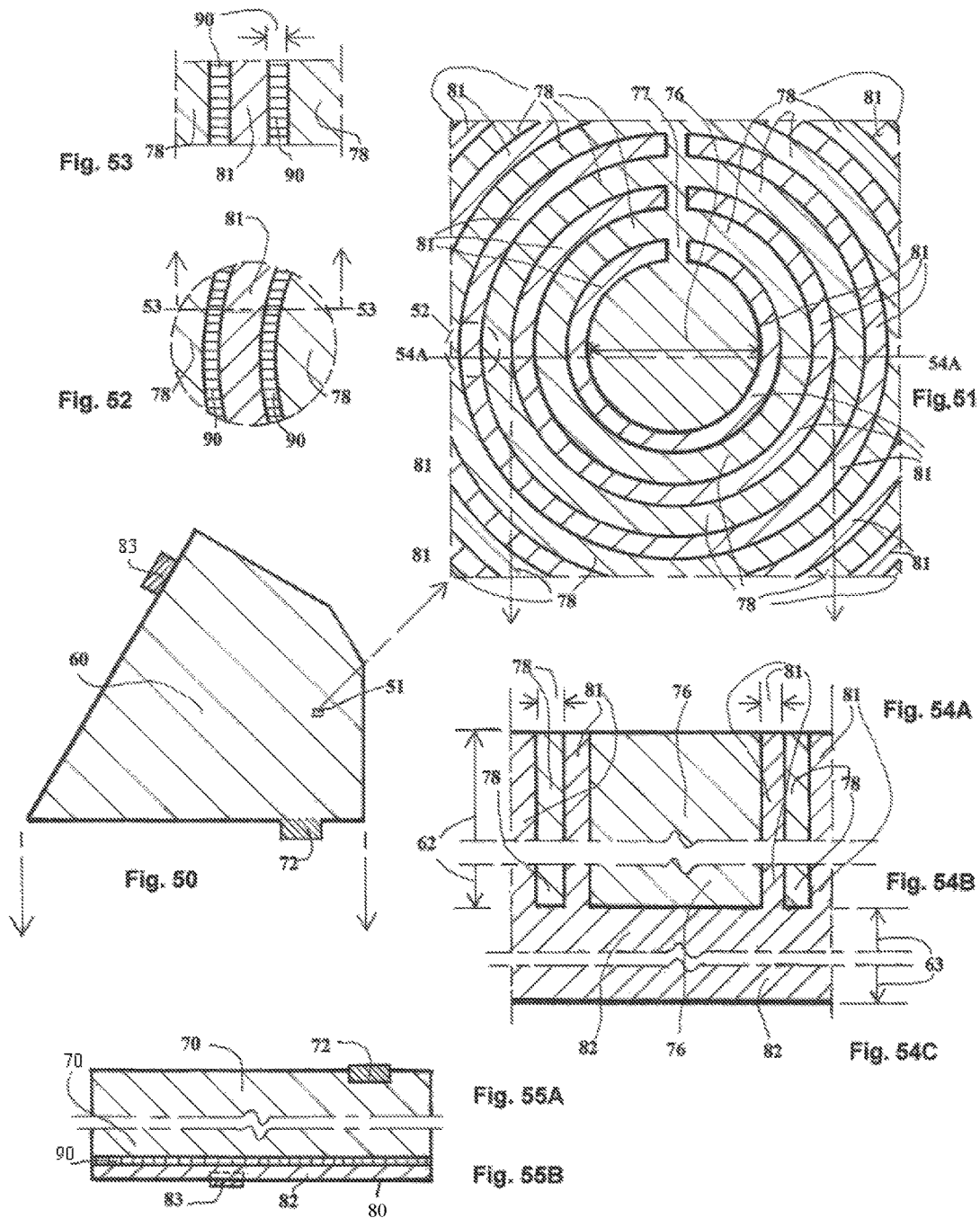

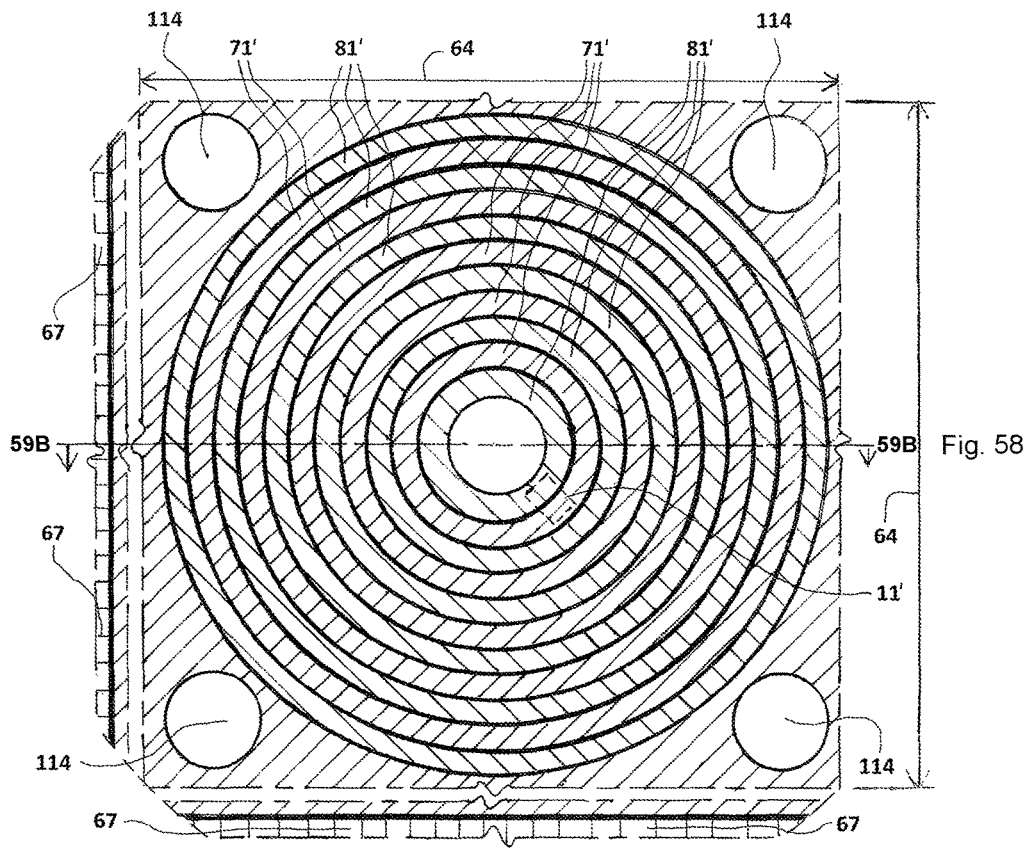
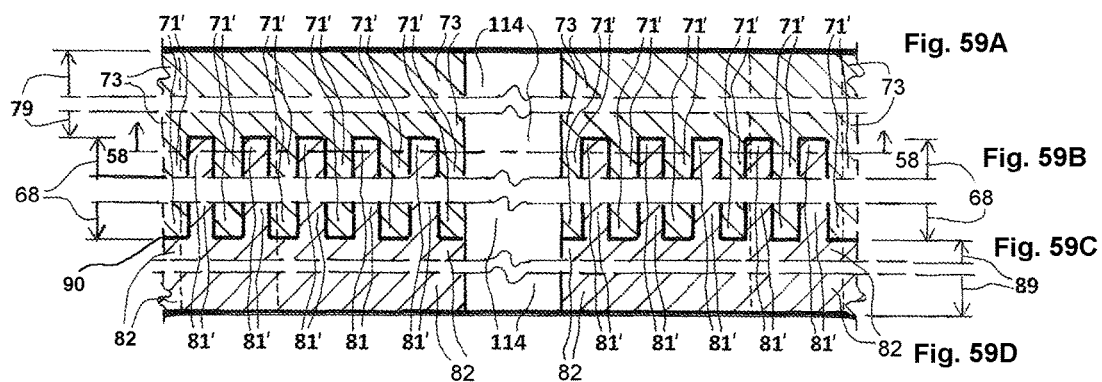

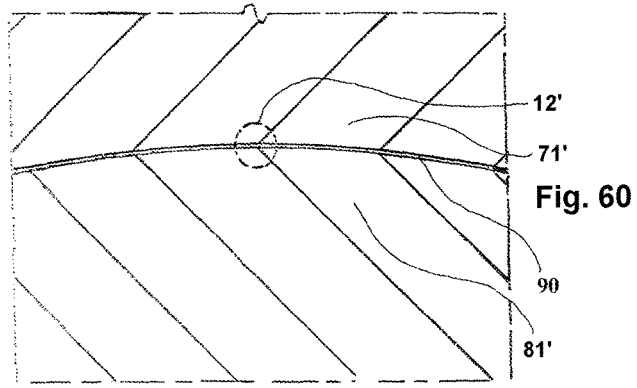
Fig. 60
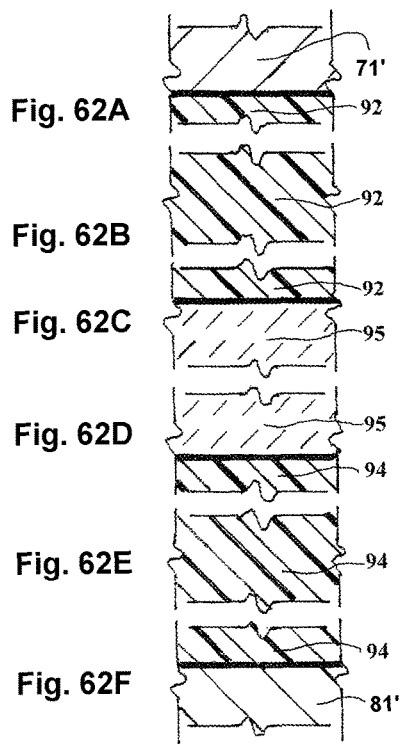
Fig. 62A
Fig. 62B
Fig. 62C
Fig. 62D
Fig. 62E
Fig. 62F
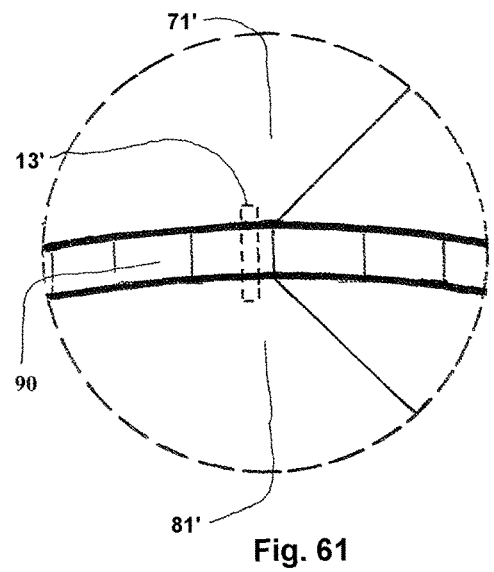
Fig. 61

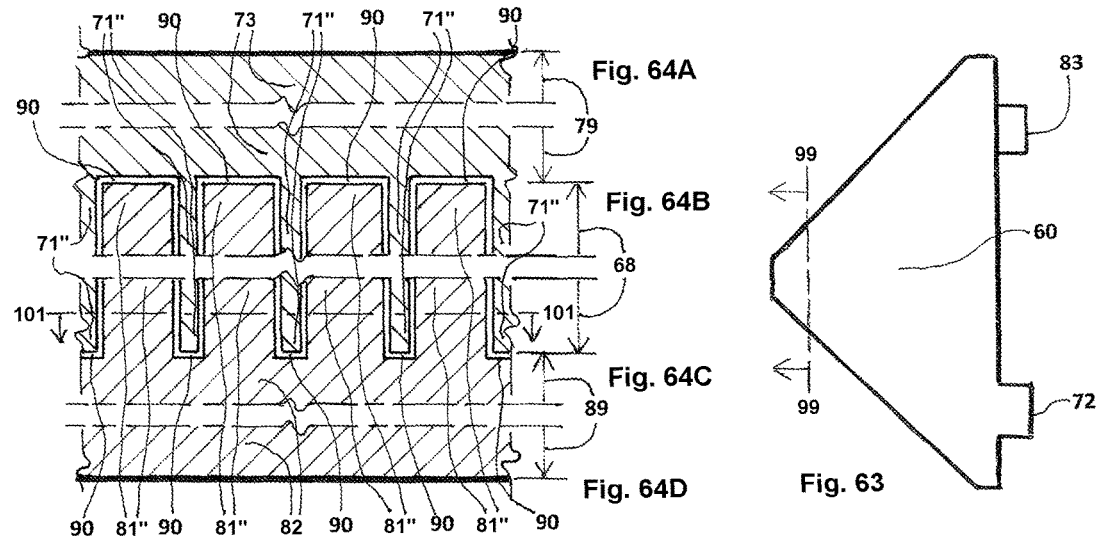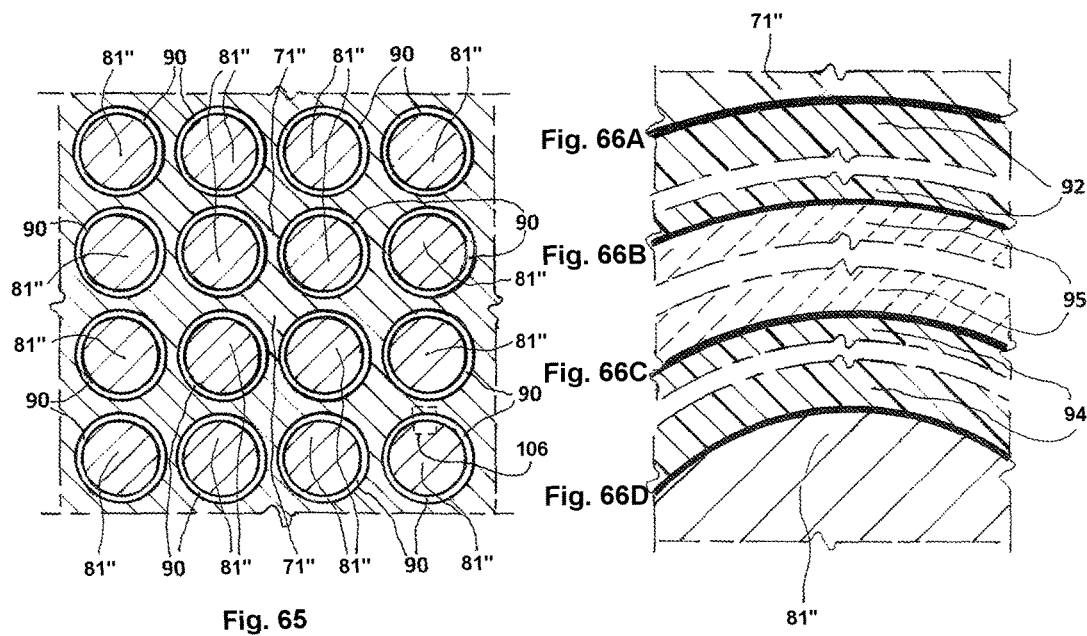

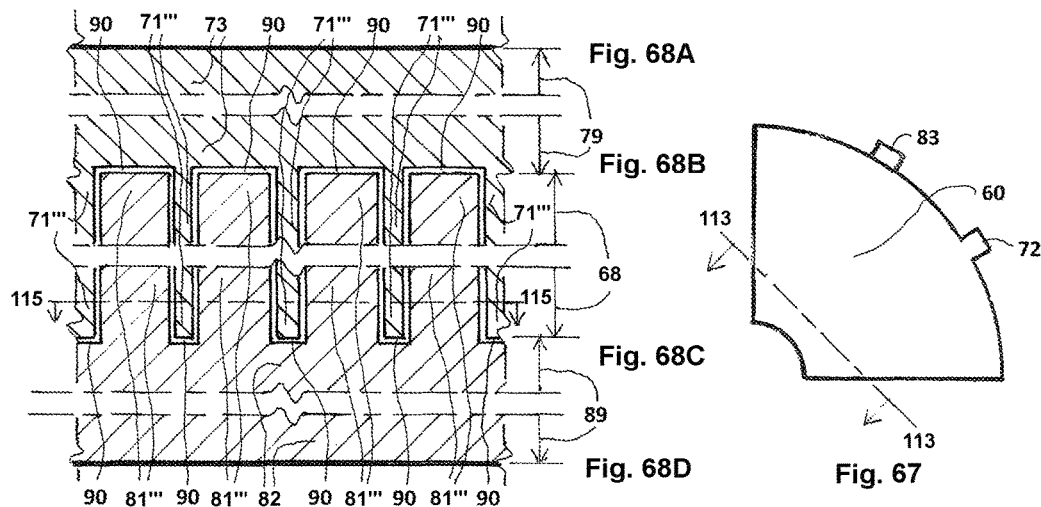
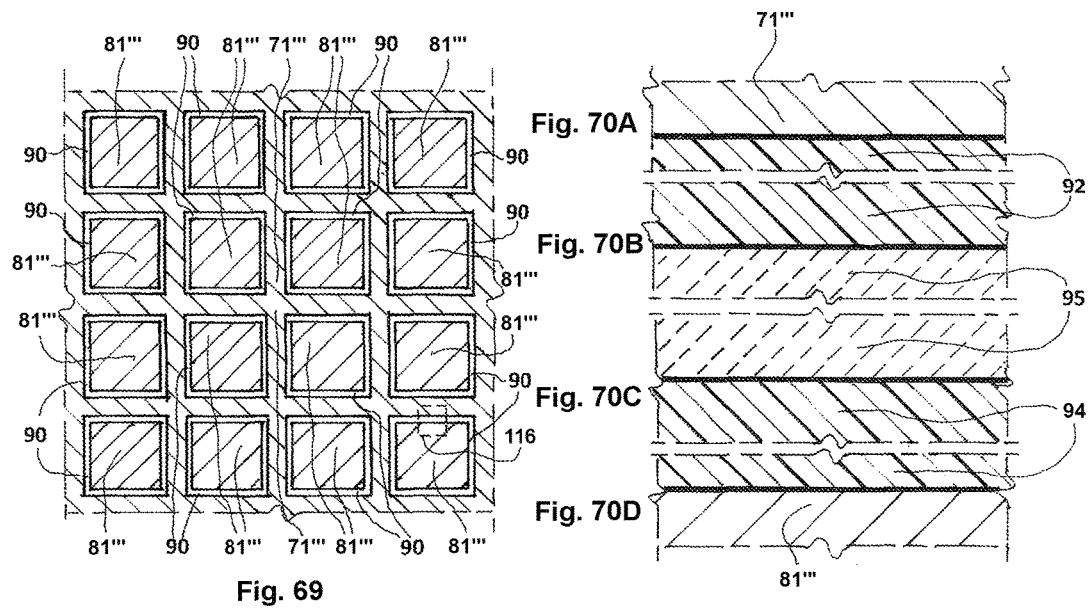

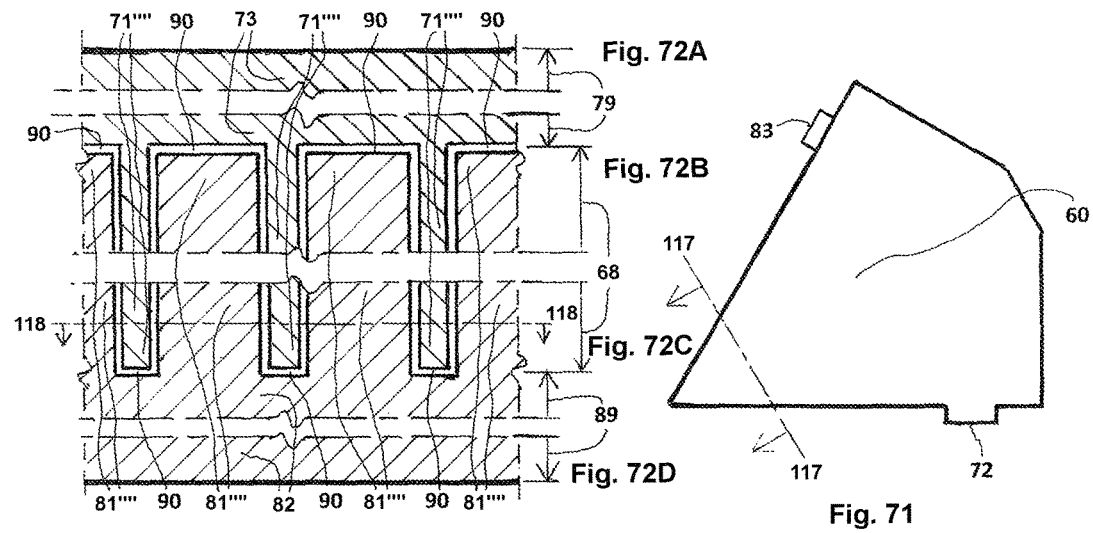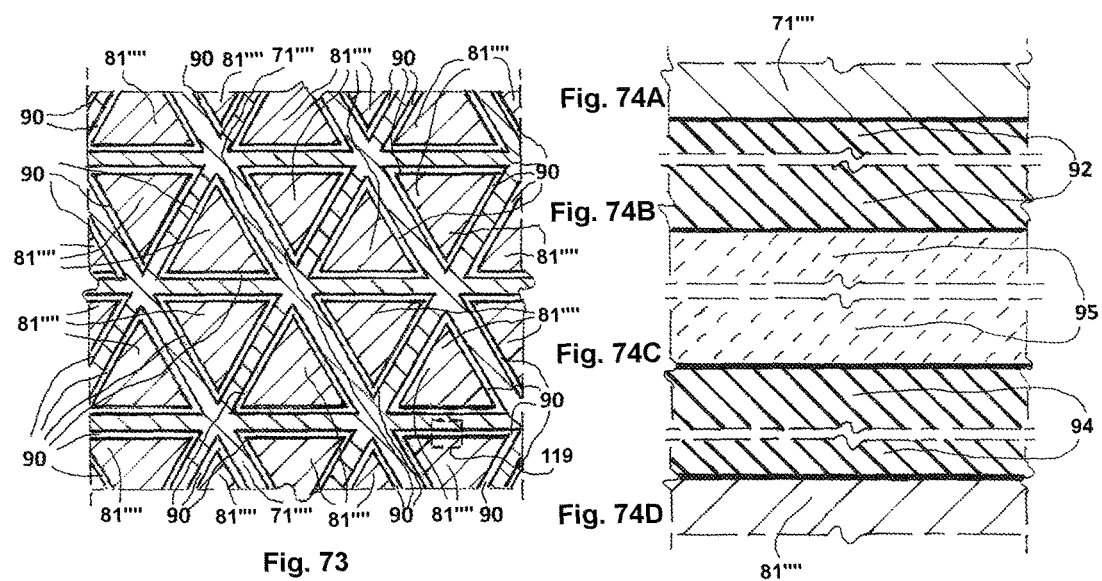

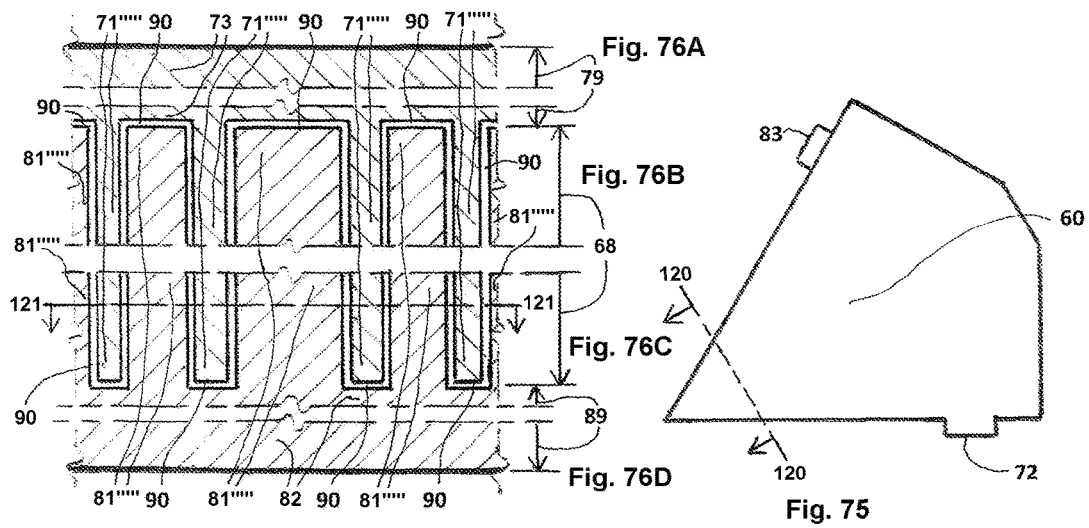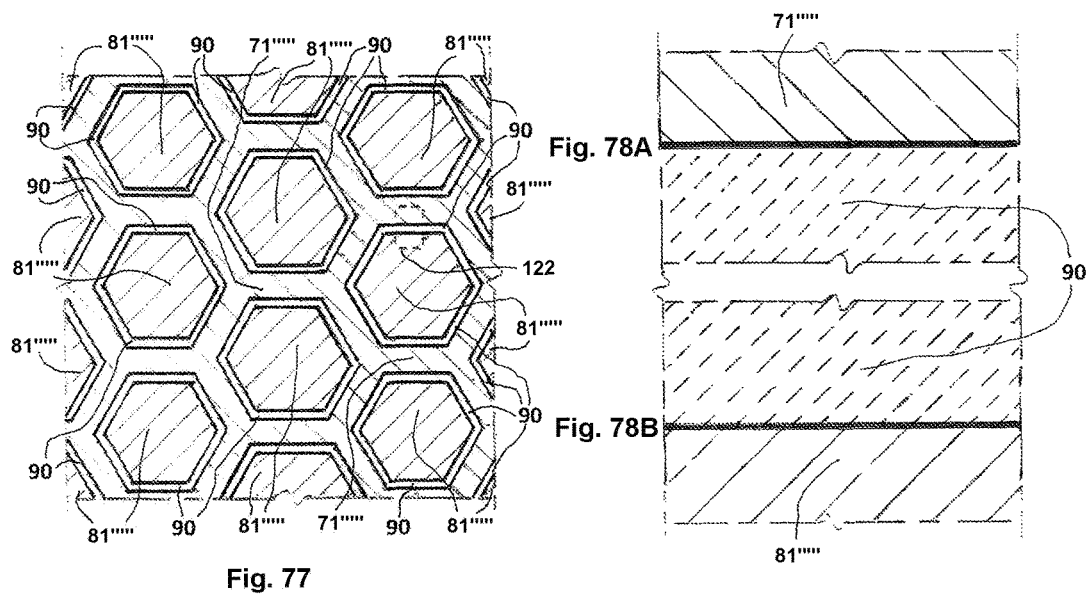

HIGH ENERGY DENSITY CAPACITOR WITH HIGH ASPECT MICROMETER STRUCTURES AND A GIANT COLOSSAL DIELECTRIC MATERIAL

RELATED APPLICATIONS

This application is a continuation-in-part of co-pending U.S. patent application Ser. No. 14/735,077, filed Jun. 9, 2015 and entitled "High Energy Density Capacitor with Micrometer Structures and Nanometer Components," and claims priority under 35 U.S.C. section 119(e) of U.S. Provisional Patent Application No. 62/284,747, filed Oct. 7, 2015, and entitled "High Energy Density Capacitor With High Aspect Micrometer Structures and a Giant Colossal Dielectric Material Systems," both of which are hereby incorporated by reference.

FIELD OF THE INVENTION

The invention relates to high energy density capacitors. More specifically, the invention relates to high energy density capacitors having micrometer structures and nanometer components.

BACKGROUND OF INVENTION

There has been and are significant scientific and engineering efforts under way to develop energy storage devices which can store larger amounts of electrical energy within specifications of lower weights and smaller volumes than can be purchased today in the world wide market place. The United States Department of Energy has set target goals for electric vehicle batteries with the specifications of 100 watt-hours per kilogram, 200 watt-hours per liter at a cost of $500 per kilowatt-hour in 2012 and 200 watt-hours per kilogram, 400 watt hours at a cost of $125 per kilowatt-hour in 2022. Capacitors are also known for their fast charging abilities, safe operations, long life cycles and for high power densities, but to this date they lack the abilities to store large amounts of electrical energy in small volumes and with low weights in a high density capacitor. The problem with all the well known electrical energy storage approaches is the realization of the mass production means and methods needed to deliver an electrical energy storage devise with low weight, low volume, at a low enough cost, and long enough life cycle to be able to achieve an initial $500 per kilowatt hour marketing price today, and the lack the ability to reduce this initial price to $125 per kilowatt hour of electrical energy storage in the succeeding generations of product realizations by 2022.

Capacitance is the ability of a body to store an electrical charge. Any object that can be electrically charged exhibits some capacitance. A common form of energy storage device is a parallel-plate capacitor. In a parallel plate capacitor, capacitance is directly proportional to the surface area of the over lapping portions of the positive and negative plates, and inversely proportional to the separation distance between the plates and the relative permittivity of the material or lack of material between the over lapping portions of the positively charged and negatively charged plates. If the charges on the plates are $+q$ and $-q$, and V gives the voltage between the plates, then the capacitance C is given by:

$$C=q/V. \quad \text{(Equation one)}$$

which gives the voltage/current relationship:

$$I(t)=C\ dV(t)/dt. \quad \text{(Equation Two)}$$

where C=capacitance; q=charge; V=volts; I=current and t=time.

The capacitance is a function of the physical dimensions of the overlapping area of the positive and negative electrodes and the dielectric thickness between the electrodes along with the permittivity constant of the dielectric material also known as the dielectric constant of the insulating material. The capacitance is independent of the potential difference between the conductors and the total charge on them. The SI unit of capacitance is the farad (symbol: F), named after the English physicist Michael Faraday, a 1 farad capacitor when charged with 1 coulomb of electrical charge will have a potential difference of 1 volt between the positive and negative plates. Historically, a farad was regarded as an inconveniently large unit, both electrically and physically. Its subdivisions were invariably used, namely the microfarad, nanofarad and picofarad. More recently, technology has advanced such that capacitors of 1 farad and greater can be constructed in a structure little larger than a coin battery (so-called supercapacitors). Such capacitors are principally used for energy storage replacing more traditional batteries. The energy (measured in joules) stored in a capacitor is equal to the work done to charge it. A capacitor of capacitance C, holding a charge $+q$ on one plate and $-q$ on the other. Moving a small element of charge dq from one plate to the other against the potential difference $V=q/C$ requires the work dW:

$$dW=q/C\ dq \quad \text{(Equation Three)}$$

where W is the work measured in joules, q is the charge measured in coulombs and C is the capacitance, measured in farads.

The energy stored in a capacitor is found by integrating this equation. Starting with an uncharged capacitance (q=0) and moving charge from one plate to the other until the plates have charge $+Q$ and $-Q$ requires the work W:

$$W_{charging}=0.5(Q^2/C)=0.5\ QV=0.5\ CV^2=W_{stored} \quad \text{(Equation Four)}$$

The capacitance of the majority of capacitors used in electronic circuits is generally several orders of magnitude smaller than the farad. The most common subunits of capacitance in use today are the microfarad (mF), nanofarad (nF), picofarad (pF), and, in microcircuits, femtofarad (fF). Capacitance can be calculated if the geometry of the conductors and the dielectric properties of the insulator between the conductors are known. For example, the capacitance of a parallel-plate capacitor constructed of two parallel plates both of area A separated by a distance d is approximately equal to the following:

$$C=\varepsilon_r\varepsilon_0(A/d) \quad \text{(Equation Five)}$$

where C is the capacitance, in Farads; A is the area of overlap of the two plates, in square meters; $\varepsilon_r$ is the relative static permittivity (sometimes called the dielectric constant) of the material between the plates (for a vacuum, $\varepsilon_r=1$); $\varepsilon_0$ is the electric constant, the permittivity of free space ($\varepsilon_0 \approx 8.854\times10^{-12}$ F m$^{-1}$) and d is the separation between the plates, in meters. The equation is a good approximation if d is small compared to the other dimensions of the plates so the field in the capacitor over most of its area is uniform, and the so-called fringing field around the periphery provides a small contribution.

The energy stored in a capacitor, for a flat-plate capacitor the energy stored is:

$$W_{stored}=0.5(CV^2)=0.5\ \varepsilon_r\varepsilon_0(A/d)V^2 \quad \text{(Equation Six)}$$

where W is the energy, in joules; C is the capacitance, in farads; and V is the voltage, in volts.

SUMMARY OF THE INVENTION

Embodiments of the present invention are directed to a high density energy storage system including a giant-colossal dielectric thin film material electrically insulating between two electrodes configured to have increased overlapping surface area.

A first aspect of the present application is directed to a high energy density capacitor system. The system comprises a plurality of capacitor modules each including a first electrode having a first electrical terminal, first protrusions with a height to width ratio of at least 100 to 1, and a first electrically conductive bus bar that electrically an physically couples each of the first protrusion together and to the first electrical terminal, a second electrode adjacent to the first electrode and a non-conductive film comprising a giant-colossal dielectric material positioned between the first electrode and the second electrode such that the first electrode and the second electrode are not electrically coupled to each other. In some embodiments, wherein the first electrode comprises a first slab and the first protrusions are a plurality of first concentric rings that protrude from a bottom of the first slab, and the second electrode comprises a second slab, a second electrical terminal, second protrusions with a height to width ratio of at least 100 to 1, and a second electrically conductive bus bar that electrically an physically couples each of the second protrusion together and to the second electrical terminal, wherein the second protrusions are a plurality of second concentric rings that protrude from a top of the second slab. In some embodiments, the plurality of first concentric rings and second concentric rings are configured to interlock when the bottom of the first electrode is positioned on the top of the second electrode. In some embodiments, one or more of the capacitor modules comprise one or more cooling channels that extend through both the first electrode and the second electrode. In some embodiments, the second electrode comprises a plurality of cavities and the first electrode comprises a slab and the first protrusions extend from the slab and fill the cavities. In some embodiments, a perimeter of each of the cavities and each of the protrusions are hexagonal. In some embodiments, a perimeter of each of the cavities and each of the protrusions are square. In some embodiments, a perimeter of each of the cavities and each of the protrusions are triangular. In some embodiments, a perimeter of each of the cavities and each of the protrusions are circular. In some embodiments, the film comprises a low leakage dielectric layer and a high break down dielectric layer that sandwich a layer of the giant-colossal dielectric material between the first electrode and the second electrode. In some embodiments, a breakdown value of the high break down dielectric layer is 0.5 to 2 volts per nanometer of thickness and electronic leakage value of the low leakage dielectric layer is less than or equal to 0.5 percent. In some embodiments, two or more of the capacitor modules are electrically coupled together in series, in parallel or both. In some embodiments, the giant-colossal dielectric material is comprised of compound dielectric material of two or more dielectric materials. In some embodiments, the giant-colossal dielectric material is comprised of complex dielectric material of two or more dielectric materials.

A second aspect is directed to a high energy density capacitor. The capacitor comprises a first electrode having a first electrical terminal, first protrusions with a height to width ratio of at least 100 to 1, and a first electrically conductive bus bar that electrically an physically couples each of the first protrusion together and to the first electrical terminal, a second electrode adjacent to the first electrode, a non-conductive film comprising a giant-colossal dielectric material positioned between the first electrode and the second electrode such that the first electrode and the second electrode are not electrically coupled to each other. In some embodiments, wherein the first electrode comprises a first slab and the first protrusions are a plurality of first concentric rings that protrude from a bottom of the first slab, and the second electrode comprises a second slab, a second electrical terminal, second protrusions with a height to width ratio of at least 100 to 1, and a second electrically conductive bus bar that electrically an physically couples each of the second protrusion together and to the second electrical terminal, wherein the second protrusions are a plurality of second concentric rings that protrude from a top of the second slab. In some embodiments, the plurality of first concentric rings and second concentric rings are configured to interlock when the bottom of the first electrode is positioned on the top of the second electrode. In some embodiments, the capacitor further comprises one or more cooling channels that extend through both the first electrode and the second electrode. In some embodiments, the second electrode comprises a plurality of cavities and the first electrode comprises a slab and the first protrusions extend from the slab and fill the cavities. In some embodiments, a perimeter of each of the cavities and each of the protrusions are hexagonal. In some embodiments, a perimeter of each of the cavities and each of the protrusions are square. In some embodiments, a perimeter of each of the cavities and each of the protrusions are triangular. In some embodiments, a perimeter of each of the cavities and each of the protrusions are circular. In some embodiments, the film comprises a low leakage dielectric layer and a high break down dielectric layer that sandwich a layer of the giant-colossal dielectric material between the first electrode and the second electrode. In some embodiments, a breakdown value of the high break down dielectric layer is 0.5 to 2 volts per nanometer of thickness and electronic leakage value of the low leakage dielectric layer is less than or equal to 0.5 percent. In some embodiments, the giant-colossal dielectric material is comprised of compound dielectric material of two or more dielectric materials. In some embodiments, the giant-colossal dielectric material is comprised of complex dielectric material of two or more dielectric materials.

A third aspect is directed to a method of providing a high energy density capacitor system. The method comprises assembling a plurality of capacitor modules each including a first electrode having a first electrical terminal, first protrusions with a height to width ratio of at least 100 to 1, and a first electrically conductive bus bar that electrically an physically couples each of the first protrusion together and to the first electrical terminal, a second electrode adjacent to the first electrode, a non-conductive film comprising a giant-colossal dielectric material positioned between the first electrode and the second electrode such that the first electrode and the second electrode are not electrically coupled to each other and stacking the modules between two end plates. In some embodiments, wherein the first electrode comprises a first slab and the first protrusions are a plurality of first concentric rings that protrude from a bottom of the first slab, and the second electrode comprises a second slab, a second electrical terminal, second protrusions with a height to width ratio of at least 100 to 1, and a second electrically conductive bus bar that electrically an physically couples each of the second protrusion together and to the second electrical terminal, wherein the second protrusions are a plurality of second concentric rings that protrude from a top of the second slab. In some embodiments, the plurality of first concentric rings and second concentric rings are configured to interlock when the bottom of the first electrode is positioned on the top of the second electrode. In some embodiments, one or more of the capacitor modules comprise one or more cooling channels that extend through both the first electrode and the second electrode. In some embodiments, the second electrode comprises a plurality of cavities and the first electrode comprises a slab and the first protrusions extend from the slab and fill the cavities. In some embodiments, a perimeter of each of the cavities and each of the protrusions are hexagonal. In some embodiments, a perimeter of each of the cavities and each of the protrusions are square. In some embodiments, a perimeter of each of the cavities and each of the protrusions are triangular. In some embodiments, a perimeter of each of the cavities and each of the protrusions are circular. In some embodiments, the film comprises a low leakage dielectric layer and a high break down dielectric layer that sandwich a layer of the giant-colossal dielectric material between the first electrode and the second electrode. In some embodiments, a breakdown value of the high break down dielectric layer is 0.5 to 2 volts per nanometer of thickness and electronic leakage value of the low leakage dielectric layer is less than or equal to 0.5 percent. In some embodiments, the giant-colossal dielectric material is comprised of compound dielectric material of two or more dielectric materials. In some embodiments, the giant-colossal dielectric material is comprised of complex dielectric material of two or more dielectric materials. In some embodiments, the method further comprises electrically coupling two or more of the capacitor modules in series, in parallel or both.

BRIEF DESCRIPTION OF THE DRAWINGS

FIG. 9 illustrates an enlarged plan view of FIG. 7 according to some embodiments.

FIG. 10A illustrates a partial section view of FIG. 9 according to some embodiments.

FIG. 10B illustrates a continued partial section view of FIG. 10A according to some embodiments.

FIG. 10C illustrates a continued partial section view of FIG. 10B according to some embodiments.

FIG. 11 illustrates an enlarged partial plan view of FIG. 9 according to some embodiments.

FIG. 12 illustrates a enlarged partial section view of FIG. 11 according to some embodiments.

FIG. 13A illustrates a partial section view of FIG. 12 according to some embodiments.

FIG. 13B illustrates a continued section view of FIG. 13A according to some embodiments.

FIG. 14A illustrates a partial section view of FIG. 12 according to some embodiments.

FIG. 14B illustrates a continued section view of FIG. 14A according to some embodiments.

FIG. 16 illustrates a plan view of four capacitor modules with male ending electrode terminals according to some embodiments.

FIG. 17 illustrates an elevation of one capacitor of FIG. 14 with male ending electrode terminals according to some embodiments.

FIG. 22 illustrates a partial plan view enlarged of FIG. 16 according to some embodiments.

FIG. 23 illustrates a partial plan view enlarged of FIG. 22 according to some embodiments.

FIG. 24 illustrates a partial section view of FIG. 23 according to some embodiments.

FIG. 25A illustrates a partial section view of FIG. 22 according to some embodiments.

FIG. 25B illustrates a continued partial section view of FIG. 25A according to some embodiments.

FIG. 25C illustrates a continued partial section view of FIG. 25B according to some embodiments.

FIG. 26 illustrates a plan view of four high energy density capacitor modules according to some embodiments.

FIG. 27 illustrates an elevation view of a high energy density capacitor module according to some embodiments.

FIG. 28 illustrates an elevation view of a high energy density capacitor module according to some embodiments.

FIG. 29 illustrates a partial plan view enlarged of FIG. 26 according to some embodiments.

FIG. 30 illustrates a partial section view of FIG. 29 according to some embodiments.

FIG. 31 illustrates a partial elevation of FIG. 30 according to some embodiments.

FIG. 32A illustrates a partial section view of FIG. 29 according to some embodiments.

FIG. 32B illustrates a continued partial section view of FIG. 32A according to some embodiments.

FIG. 32C illustrates a continued partial section view of FIG. 32B according to some embodiments.

FIG. 33 illustrates a plan view of three high energy density capacitor modules according to some embodiments.

FIG. 34A illustrates a elevation view of FIG. 33 according to some embodiments.

FIG. 34B illustrates a continued elevation view of FIG. 34A according to some embodiments.

FIG. 35A illustrates partial elevation view of FIG. 33 according to some embodiments.

FIG. 35B illustrates a partial elevation of FIG. 35A according to some embodiments.

FIG. 36 illustrates a partial plan view enlarged of FIG. 33 according to some embodiments.

FIG. 37 illustrates a partial plan view enlarged of FIG. 36 according to some embodiments.

FIG. 38 illustrates a partial section view of FIG. 37 according to some embodiments.

FIG. 39A illustrates a partial section view of FIG. 36 according to some embodiments.

FIG. 39B illustrates a continued partial section view of FIG. 39A according to some embodiments.

FIG. 39C illustrates a continued partial section view of FIG. 39B according to some embodiments.

FIG. 40 illustrates a partial plan enlarged view of FIG. 33 according to some embodiments.

FIG. 41 illustrates a partial plan view enlarged of FIG. 40 according to some embodiments.

FIG. 42A illustrates a partial section view of FIG. 41 according to some embodiments.

FIG. 42B illustrates a partial section continued from FIG. 42A according to some embodiments.

FIG. 43A illustrates a partial section view of FIG. 36 according to some embodiments.

FIG. 43B illustrates a continued partial section view of FIG. 39A according to some embodiments.

FIG. 43C illustrates a continued partial section view of FIG. 39B according to some embodiments.

FIG. 44 illustrates a plan view of a high energy density capacitor module according to some embodiments.

FIG. 45 illustrates a partial plan view enlarged of FIG. 44 according to some embodiments.

FIG. 46 illustrates a partial plan view enlarged of FIG. 45 according to some embodiments.

FIG. 47 illustrates a partial section view of FIG. 46 according to some embodiments.

FIG. 48A illustrates a partial section view of FIG. 45 according to some embodiments.

FIG. 48B illustrates a partial section view continued of FIG. 48A according to some embodiments.

FIG. 48C illustrates a partial section view continued of FIG. 48B according to some embodiments.

FIG. 49A illustrates an partial elevation view of FIG. 44 according to some embodiments.

FIG. 49B illustrates an elevation continued view of FIG. 49A according to some embodiments.

FIG. 50 illustrates a plan view of a high energy density capacitor module according to some embodiments.

FIG. 51 illustrates a partial plan view enlarged of FIG. 50 according to some embodiments.

FIG. 52 illustrates a partial view enlarged of FIG. 51 according to some embodiments.

FIG. 53 illustrates a partial section view of FIG. 52 according to some embodiments.

FIG. 54A illustrates a elevation view of FIG. 51 according to some embodiments.

FIG. 54B illustrates a continued elevation view of FIG. 54A according to some embodiments.

FIG. 54C illustrates a continued elevation view of FIG. 54B according to some embodiments.

FIG. 55A illustrates an elevation section view of FIG. 50 according to some embodiments.

FIG. 55B illustrates a continued elevation section continued view of FIG. 55A according to some embodiments.

FIG. 58 illustrates an enlarged plan view of the circular portion 9 of FIG. 7 at a cross-sectional depth of the line 58 shown in FIG. 59B according to some embodiments.

FIGS. 59A-59D illustrate an enlarged elevation cross-sectional view at the line 59B of FIG. 58 according to some embodiments.

FIG. 60 illustrates a partial plan view of the rectangular area 11' illustrated in FIG. 58 according to some embodiments.

FIG. 61 illustrates a partial enlarged section view of the circular portion 12' shown in FIG. 60 according to some embodiments.

FIGS. 62A-F illustrate an enlarged view of the area 13' in FIG. 61 according to some embodiments.

FIG. 63 illustrates a plan or top view of a module of the layer of FIG. 16 according to some embodiments.

FIGS. 64A-D illustrate a cross-sectional view at the line 99 of FIG. 63 according to some embodiments.

FIG. 65 illustrates a cross-sectional view at the line 101 of FIG. 64C according to some embodiments.

FIGS. 66A-D illustrate an enlarged view of the area 106 in FIG. 66 according to some embodiments.

FIG. 67 illustrates a plan or top view of a module of the layer of FIG. 26 according to some embodiments.

FIGS. 68A-D illustrate a cross-sectional view at the line 113 of FIG. 67 according to some embodiments.

FIG. 69 illustrates a cross-sectional view at the line 115 of FIG. 68C according to some embodiments.

FIGS. 70A-D illustrate an enlarged view of the area 116 in FIG. 69 according to some embodiments.

FIG. 71 illustrates a plan or top view of a module of the layer of FIG. 33 according to some embodiments.

FIGS. 72A-D illustrate a cross-sectional view at the line 117 of FIG. 71 according to some embodiments.

FIG. 73 illustrates a cross-sectional view at the line 118 of FIG. 72C according to some embodiments.

FIGS. 74A-D illustrate an enlarged view of the area 119 in FIG. 73 according to some embodiments.

FIG. 75 illustrates a plan or top view of a module of the layer of FIG. 33 according to some embodiments.

FIGS. 76A-D illustrate a cross-sectional view at the line 120 of FIG. 75 according to some embodiments.

FIG. 77 illustrates a cross-sectional view at the line 121 of FIG. 76C according to some embodiments.

FIGS. 78A and 78B illustrate an enlarged view of the area 122 in FIG. 77 according to some embodiments.

DETAILED DESCRIPTION OF THE PRESENT INVENTION

Figure 1:
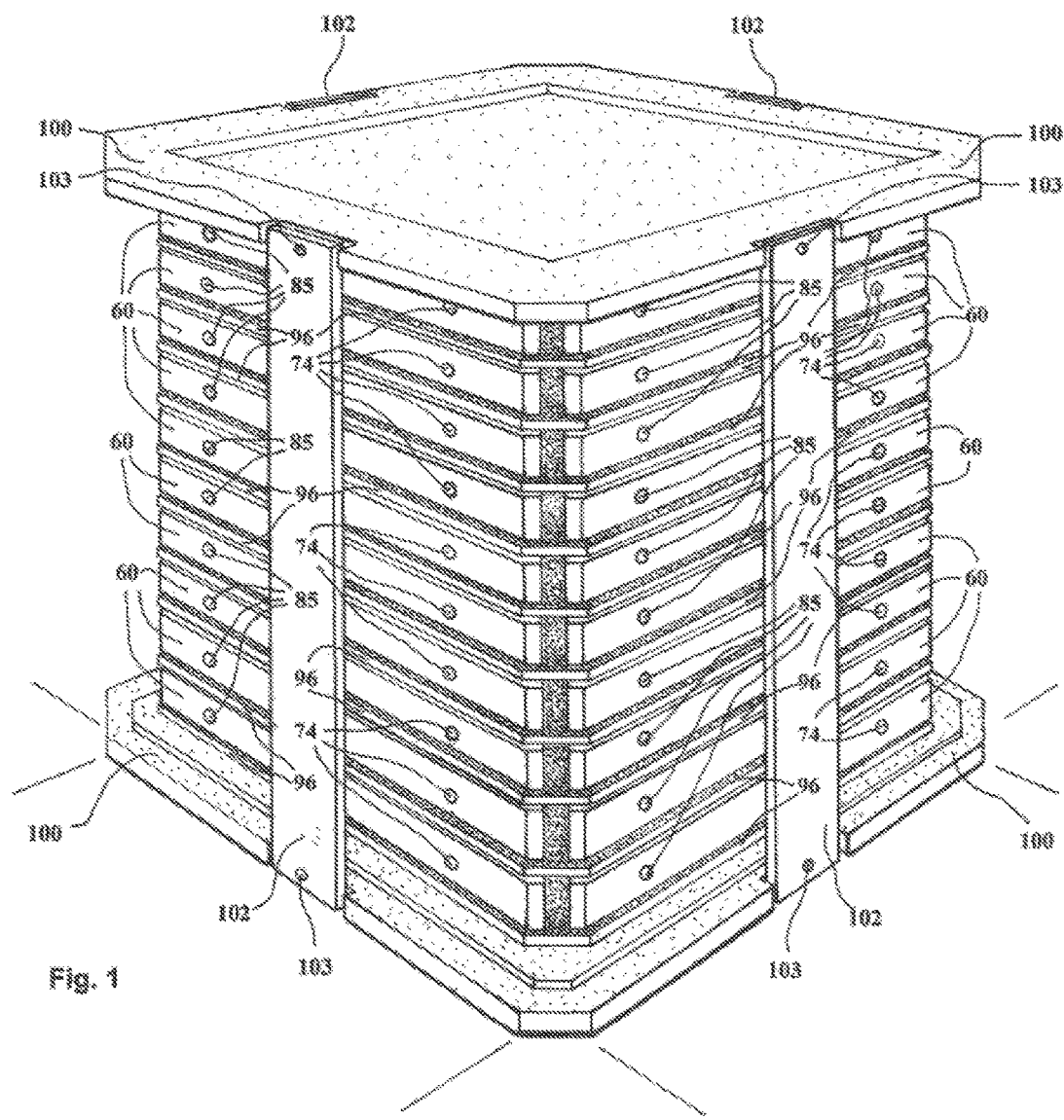
FIG. 1 illustrates a perspective view of a complete one liter high energy density capacitor system according to some embodiments.

Embodiments of the present invention are directed to a high energy density capacitor system. In order to increase the capacitance of the capacitor system, it is advantageous to increase the areas of the overlap of the positive and negative electrodes by the use of micrometer high aspect ratio of height to width structures and by decreasing the thickness of the dielectric material without causing a dielectric break down with the specified operating voltages and by the use of a dielectric material with a colossal permittivity and low electrical leakage material when the high energy capacitor is charged. Accordingly, the system is able to comprise one or more modules each including a first charged electrode having electrically conductive hub elements (e.g. 0.1976 to 100 micrometers in width and 0.025 to 10 centimeters in height or more), rim elements (e.g. 0.1976 to 100 micrometers in width and 0.025 to 10 centimeters in height or more) and spoke elements (e.g. 0.1976 to 100 micrometers in width and 0.025 to 10 centimeters in height or more). Groups of the rim elements encircle each of the hub elements and the spoke elements extend from the hub and electrically and structurally couple the rim elements to the hub. Each set of a hub, the rims encircling the hub and the spokes coupling the rims to the hub of the first electrode are able to be electrically coupled to a male or female electrical terminal connector.

Further, the modules are each able to include a second charged electrode having electrically conductive partial rim elements (e.g. 0.1976 to 100 micrometers in width and 0.025 to 10 centimeters in height or more) structurally protruding from and electrically coupled to each other by a slab element (e.g. 0.1976 to 100 micrometers in width and 0.025 to 10 centimeters in height or more) and electrically coupled to and/or ending in a male or female electrical terminal connector. In particular, the partial rim elements are able to protrude up from the slab such that they fill the gaps between the hub, rim and spoke elements of the first charged electrode. Alternatively, the first and/or second electrodes are able to comprise different size and shape elements that are symmetrical or asymmetrical. For example, instead of rim or partial rim elements, non-curved or straight elements (e.g. rows/columns) are able to be used.

Moreover, the modules are each able to comprise an electrical insulator element comprised of a giant-colossal dielectric thin film (e.g. 10 to 5000 nanometers thick) positioned in physical contact with and in between the first and second electrodes. In other words, the film is able to act as an insulating buffer between some or all of the adjacent surfaces of the first and second electrodes. Some of the class of the giant-colossal dielectric materials are described in "Electron-Pinned Defect-Dipoles for High-Performance Colossal Permittivity Materials," published online: 30 Jun. 2013, DOI 10.1038/ in Nature Materials with further disclosures in, for example, page 13 of WO 2013/037010 A1, "Development of Giant-Colossal Dielectric Constant Materials with Good Thermal Stability and Low Dielectric Loss," both of which are hereby incorporated by reference. Also, an overview of giant-colossal dielectric materials is given in "Dielectric Properties of Colossal Permittivity Materials: An Update," in the Journal of Energy and Power Engineering 7 (2013) pp. 726-732, which is hereby incorporated by reference. In some embodiments, the giant-colossal dielectric materials that are able to form the film are able to each comprise a controllable colossal and/or giant dielectric permittivity from $1.00 \times 10^4$ to $1.00 \times 10^6$ (or more). Alternatively, the giant-colossal dielectric materials that are able to form the film are able to each comprise other controllable permittivities known in the art. In some embodiments, the giant-colossal dielectric film fully covers, envelopes or encases the first charged electrode 70 (e.g. hub elements 76, spoke elements 77 and/or rim elements 78), the second charged electrode 80 (e.g. slab element 82 and/or partial rim elements 81) or both. In some embodiments, the giant-colossal dielectric materials forming the film are rutile titanium oxide doped at (0.05 indium and 0.05 niobium) and/or rutile titanium oxide doped at (0.05 aluminum and 0.05 niobium). Indeed, the above examples of giant-colossal dielectric materials provide the benefit of being the only known single layer giant-colossal dielectric material that does not precipitously leak the charges after being charged or doped. Alternatively, other giant-colossal dielectric materials or combinations thereof are able to be used as are known in the art. Each system and/or one or more modules 60 within a system are able to be coupled to one or more modules 60 in another system (or the same system) in parallel or series via the terminals, wherein the male and female terminals of different systems are able to electrically couple to each other in order to facilitate either the parallel or series electrical coupling.

FIG. 1 illustrates a perspective view of a high energy density capacitor system having female electrode terminals according to some embodiments. As shown in FIG. 1, the system comprises one or more high energy density capacitor modules 60 grouped in layers of four, wherein each layer is separated by electrically insulating gaskets 96 and all of the layers and gaskets 96 are positioned between two electrically insulating endplates 100. Alternatively, one or more of the layers are able to comprise more or less modules 60. As shown in FIG. 1 each of the modules 60 of each layer are physically spaced away from each other. Alternatively, one or more of the modules 60 of a layer are able to be positioned adjacent and/or in physical or electrical contact with each other. The endplates 100 are able to be coupled together (and the modules 60 and gaskets 96 held between the endplates 100) by one or more structural straps 102 and structural fasteners 103. Each of the modules 60 comprises a first electrode 70, a second electrode 80 and a giant-colossal dielectric thin film material. The first electrodes 70 each include one of the female terminals 74 and the second electrodes 80 each include one of the female terminals 85. Alternatively, one or more of the modules 60 are able to have male terminals 72, 83.

Figure 2:
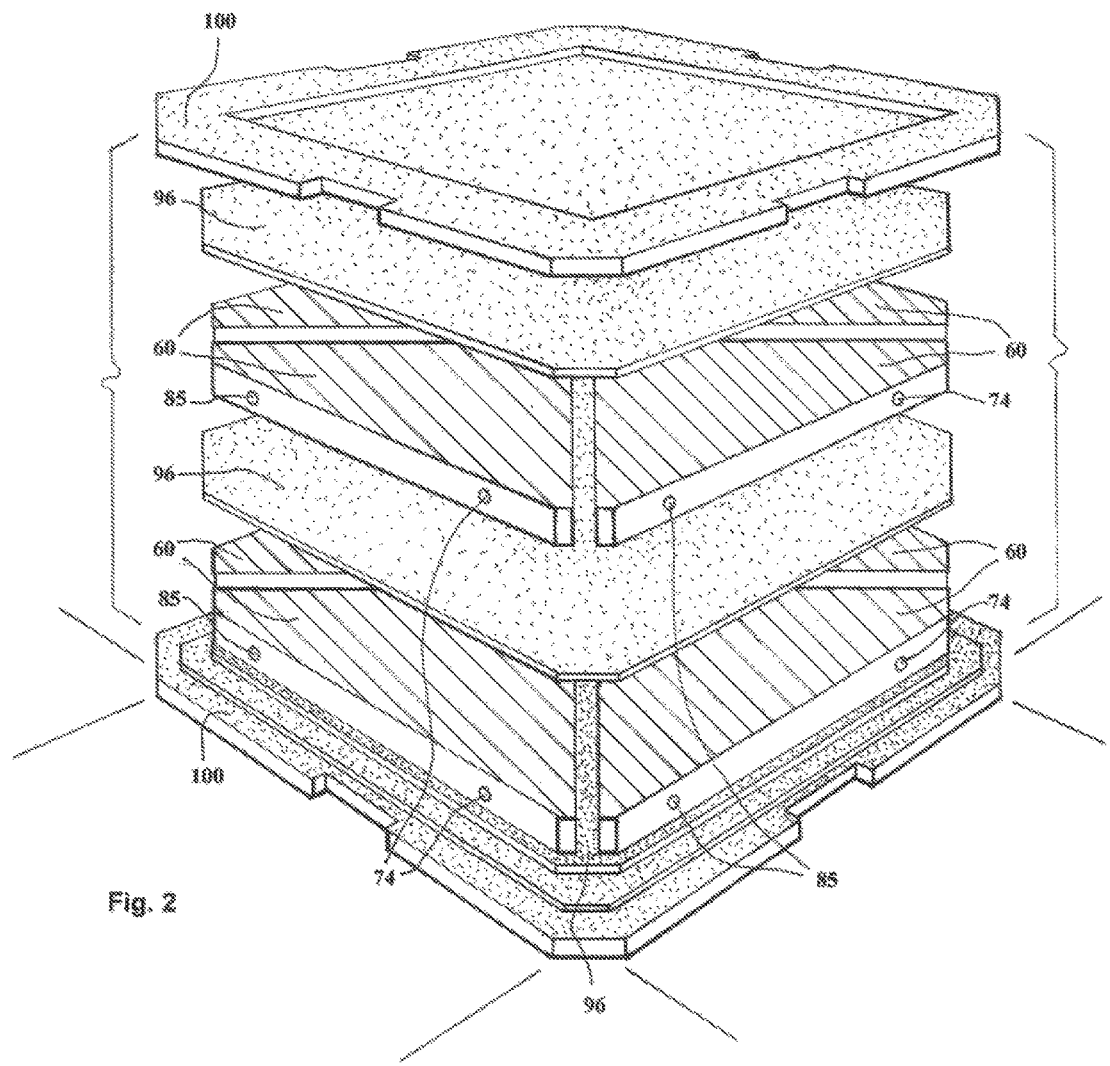
FIG. 2 illustrates an exploded perspective view of a high energy density capacitor system according to some embodiments.

FIG. 2 illustrates an exploded perspective view of two layers of the high energy density capacitor system shown in FIG. 1 according to some embodiments. As shown in FIG. 2, the modules 60 of each layer are able to be separated by a gap and the electrically insulating gaskets 96 are positioned between each of the layers and the first and last layers and the endplates 100. In some embodiments, the first electrode is a positive electrode and the second electrode is a negative electrode. Alternatively, the first electrode is able to be a negative electrode and the second electrode is able to be a positive electrode. In some embodiments, the high energy density system shown in FIGS. 1 and 2 is a one liter active area high energy density capacitor system having an overall size of fourteen centimeters in width and length and height for a total system volume of 2.74 liters with a approximate weight of seven to nine kilograms. For example, in some embodiments the system is able to be about six inches by six inches by six inches in a cubic structure, wherein each of the modules 60 is about one centimeter in height. Alternatively, other dimensions and/or numbers of modules 60, electrodes 70, 80, straps 102 and/or endplates 100 are contemplated.

Figure 3:
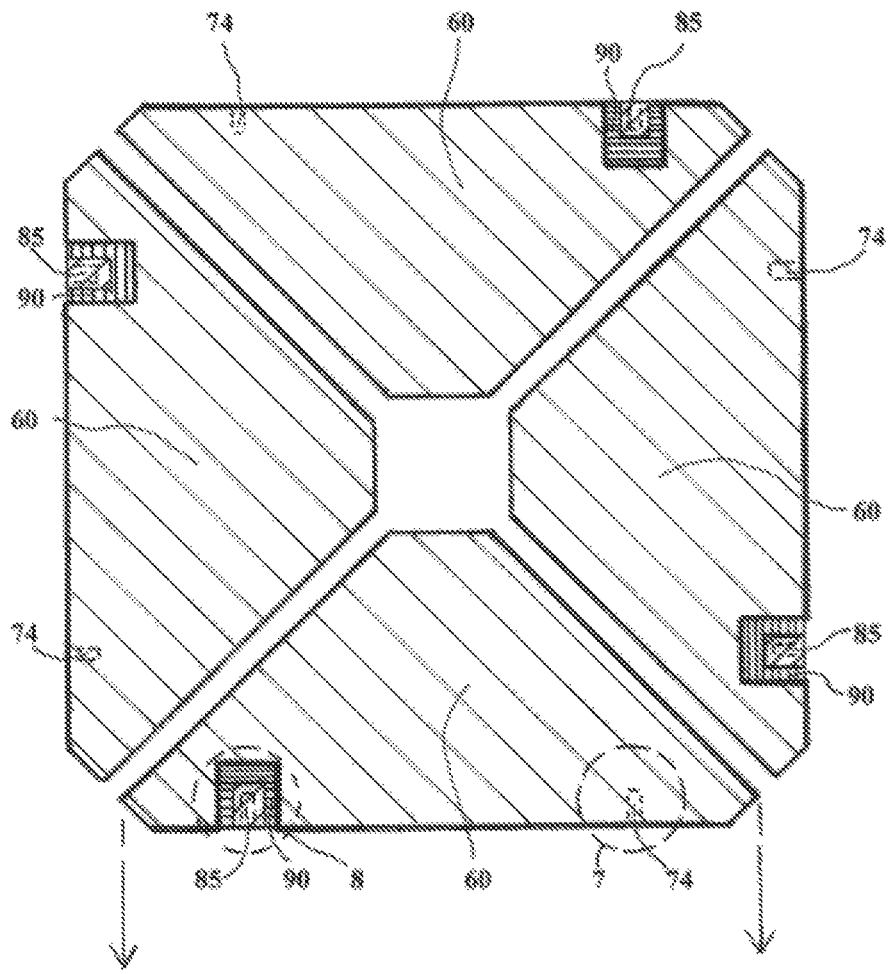
FIG. 3 illustrates a plan view of four high energy density capacitor modules according to some embodiments.
Figure 4:
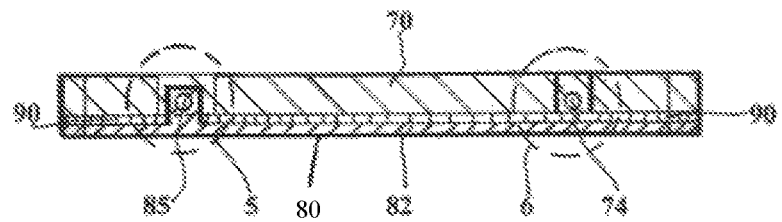
FIG. 4 illustrates an elevation view of one high energy density capacitor module according to some embodiments.

FIG. 3 illustrates a plan or top view and FIG. 4 illustrates an elevation or side view of one layer of modules 60 of the system of FIG. 1 according to some embodiments. As shown in FIGS. 3 and 4, the first electrode 70 and the second electrode 80 of each module 60 (which are electrically conductive) are separated by an electrically insulating film 90. In particular, the film is able to comprise giant-colossal dielectric material such that it is a giant-colossal dielectric film 90 that electrically isolates/insulates the first electrode 70 from the second electrode 80. In some embodiments, the thin film giant colossal dielectric elements 90 are able to be clear and/or translucent. In some embodiments, the giant colossal dielectric element film 90 has nanometer thickness (e.g. 10 to 5000 nanometers thick). Alternatively, the thickness is able to be greater or smaller. In some embodiments, the film 90 comprises a single layer of a single type of electrically insulating giant-colossal dielectric material. Alternatively, the film 90 is able to comprise a plurality of layers of the same or different electrically insulating giant-colossal dielectric materials, non-giant-colossal dielectric electrically insulating materials, or a combination thereof. Additionally, as shown in FIG. 4, the second electrode 80 comprises a slab portion 82 that physically and electrically couples together partial rim portions 81 (see FIGS. 9 and 10A-10C) of the second electrode 80 as well as the female terminal 85. In other words, the slab portion 82 of each of the modules 60 is able to serve as a supporting and connective base from which the partial rim elements 82 (or other shaped protrusions) of the second electrode 80 are able to extend between the gaps of the first electrode 70.

Figure 5:
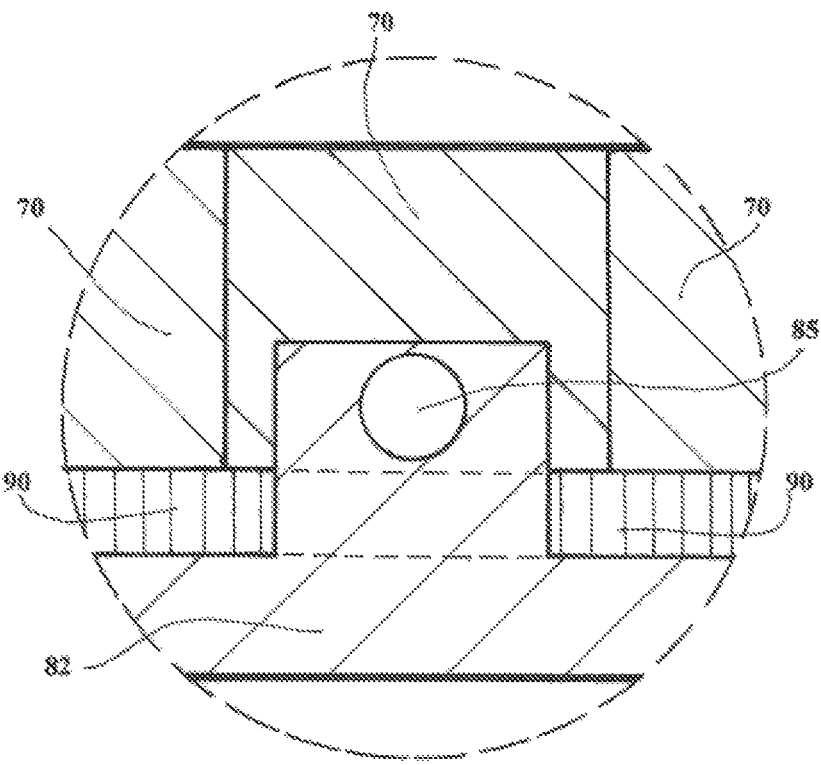
FIG. 5 illustrates an enlarged elevation view of the female terminal of the second charged electrode according to some embodiments.
Figure 6:
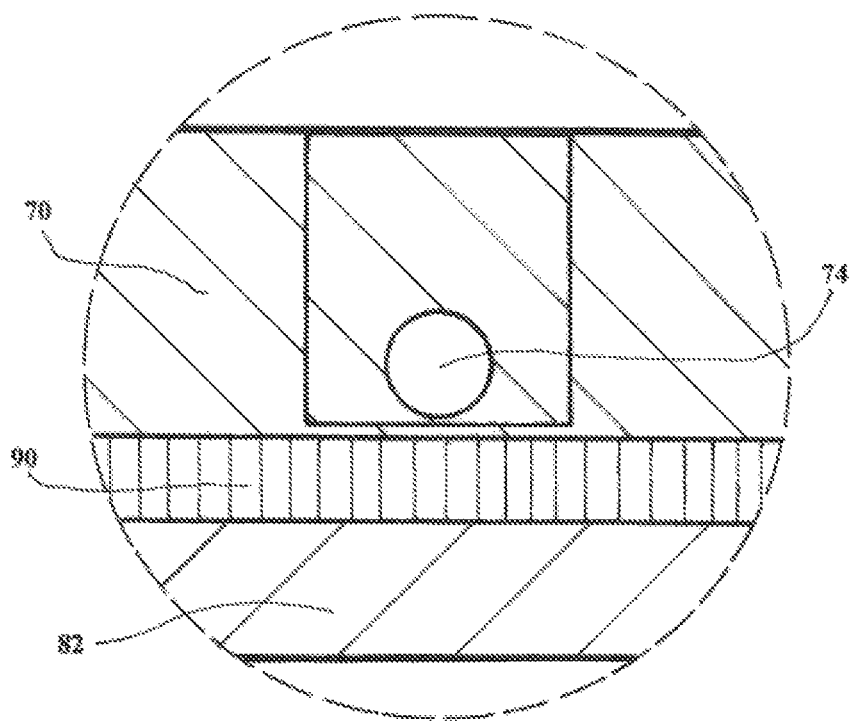
FIG. 6 illustrates an enlarged elevation view of the female terminal of the first charged electrode according to some embodiments.

FIG. 5 illustrates an enlarged partial elevation view of the portion 4 of the second charged electrode 80 shown in FIG. 4 according to some embodiments. As shown in FIG. 5, the second electrode 80 is able to comprise the female terminal element 85, the slab element 82, the first charged electrode 70 and the giant-colossal dielectric material sandwiched in between the second charged electrode 80 areas and the first charged electrode areas 70. Similarly, FIG. 6 illustrates an enlarged elevation view of the portion 5 of the first electrode 70 shown in FIG. 4 according to some embodiments. As shown in FIG. 6, the first charged electrode 70 is able to comprise the female ending terminal element 74 and the giant-colossal dielectric material sandwiched in between the second charged electrode 80 (e.g. slab element 82) and the first electrode 70.

Figure 7:
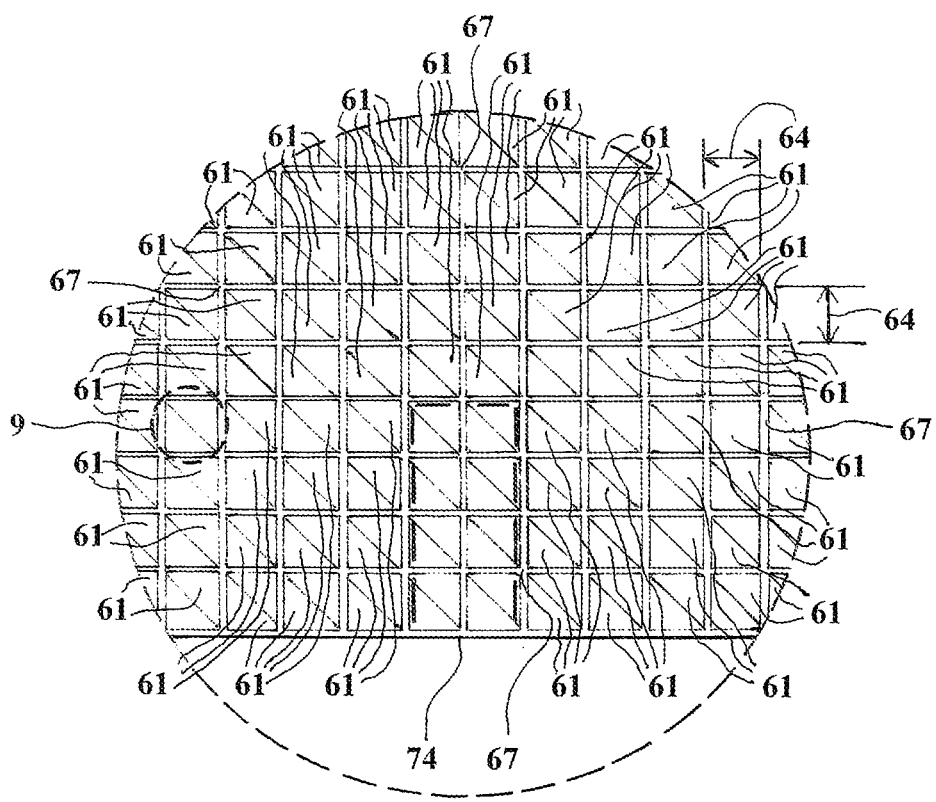
FIG. 7 illustrates an enlarged plan view of the surface area of the high energy density capacitor module according to some embodiments.
Figure 8:
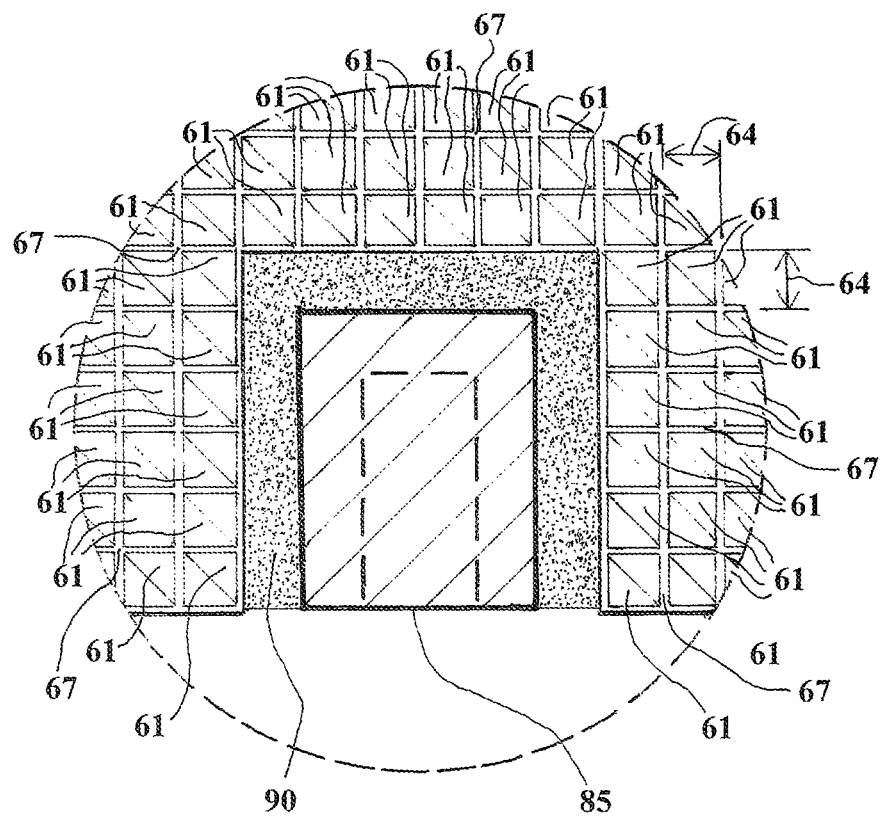
FIG. 8 illustrates an enlarged plan view of the surface area of the high energy density capacitor module according to some embodiments.

FIGS. 7 and 8 illustrate enlarged partial plan views of the circular portions 7 and 8, respectively, shown in FIG. 3 according to some embodiments. As shown in FIGS. 7 and 8, the surface of the module 60 is able to be divided into a plurality of areas 61 wherein each of those areas 61 are able to include a set of the elements (e.g. partial rim 81, hub 76, spoke 77, rim 78) that increase the surface area of the first electrode 70 and the second electrode 80 and in particular the amount of overlapping surface area where the first electrode 70 is adjacent to the second electrode 80 with only the film 90 in between. In some embodiments, as shown in FIG. 7, each of the areas 61 are surrounded by electrical bus bars 67 that electrically and/or physically couple to a female electrical terminal element 74, and shown in FIG. 8, each of the areas 61 are surrounded by electrical bus bars 67 that electrically and/or physically couple to a female electrical terminal element 85 and the film 90. In some embodiments, the areas 61 are able to be one square millimeter areas. Alternatively, the areas 61 are able to be larger or smaller sized squares or other shapes (e.g. circles, triangles, or other symmetrical and/or asymmetrical shapes as known in the art), wherein in any case the areas 61 are able to each include one set of the overlapping surface area increasing elements. As shown in FIGS. 7 and 8, the areas 61 form a grid. Alternatively, one or more of the areas 61 are able to be different shapes and/or sizes and/or form a grid or non-grid layout across the module 60.

FIG. 9 illustrates an enlarged plan view of the circular portion 9 of FIG. 7 according to some embodiments. FIGS. 10A-10C illustrate an enlarged elevation or cross-sectional view at the line 10A of FIG. 9 according to some embodiments. As shown in FIGS. 9 and 10A-10C, each of the areas 61 of the module 60 are able to comprise one or more partial rim elements 81 of the second electrode 80 protruding from the slab portion 82 to the surface through gaps in the first electrode 70, wherein the gaps are defined by a hub element 76 and one or more rim elements 78 electrically and physically coupled to the hub 76 via one or more spoke elements 77. As a result, each of the areas 61 is able to have a set of such elements that increase the overlapping surface area between the first and second electrodes 70, 80 via the added overlapping surface area between the partial rims 81 and the hub 76, spokes 77 and rims 78. Alternatively, as discussed above, the areas 61 are able to comprise different sets of elements having different shapes, sizes and/or locations that differently increase the overlapping surface area between the electrodes 70, 80. For example, although in FIGS. 9 and 10A-C, the elements comprise twenty partial rims 81, five rims 78, a single hub 76 and four spokes 77, more or less of one, some or all of the above elements are contemplated. For example, more spokes 77 are able to be used (see FIG. 22) and/or the spokes 77 are able to be evenly, symmetrically, unevenly or asymmetrically distributed around the hub 76.

Additionally, as shown in FIGS. 10A-10C, the film 90 is not only between adjacent portions of the slab 82 and the first electrode 70, but also between the partial rim elements 81 and the first electrode 70 including the hubs 76, the spokes 77 and the rims 78. Indeed, as described above, in some embodiments the film 90 covers the entire surface of both the first electrode 70 and the second electrode 80. Alternatively, portions of the module 60 (e.g. the outer surface of the module 60) are able to be uncovered by the film 90. In some embodiments, the area including the set of elements has a length 69 of 1200 micrometers and a width 69 of 1200 micrometers such that the total area 61 is 1,440,000 square micrometers. Alternatively, other sized areas are contemplated. In some embodiments, the film or coating 90 is clear or translucent, 800 nanometers thick and made of the giant-colossal dielectric material of titanium oxide doped with 0.5 niobium and 0.5 aluminum. Alternatively, the film 90 is able to be thicker or thinner, non-translucent or opaque, and/or made of one or a combination of different giant-colossal dielectric or other electrically insulating materials.

In some embodiments, the elements 76, 77, 78 and 81 are sized such that they have a high aspect ratio of height to width (or radius). For example, in some embodiments the hub elements 76, the spoke elements 77, the rim element 78 and/or the partial rim elements 81 have a height to width ratio of 100 (or greater) to 1 and/or the hub 76 has a height to radius ratio of 50 (or greater) to 1 such that they are able to be at least one hundred or fifty times taller than they are wide. Alternatively, one or more of the elements 76, 77, 78 and/or 81 are able to have lower height to width/radius ratios (e.g. 25 to 1 or greater or 10 to 1 or greater). Indeed, these high aspect ratios are beneficial because they increase overlapping surface area between the two electrodes 70, 80. In some embodiments, the hub element 76 has a radius of 200 micrometers, the spoke elements 77 have a width of 99.2 micrometers, the rim elements 78 have a width of 99.2 micrometers, and the partial rim elements 81 have a width of 100 micrometers. Alternatively, greater or smaller radiuses and/or widths are contemplated. In some embodiments, the height of one or more of the elements 76, 77, 78 and 81 is one centimeter (or 10,000 micrometers). Alternatively, the one or more of the elements 76, 77, 78 and 81 is able to be higher or lower.

FIG. 11 illustrates a partial plan view of the rectangular area 11 illustrated in FIG. 9 according to some embodiments. FIG. 12 illustrates a partial enlarged section view of the circular portion 12 shown in FIG. 11 according to some embodiments. FIGS. 13A and 13B illustrate an elevation or cross sectional view at the line 13A in FIG. 12 according to some embodiments. FIGS. 14A and 14B illustrate an elevation or cross sectional view at the line 14A in FIG. 12 according to some embodiments. As shown in FIGS. 11-14, the electrically insulating film 90 (including a giant-colossal dielectric material) is positioned between the first electrode 70 and the second electrode 80 in order to electrically insulate the first electrode 70 from the second electrode 80.

FIG. 58 illustrates an enlarged plan view of the circular portion 9 of FIG. 7 at a cross-sectional depth of the line 58 shown in FIG. 59B according to another embodiment. FIGS. 59A-59D illustrate an enlarged elevation or cross-sectional view at the line 59B of FIG. 58 according to some embodiments. FIGS. 58 and 59A-D are able to be substantially similar to the FIGS. 9 and 10A-C except for the differences illustrated or described herein. As shown in FIGS. 58 and 59A-D, each of the areas 61 of the module 60 are able to comprise one or more cooling channels 114, one or more full rim elements 71' protruding from a slab portion 73 of the first electrode 70 and one or more full rim elements 81' protruding from the slab portion 82 of the second electrode 80 such that the full rim elements 71', 81' interlock between the slab portions 73, 82. Specifically, like the slab portion 82 of the second electrode 80, the slab portion 73 of the first electrode 70 physically and electrically couples together full rim portions 71' of the first electrode 70 as well as the female terminal 74. In other words, the slab portions 73, 82 of each of the modules 60 are able to serve as a supporting and connective base from which the full rim elements 73, 82 (or other shaped protrusions) of the second and first electrodes 70, 80 are able to extend and interweave. As a result, each of the areas 61 is able to have a set of such elements that increase the overlapping surface area between the first and second electrodes 70, 80 via the added overlapping surface area between the full rims 71', 81'. Alternatively, as discussed above, the areas 61 are able to comprise different sets of elements having different shapes, sizes and/or locations that differently increase the overlapping surface area between the electrodes 70, 80. For example, although in FIGS. 58 and 59A-D the elements comprise six full rims 81' and five full rims 71', more or less of one or both of the above elements are contemplated. In some embodiments, the area including the set of elements has a length 64 of 1250 micrometers and a width 64 of 1250 micrometers. Alternatively, other sized areas (square or non-square) are contemplated. Additionally, it should be noted that although in FIG. 58 the bus bars 67 are only illustrated adjacent to two sides of the area 61, the bus bars 67 are able to be adjacent to any number of the sides of the area 61 including completely surrounding the area 61.

The cooling channels 114 are able to be partially or fully filled with a static cooling medium. Alternatively, the cooling channels 114 are able to be in communication with a cooling system (e.g. fan; pump) that causes the circulation of the cooling medium (e.g. air) through the cooling channels. Although five cooling channels 114 are illustrated in FIG. 58, more or less cooling channels 114 are contemplated. In some embodiments, the full rims 71', 81' are sized such that they have a high aspect ratio of height to width (or radius). For example, in some embodiments the full rims 71', 81' have a height to width ratio of 100 (or greater) to 1 such that they are able to be at least one hundred times taller than they are wide. In some embodiments, the rims 71', 81' are able to have a width of 100 micrometers or less. Indeed, these high aspect ratios are beneficial because they increase overlapping surface area between the two electrodes 70, 80. Alternatively, greater or smaller radiuses and/or widths are contemplated. In some embodiments, the height of one or more of the full rims 71', 81' is one centimeter (or 10,000 micrometers). Alternatively, the one or more of the rims 71', 81' are able to be higher or lower.

The slab elements 73, 82 are able to have heights 79, 89 that correspond to desired operating voltage and/or amperage values of an electrical charging system used to charge the system. In some embodiments, the slab heights 79, 89 are able to be equal to the electrode full rim heights 68. Alternatively, the slab heights 78, 89 are able to be greater or less than the full rim heights 68. As described above, the full rim heights 68 are able to be one hundred times or more taller than their widths (e.g. 1000 microns vs. 10 microns).

FIG. 60 illustrates a partial plan view of the rectangular area 11' illustrated in FIG. 58 according to some embodiments. FIG. 61 illustrates a partial enlarged section view of the circular portion 12' shown in FIG. 60 according to some embodiments. FIGS. 62A-F illustrate an enlarged view of the area 13' in FIG. 61 according to some embodiments. As shown in FIGS. 60, 61 and 62A-F, the electrically insulating film 90 (including a giant-colossal dielectric material) is positioned between the first electrode 70 and the second electrode 80 (including between the protrusions 71' and the apertures 81') in order to electrically insulate the first electrode 70 from the second electrode 80. Further, the film 90 comprises a giant-colossal dielectric material 95 sandwiched between a layer of low leakage dielectric material 92 and a layer of high break down dielectric material 94. In some embodiments, the film 90 is able to be 800 to 1200 nanometers in thickness. Alternatively, the film 90 is able to be thicker or thinner. The film 90 is able to have a high permittivity constant of 50,000 to 1,000,000 or more and a high breakdown element of 0.5 to 2 volts per nanometer of thickness or more, as well as a low electronic leakage element of 0.5 percent or less with a low probability of electronic tunneling.

The low leakage dielectric material 92 is able to be a single material solid solution and/or a super lattice of alternating materials. In some embodiments, the layer 92 has a thickness of 10 to 300 nanometers. Alternatively, the layer 92 is able to be thicker or thinner. The high break down dielectric material 94 is able to be a single material element (e.g. $TiO_2$) and/or a super lattice of dielectric materials. In some embodiments, the layer 94 has a thickness of 10 to 300 nanometers. Alternatively, the layer 94 is able to be thicker or thinner. The giant-colossal dielectric material 95 is able to be a single material element and/or a super lattice of giant-colossal dielectric materials. In some embodiments, the layer 95 has a thickness of 10 to 300 nanometers. Alternatively, the layer 95 is able to be thicker or thinner. Although the film 90 having multiple layers 92, 94, 95 is described in reference to FIGS. 62A-F, the film 90 is able to have a similar structure in the other embodiments described herein.

Figure 15:
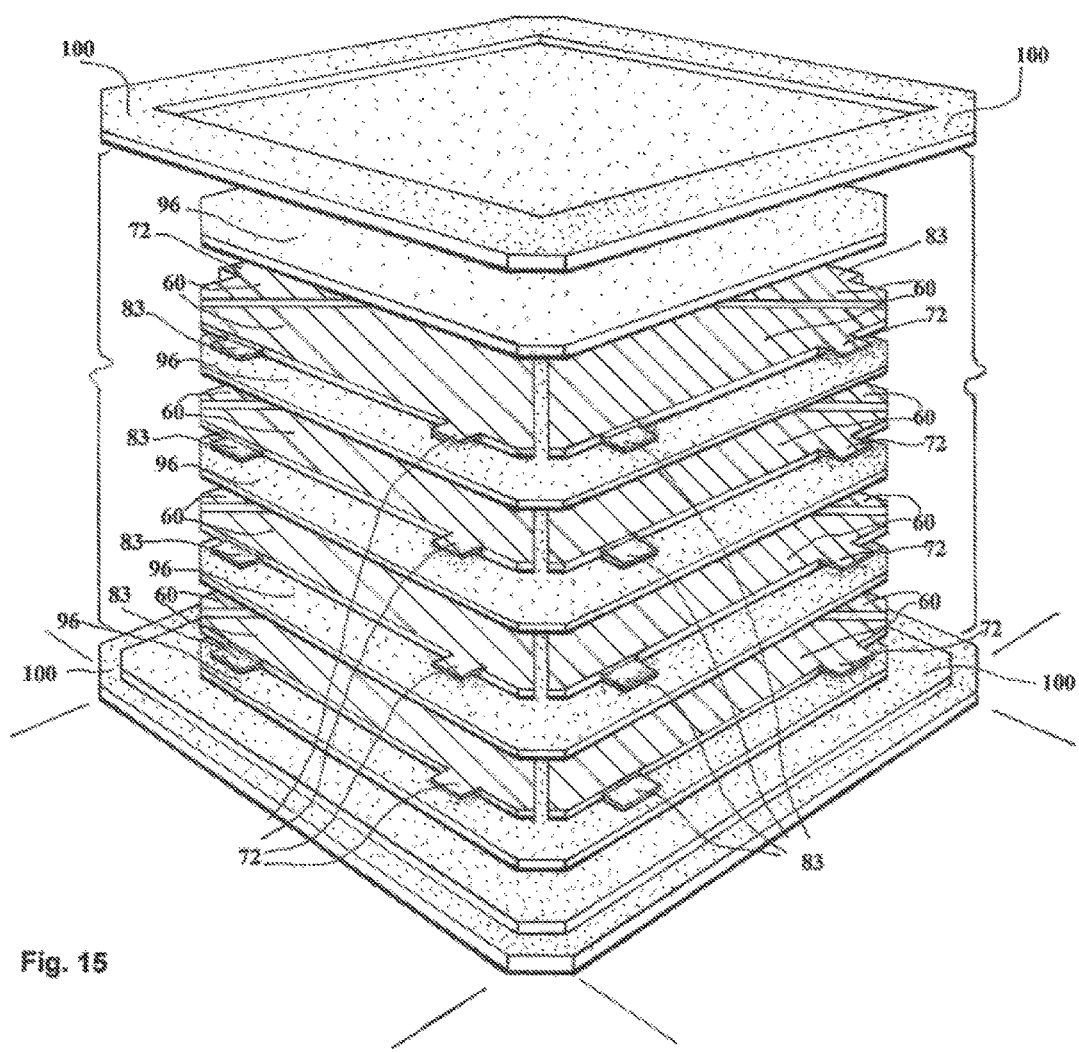
FIG. 15 illustrates an exploded perspective view of a high energy density capacitor system according to some embodiments.

FIG. 15 illustrates an exploded perspective view of a high energy density capacitor system having male electrode terminals according to some embodiments. As shown in FIG. 15, the system comprises one or more high energy density capacitor modules 60 grouped in layers of four, wherein each layer is separated by electrically insulating gaskets 96 and all of the layers and gaskets 96 are positioned between two electrically insulating endplates 100. Alternatively, one or more of the layers are able to comprise more or less modules 60. As shown in FIG. 1 each of the modules 60 of each layer are physically spaced away from each other.

Alternatively, one or more of the modules 60 of a layer are able to be positioned adjacent and/or in physical or electrical contact with each other. The endplates 100 are able to be coupled together (and the modules 60 and gaskets 96 held between the endplates 100) by one or more structural straps 102 and structural fasteners 103. Each of the modules 60 comprises a first electrode 70, a second electrode 80 and a giant-colossal dielectric thin film material. The first electrodes 70 each include one of the male terminals 72 and the second electrodes 80 each include one of the male terminals 83. Alternatively, female terminals 74, 85 are able to be used for one or more of the modules 60. In some embodiments, each module 60 is one millimeter in height and/or the terminals 72, 83 are half a millimeter in height. Alternatively, each module 60 and/or terminal 72, 83 is able to have a greater or lesser height. In some embodiments, the system of FIG. 15 is able to be substantially similar to the system of FIG. 1 except for the differences described herein.

FIG. 16 illustrates a plan or top view and FIG. 17 illustrates an elevation or side view of one layer of modules 60 of the system of FIG. 15 according to some embodiments. As shown in FIGS. 16 and 17, the first electrode 70 and the second electrode 80 of each module 60 (which are electrically conductive) are separated by an electrically insulating film 90. In particular, the film is able to comprise giant-colossal dielectric material such that it is a giant-colossal dielectric film 90 that electrically isolates/insulates the first electrode 70 from the second electrode 80. In some embodiments, the thin film giant colossal dielectric elements 90 are able to be clear and/or translucent. In some embodiments, the giant colossal dielectric element film 90 has nanometer thickness (e.g. 10 to 5000 nanometers thick). Alternatively, the thickness is able to be greater or smaller. In some embodiments, the film 90 comprises a single layer of a single type of electrically insulating giant-colossal dielectric material. Alternatively, the film 90 is able to comprise a plurality of layers of the same or different electrically insulating giant-colossal dielectric materials, non-giant-colossal dielectric electrically insulating materials, or a combination thereof. Additionally, as shown in FIG. 17, the second electrode 80 comprises a slab portion 82 that physically and electrically couples together partial rim portions 81 of the second electrode 80 as well as the male terminal 83. In other words, the slab portion 82 of each of the modules 60 is able to serve as a supporting and connective base from which the partial rim elements 81 (or other shaped protrusions) of the second electrode 80 are able to extend between the gaps of the first electrode 70.

Figure 18:
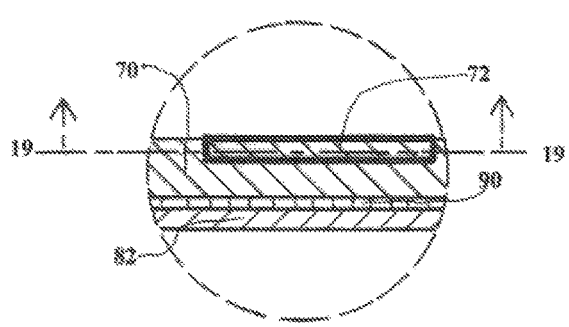
FIG. 18 illustrates an enlarged elevation view of the ending male terminal of FIG. 15 according to some embodiments.
Figure 19:
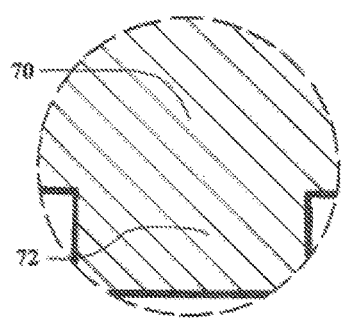
FIG. 19 illustrates a section view of the male electrode terminal of FIG. 18 according to some embodiments.
Figure 20:
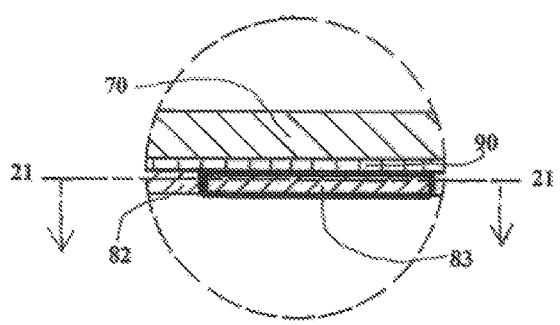
FIG. 20 illustrates an enlarge elevation view of the ending male terminal of FIG. 15 according to some embodiments.
Figure 21:
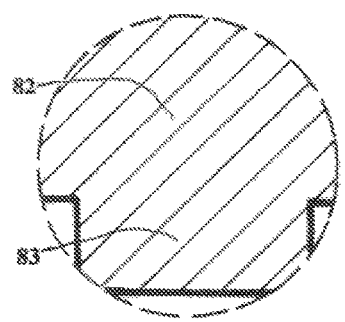
FIG. 21 illustrates a section view of the second charged electrode ending male terminal of FIG. 20 according to some embodiments.

FIG. 18 illustrates an enlarged partial elevation view of the portion 18 of the module 60 shown in FIG. 17 according to some embodiments. As shown in FIG. 18, the first charged electrode 70 is able to comprise the male ending terminal element 72, with the giant-colossal dielectric material 90 being sandwiched in between the second charged electrode 80 (e.g. slab element 82) and the first electrode 70. Similarly, FIG. 20 illustrates an enlarged elevation view of the portion 20 of the module 60 shown in FIG. 17 according to some embodiments. As shown in FIG. 20, the second electrode 80 is able to comprise the male terminal element 83 and the slab element 82, wherein the giant-colossal dielectric material 90 is sandwiched in between the second charged electrode 80 areas and the first charged electrode areas 70. FIGS. 19 and 21 illustrate enlarged partial plan views of the circular portions 19 and 21, respectively, shown in FIG. 16 at the cross sectional depths 19 and 21, respectively shown in FIGS. 18 and 20 according to some embodiments. As shown in FIGS. 19 and 21, the male terminal 72 protrudes out from the remainder of the first electrode 70 and the male terminal 83 protrudes out from the remainder or slab 82 of the second electrode 80.

FIG. 22 illustrates a plan or top view of a portion 22 shown in FIG. 16 according to some embodiments. In particular, like the areas 61 shown in FIGS. 7-9, the portion 22 is able to comprise a set of elements illustrated in FIG. 22 wherein the surface of the electrode module 60 of FIG. 16 is able to comprise a plurality of portions 22 in a grid, array or other symmetric or asymmetric formation. Also like in FIG. 9, these portions 22 and the elements therein increase the overlapping surface area between the two electrodes 70, 80. In some embodiments, the portions 22 are able to be one square millimeter areas. Alternatively, the portions 22 are able to be larger or smaller sized squares or other shapes (e.g. circles, triangles, or other symmetrical and/or asymmetrical shapes as known in the art), wherein in any case the portions 22 are able to each include one set of the overlapping surface area increasing elements.

FIGS. 25A-25C illustrate an enlarged elevation or cross-sectional view at the line 25A of FIG. 22 according to some embodiments. As shown in FIGS. 22 and 25A-25C, each of the portions 22 of the module 60 are able to comprise one or more partial rim elements 81 of the second electrode 80 protruding from the slab portion 82 to the surface through gaps in the first electrode 70, wherein the gaps are defined by a hub element 76 and one or more rim elements 78 electrically and physically coupled to the hub 76 via one or more spoke elements 77. As a result, each of the portions 22 is able to have a set of such elements that increase the overlapping surface area between the first and second electrodes 70, 80 via the added overlapping surface area between the partial rims 81 and the hub 76, spokes 77 and rims 78. Alternatively, as discussed above, the portions 22 are able to comprise different sets of elements having different shapes, sizes and/or locations that differently increase the overlapping surface area between the electrodes 70, 80. For example, although in FIGS. 22 and 25A-25C, the elements comprise thirty-two partial rims 81, three rims 78 (some partially not shown), a single hub 76 and eight spokes 77, more or less of one, some or all of the above elements are contemplated. Also, the spokes 77 are able to be evenly, symmetrically, unevenly or asymmetrically distributed around the hub 76.

Additionally, as shown in FIGS. 25A-25C, the film 90 is not only between adjacent portions of the slab 82 and the first electrode 70, but also between the partial rim elements 81 and the first electrode 70 including the hubs 76, the spokes 77 and the rims 78. Indeed, as described above, in some embodiments the film 90 covers the entire surface of both the first electrode 70 and the second electrode 80. Alternatively, portions of the module 60 (e.g. the outer surface of the module 60) are able to be uncovered by the film 90. In some embodiments, the area including the set of elements has a length of 1200 micrometers and a width of 1200 micrometers such that the total portion 22 is 1,440,000 square micrometers. Alternatively, other sized areas are contemplated. In some embodiments, the film or coating 90 is clear or translucent, 800 nanometers thick and made of the giant-colossal dielectric material of titanium oxide doped with 0.5 niobium and 0.5 aluminum. Alternatively, the film 90 is able to be thicker or thinner, non-translucent or opaque, and/or made of one or a combination of different giant-colossal dielectric or other electrically insulating materials.

In some embodiments, the elements 76, 77, 78 and 81 are sized such that they have a high aspect ratio of height to width (or radius). For example, in some embodiments the spoke elements 77, the rim element 78 and/or the partial rim elements 81 have a height to width ratio of 100 (or greater) to 1 and/or the hub 76 has a height to radius ratio of 50 (or greater) to 1 such that they are at least one hundred or fifty times taller than they are wide. Alternatively, one or more of the elements 76, 77, 78 and/or 81 are able to have lower height to width/radius ratios (e.g. 25 to 1 or greater or 10 to 1 or greater). Indeed, these high aspect ratios are beneficial because they increase overlapping surface area between the two electrodes 70, 80. In some embodiments, the hub element 76 has a radius of 11.7 to 49.2 micrometers (or 3×11.7 to 3×49.2 micrometers), the spoke elements 77 have a width of 11.7 to 49.2 micrometers, the rim elements 78 have a width of 11.7 to 49.2 micrometers, and the partial rim elements 81 have a width of 11.7 to 49.2 micrometers. Alternatively, greater or smaller radiuses and/or widths are contemplated. In some embodiments, the height 62 of one or more of the elements 76, 77, 78 and 81 is able to be within the range of 0.025 to 10 centimeters (or more). Alternatively, the height of one or more of the elements 76, 77, 78 and 81 is able to be higher or lower. In some embodiments, the height 63 of the slab 82 is able to be within the range of 1% to 25%, smaller or larger, of the heights of the elements 76, 77, 78 and 81. Alternatively, the height 63 of the slab 82 is able to be higher or lower. In some embodiments, each of the second electrodes 80 comprise between nineteen and seventy-five partial rims 81 per square millimeter of the module 60 and/or each of the first electrodes 70 comprise between nineteen and seventy-five rims 78 per square millimeter of the module 60. Alternatively, more or less partial rims 81 and/or rims 78 per square millimeter of the module 60 are contemplated. In some embodiments, the partial rims 81 have a width of 12.5 to 50.0 micrometers and a height within the range of 0.01 to 10 centimeters (or more) (e.g. 1000 micrometers).

FIG. 23 illustrates a partial plan view of the circular area 23 illustrated in FIG. 22 according to some embodiments. FIG. 24 illustrates a cross section view of the circular portion 23 shown in FIG. 23 at the line 24 according to some embodiments. As shown in FIGS. 23 and 24, the electrically insulating film 90 (including a giant-colossal dielectric material) is positioned between the first electrode 70 and the second electrode 80 in order to electrically insulate the first electrode 70 from the second electrode 80.

FIG. 63 illustrates a plan or top view of a module 60 of the layer of FIG. 16 according to some embodiments. FIGS. 64A-D illustrate a cross-sectional view at the line 99 of FIG. 63 according to some embodiments. FIG. 65 illustrates a cross-sectional view at the line 101 of FIG. 64C according to some embodiments. As shown in FIGS. 64A-D and 65, the module 60 is able to comprise one or more peg elements 81" of the second electrode 80 protruding from the slab portion 82 into apertures 71" of the first electrode 70 with the film 90 in between the two. Alternatively, as discussed above, differently shaped, numbered, positioned and/or sized sets of elements 81" and correspondingly sized apertures 71" are able to be used. For example, although in FIGS. 64A-D and 65, the elements comprise sixteen peg element 81" and sixteen apertures 71" (within a square 1000 micrometer×1000 micrometer area), more or less of one, some or all of the above elements are contemplated. Also, the pegs/apertures 81",71" are able to be evenly, symmetrically, unevenly or asymmetrically distributed. Further, similar to the elements 71, 81 described above, the elements 71", 81" are able to be sized such that they have a high aspect ratio of height to width (e.g. 100 to 1).

FIGS. 66A-D illustrate an enlarged view of the area 106 in FIG. 66 according to some embodiments. As shown in FIGS. 64A-D, 65 and 66A-D, the electrically insulating film 90 (including a giant-colossal dielectric material) is positioned between the first electrode 70 and the second electrode 80 (including between the protrusions 71" and the apertures 81") in order to electrically insulate the first electrode 70 from the second electrode 80. Further, the film 90 comprises a giant-colossal dielectric material 95 sandwiched between a layer of low leakage dielectric material 92 and a layer of high break down dielectric material 94. In some embodiments, the film 90 is able to be 100 to 900 or 800 to 1200 nanometers in thickness. Alternatively, the film 90 is able to be thicker or thinner. The film 90 is able to have a high permittivity constant of 50,000 to 1,000,000 or more and a high breakdown element of 0.5 to 2 volts per nanometer of thickness or more, as well as a low electronic leakage element of 0.5 percent or less with a low probability of electronic tunneling.

The low leakage dielectric material 92 is able to be a single material solid solution and/or a super lattice of alternating materials. In some embodiments, the layer 92 has a thickness of 10 to 300 nanometers. Alternatively, the layer 92 is able to be thicker or thinner. The high break down dielectric material 94 is able to be a single material element (e.g. $TiO_2$) and/or a super lattice of dielectric materials. In some embodiments, the layer 94 has a thickness of 10 to 300 nanometers. Alternatively, the layer 94 is able to be thicker or thinner. The giant-colossal dielectric material 95 is able to be a single material element and/or a super lattice of giant-colossal dielectric materials. In some embodiments, the layer 95 has a thickness of 50 to 300 or 10 to 300 nanometers. Alternatively, the layer 95 is able to be thicker or thinner. Although the film 90 having multiple layers 92, 94, 95 is described in reference to FIGS. 66A-D, the film 90 is able to have a similar structure in the other embodiments described herein.

FIG. 26 illustrates a plan or top view and FIGS. 27 and 28 illustrate an elevation or side view of one layer of modules 60 forming a circular shape according to some embodiments. The modules of FIGS. 26-28 are able to be substantially similar to the modules 60 of FIGS. 1 and 15 except for the differences described herein. Specifically, as shown in FIG. 26, the modules are able to have curved exteriors and interiors as seen from the top view. In some embodiments, the modules 60 each have a height of 1.5 centimeters as shown in FIGS. 27 and 28. Alternatively, the modules 60 are able to have greater or smaller heights. Although, FIGS. 26-28 illustrate male terminals 72, 83 for each module 60, female terminals 74, 85 are able to be used.

FIG. 29 illustrates a plan or top view of a portion 29 shown in FIG. 26 according to some embodiments. In particular, like the areas 61 shown in FIGS. 7-9 and portion 22, the portion 29 is able to comprise a set of elements illustrated in FIG. 29 wherein the surface of the electrode module 60 of FIG. 26 is able to comprise a plurality of portions 29 in a grid, array or other symmetric or asymmetric formation. Again, these portions 29 and the elements therein increase the overlapping surface area between the two electrodes 70, 80. In some embodiments, the portions 29 are able to be one square millimeter areas. Alternatively, the portions 29 are able to be larger or smaller sized squares or other shapes (e.g. circles, triangles, or other symmetrical and/or asymmetrical shapes as known in the art), wherein in any case the portions 29 are able to each include one set of the overlapping surface area increasing elements.

FIGS. 32A-32C illustrate an enlarged elevation or cross-sectional view at the line 32A of FIG. 32 according to some embodiments. As shown in FIGS. 29 and 32A-32C, each of the portions 29 of the module 60 are able to comprise one or more partial rim elements 81 of the second electrode 80 protruding from the slab portion 82 to the surface through gaps in the first electrode 70, wherein the gaps are defined by a hub element 76 and one or more rim elements 78 electrically and physically coupled to the hub 76 via one or more spoke elements 77. As a result, each of the portions 29 is able to have a set of such elements that increase the overlapping surface area between the first and second electrodes 70, 80 via the added overlapping surface area between the partial rims 81 and the hub 76, spokes 77 and rims 78. Alternatively, as discussed above, the portions 29 are able to comprise different sets of elements having different shapes, sizes and/or locations that differently increase the overlapping surface area between the electrodes 70, 80. For example, although in FIGS. 29 and 32A-32C, the elements comprise sixty-four partial rims 81, five rims 78 (some partially not shown), a single hub 76 and twelve spokes 77, more or less of one, some or all of the above elements are contemplated. Also, the spokes 77 are able to be evenly, symmetrically, unevenly or asymmetrically distributed around the hub 76.

Additionally, as shown in FIGS. 32A-32C, the film 90 is not only between adjacent portions of the slab 82 and the first electrode 70, but also between the partial rim elements 81 and the first electrode 70 including the hubs 76, the spokes 77 and the rims 78. Indeed, as described above, in some embodiments the film 90 covers the entire surface of both the first electrode 70 and the second electrode 80. Alternatively, portions of the module 60 (e.g. the outer surface of the module 60) are able to be uncovered by the film 90. In some embodiments, the area including the set of elements has a length and width of 1200 micrometers such that the total portion 29 is 1,440,000 square micrometers. Alternatively, other sized areas are contemplated. In some embodiments, the film or coating 90 is clear or translucent, 800 nanometers thick and made of the giant-colossal dielectric material of titanium oxide doped with 0.5 niobium and 0.5 aluminum. Alternatively, the film 90 is able to be thicker or thinner, non-translucent or opaque, and/or made of one or a combination of different giant-colossal dielectric or other electrically insulating materials.

In some embodiments, the elements 76, 77, 78 and 81 are sized such that they have a high aspect ratio of height to width (or radius). For example, in some embodiments the spoke elements 77, the rim element 78 and/or the partial rim elements 81 have a height to width ratio of 100 (or greater) to 1 and/or the hub 76 has a height to radius ratio of 50 (or greater) to 1 such that they are at least one hundred or fifty times taller than they are wide. Alternatively, one or more of the elements 76, 77, 78 and/or 81 are able to have lower height to width/radius ratios (e.g. 25 to 1 or greater or 10 to 1 or greater). Indeed, these high aspect ratios are beneficial because they increase overlapping surface area between the two electrodes 70, 80. In some embodiments, the hub element 76 has a radius of 3.925 to 11.7 micrometers (or 3×3.925 to 3×11.7 micrometers), the spoke elements 77 have a width of 3.925 to 11.7 micrometers, the rim elements 78 have a width of 3.925 to 11.7 micrometers, and the partial rim elements 81 have a width of 3.925 to 11.7 micrometers. Alternatively, greater or smaller radiuses and/or widths are contemplated. In some embodiments, the height 62 of one or more of the elements 76, 77, 78 and 81 is 0.025 to 10 centimeters. Alternatively, the height of one or more of the elements 76, 77, 78 and 81 is able to be higher or lower. In some embodiments, the height 63 of the slab 82 is able to be within the range of 1% to 25%, smaller or larger, of the heights of the elements 76, 77, 78 and 81. Alternatively, the height 63 of the slab 82 is able to be higher or lower. In some embodiments, each of the second electrodes 80 comprise between 254 and seventy-four partial rims 81 per square millimeter of the module 60 and/or each of the first electrodes 70 comprise between 254 to seventy-four rims 78 per square millimeter of the module 60. Alternatively, more or less partial rims 81 and/or rims 78 per square millimeter of the module 60 are contemplated.

FIG. 30 illustrates a partial plan view of the circular area 30 illustrated in FIG. 29 according to some embodiments. FIG. 31 illustrates a cross section view of the circular portion 30 shown in FIG. 30 at the line 31 according to some embodiments. As shown in FIGS. 30 and 31, the electrically insulating film 90 (including a giant-colossal dielectric material) is positioned between the first electrode 70 and the second electrode 80 in order to electrically insulate the first electrode 70 from the second electrode 80.

FIG. 67 illustrates a plan or top view of a module 60 of the layer of FIG. 26 according to some embodiments. FIGS. 68A-D illustrate a cross-sectional view at the line 113 of FIG. 67 according to some embodiments. FIG. 69 illustrates a cross-sectional view at the line 115 of FIG. 68C according to some embodiments. As shown in FIGS. 68A-D and 69, the module 60 is able to comprise one or more square peg elements 81''' of the second electrode 80 protruding from the slab portion 82 into square apertures 71''' of the first electrode 70 with the film 90 in between the two. Alternatively, as discussed above, differently shaped, numbered, positioned and/or sized sets of elements 81''' and correspondingly sized apertures 71''' are able to be used. For example, although in FIGS. 68A-D and 69, the elements comprise sixteen peg elements 81''' and sixteen apertures 71''' (within a square 1000 micrometer×1000 micrometer area), more or less of one, some or all of the above elements are contemplated. Also, the pegs/apertures 81''',71''' are able to be evenly, symmetrically, unevenly or asymmetrically distributed. Further, similar to the elements 71'', 81'', described above, the elements 71''', 81''' are able to be sized such that they have a high aspect ratio of height to width (e.g. 100 to 1).

FIGS. 70A-D illustrate an enlarged view of the area 116 in FIG. 69 according to some embodiments. As shown in FIGS. 68A-D, 69 and 70A-D, the electrically insulating film 90 (including a giant-colossal dielectric material) is positioned between the first electrode 70 and the second electrode 80 (including between the protrusions 71''' and the apertures 81''') in order to electrically insulate the first electrode 70 from the second electrode 80. Further, the film 90 comprises a giant-colossal dielectric material 95 sandwiched between a layer of low leakage dielectric material 92 and a layer of high break down dielectric material 94. In some embodiments, the film 90 is able to be 100 to 900 or 800 to 1200 nanometers in thickness. Alternatively, the film 90 is able to be thicker or thinner. The film 90 is able to have a high permittivity constant of 50,000 to 1,000,000 or more and a high breakdown element of 0.5 to 2 volts per nanometer of thickness or more, as well as a low electronic leakage element of 0.5 percent or less with a low probability of electronic tunneling.

The low leakage dielectric material 92 is able to be a single material solid solution and/or a super lattice of alternating materials. In some embodiments, the layer 92 has a thickness of 10 to 300 nanometers. Alternatively, the layer 92 is able to be thicker or thinner. The high break down dielectric material 94 is able to be a single material element (e.g. $TiO_2$) and/or a super lattice of dielectric materials. In some embodiments, the layer 94 has a thickness of 10 to 300 nanometers. Alternatively, the layer 94 is able to be thicker or thinner. The giant-colossal dielectric material 95 is able to be a single material element and/or a super lattice of giant-colossal dielectric materials. In some embodiments, the layer 95 has a thickness of 50 to 300 or 10 to 300 nanometers. Alternatively, the layer 95 is able to be thicker or thinner. Although the film 90 having multiple layers 92, 94, 95 is described in reference to FIGS. 70A-D, the film 90 is able to have a similar structure in the other embodiments described herein.

FIG. 33 illustrates a plan or top view and FIGS. 34A, 34B, 35A and 35B illustrate an elevation or side view of one layer of modules 60 forming a triangular shape according to some embodiments. The modules of FIGS. 33-35 are able to be substantially similar to the modules 60 of FIGS. 1 and 15 except for the differences described herein. Specifically, as shown in FIG. 33, the modules are able to have acutely angled exteriors such that together they form a triangular perimeter as seen from the top view. In some embodiments, the modules 60 each have a height of 2.5 to 5.5 centimeters as shown in FIGS. 34A, 34B, 35A and 35B. Alternatively, the modules 60 are able to have greater or smaller heights. Although, FIGS. 33-35 illustrate male terminals 72, 83 for each module 60, female terminals 74, 85 are able to be used.

FIG. 36 illustrates a plan or top view of a portion 36 shown in FIG. 33 according to some embodiments. In particular, like the areas 61 shown in FIGS. 7-9 and portions 22, 29, the portion 36 is able to comprise a set of elements illustrated in FIG. 36 wherein the surface of the electrode module 60 of FIG. 33 is able to comprise a plurality of portions 36 in a grid, array or other symmetric or asymmetric formation. These portions 36 and the elements therein increase the overlapping surface area between the two electrodes 70, 80. In some embodiments, the portions 36 are able to be one square millimeter areas. Alternatively, the portions 36 are able to be larger or smaller sized squares or other shapes (e.g. circles, triangles, or other symmetrical and/or asymmetrical shapes as known in the art), wherein in any case the portions 36 are able to each include one set of the overlapping surface area increasing elements.

FIGS. 39A-39C illustrate an enlarged elevation or cross-sectional view at the line 39A of FIG. 36 according to some embodiments. As shown in FIGS. 36 and 39A-39C, each of the portions 36 of the module 60 are able to comprise one or more partial rim elements 81 of the second electrode 80 protruding from the slab portion 82 to the surface through gaps in the first electrode 70, wherein the gaps are defined by a hub element 76 and one or more rim elements 78 electrically and physically coupled to the hub 76 via one or more spoke elements 77. As a result, each of the portions 36 is able to have a set of such elements that increase the overlapping surface area between the first and second electrodes 70, 80 via the added overlapping surface area between the partial rims 81 and the hub 76, spokes 77 and rims 78. Alternatively, as discussed above, the portions 36 are able to comprise different sets of elements having different shapes, sizes and/or locations that differently increase the overlapping surface area between the electrodes 70, 80. For example, although in FIGS. 36 and 39A-39C, the elements comprise twelve partial rims 81, three rims 78 (some partially not shown), a single hub 76 and four spokes 77, more or less of one, some or all of the above elements are contemplated. Also, the spokes 77 are able to be evenly, symmetrically, unevenly or asymmetrically distributed around the hub 76.

Additionally, as shown in FIGS. 39A-39C, the film 90 is not only between adjacent portions of the slab 82 and the first electrode 70, but also between the partial rim elements 81 and the first electrode 70 including the hubs 76, the spokes 77 and the rims 78. Indeed, as described above, in some embodiments the film 90 covers the entire surface of both the first electrode 70 and the second electrode 80. Alternatively, portions of the module 60 (e.g. the outer surface of the module 60) are able to be uncovered by the film 90. In some embodiments, the film or coating 90 is clear or translucent, 800 nanometers thick and made of the giant-colossal dielectric material of titanium oxide doped with 0.5 niobium and 0.5 aluminum. Alternatively, the film 90 is able to be thicker or thinner, non-translucent or opaque, and/or made of one or a combination of different giant-colossal dielectric or other electrically insulating materials.

In some embodiments, the elements 76, 77, 78 and 81 are sized such that they have a high aspect ratio of height to width (or radius). For example, in some embodiments the spoke elements 77, the rim element 78 and/or the partial rim elements 81 have a height to width ratio of 100 (or greater) to 1 and/or the hub 76 has a height to radius ratio of 50 (or greater) to 1 such that they are at least one hundred or fifty times taller than they are wide. Alternatively, one or more of the elements 76, 77, 78 and/or 81 are able to have lower height to width/radius ratios (e.g. 25 to 1 or greater or 10 to 1 or greater). Indeed, all these high aspect ratios are beneficial because they increase overlapping surface area between the two electrodes 70, 80. In some embodiments, the hub element 76 has a radius of 1.581 to 3.925 micrometers (or 5× 1.581 to 5× 3.925 micrometers), the spoke elements 77 have a width of 1.581 to 3.925 micrometers, the rim elements 78 have a width of 1.581 to 3.925 micrometers, and the partial rim elements 81 have a width of 1.581 to 3.925 micrometers. Alternatively, greater or smaller radiuses and/or widths are contemplated. In some embodiments, the height 62 of one or more of the elements 76, 77, 78 and 81 is 0.025 to 10 centimeters (or more). Alternatively, the height of one or more of the elements 76, 77, 78 and 81 is able to be higher or lower. In some embodiments, the height 63 of the slab 82 is able to be within the range of 1% to 25%, smaller or larger, of the heights of the elements 76, 77, 78 and 81. Alternatively, the height 63 of the slab 82 is able to be higher or lower. In some embodiments, each of the second electrodes 80 comprise between 254 to 632 partial rims 81 per square millimeter of the module 60 and/or each of the first electrodes 70 comprise between 254 to 632 rims 78 per square millimeter of the module 60. Alternatively, more or less partial rims 81 and/or rims 78 per square millimeter of the module 60 are contemplated.

FIG. 37 illustrates a partial plan view of the circular area 37 illustrated in FIG. 36 according to some embodiments. FIG. 38 illustrates a cross section view of the circular portion 37 shown in FIG. 37 at the line 38 according to some embodiments. As shown in FIGS. 37 and 38, the electrically insulating film 90 (including a giant-colossal dielectric material) is positioned between the first electrode 70 and the second electrode 80 in order to electrically insulate the first electrode 70 from the second electrode 80.

FIG. 40 illustrates a plan or top view of an alternate embodiment of the portion 36 shown in FIG. 33 according to some embodiments. In particular, like the areas 61 shown in FIGS. 7-9 and portions 22, 29, the portion 36 is able to comprise a set of elements illustrated in FIG. 40 wherein the surface of the electrode module 60 of FIG. 33 is able to comprise a plurality of portions 36 in a grid, array or other symmetric or asymmetric formation. These portions 36 and the elements therein increase the overlapping surface area between the two electrodes 70, 80. In some embodiments, the portions 36 are able to be one square millimeter areas. Alternatively, the portions 36 are able to be larger or smaller sized squares or other shapes (e.g. circles, triangles, or other symmetrical and/or asymmetrical shapes as known in the art), wherein in any case the portions 36 are able to each include one set of the overlapping surface area increasing elements.

FIGS. 43A-43C illustrate an enlarged elevation or cross-sectional view at the line 43A of FIG. 40 according to some embodiments. As shown in FIGS. 40 and 43A-43C, each of the portions 36 of the module 60 are able to comprise one or more partial rim elements 81 of the second electrode 80 protruding from the slab portion 82 to the surface through gaps in the first electrode 70, wherein the gaps are defined by a hub element 76 and one or more rim elements 78 electrically and physically coupled to the hub 76 via one or more spoke elements 77. As a result, each of the portions 36 is able to have a set of such elements that increase the overlapping surface area between the first and second electrodes 70, 80 via the added overlapping surface area between the partial rims 81 and the hub 76, spokes 77 and rims 78. Alternatively, as discussed above, the portions 36 are able to comprise different sets of elements having different shapes, sizes and/or locations that differently increase the overlapping surface area between the electrodes 70, 80. For example, although in FIGS. 40 and 43A-43C, the elements comprise twelve partial rims 81, four rims 78 (some partially not shown), a single hub 76 and three spokes 77, more or less of one, some or all of the above elements are contemplated. Also, the spokes 77 are able to be evenly, symmetrically, unevenly or asymmetrically distributed around the hub 76.

Additionally, as shown in FIGS. 43A-43C, the film 90 is not only between adjacent portions of the slab 82 and the first electrode 70, but also between the partial rim elements 81 of the second electrode 80 and the first electrode 70 including the hubs 76, the spokes 77 and the rims 78. Indeed, as described above, in some embodiments the film 90 covers the entire surface of both the first electrode 70 and the second electrode 80. Alternatively, portions of the module 60 (e.g. the outer surface of the module 60) are able to be uncovered by the film 90. In some embodiments, the film or coating 90 is clear or translucent, 400 nanometers thick and made of the giant-colossal dielectric material of titanium oxide doped with 0.5 niobium and 0.5 aluminum. Alternatively, the film 90 is able to be thicker or thinner, non-translucent or opaque, and/or made of one or a combination of different giant-colossal dielectric or other electrically insulating materials. In some embodiments, the operating voltage is limited to a maximum of 137.5 volts. For example, the operating voltage is able to be based on the thickness of the film 90, wherein the maximum voltage decreases as the thickness of the film 90 decreases.

In some embodiments, the elements 76, 77, 78 and 81 are sized such that they have a high aspect ratio of height to width (or radius). For example, in some embodiments the spoke elements 77, the rim element 78 and/or the partial rim elements 81 have a height to width ratio of 100 (or greater) to 1 and/or the hub 76 has a height to radius ratio of 50 (or greater) to 1 such that they are at least one hundred or fifty times taller than they are wide. Alternatively, one or more of the elements 76, 77, 78 and/or 81 are able to have lower height to width/radius ratios (e.g. 25 to 1 or greater or 10 to 1 or greater). Indeed, all these high aspect ratios are beneficial because they increase overlapping surface area between the two electrodes 70, 80. In some embodiments, the hub element 76 has a radius of 1.1905 to 1.981 micrometers (or 4.5× 1.1905 to 4.5×1.981 micrometers), the spoke elements 77 have a width of 1.1905 to 1.981 micrometers, the rim elements 78 have a width of 1.1905 to 1.981 micrometers, and the partial rim elements 81 have a width of 1.1905 to 1.981 micrometers. Alternatively, greater or smaller radiuses and/or widths are contemplated. In some embodiments, the height 62 of one or more of the elements 76, 77, 78 and 81 is 0.025 to 10 centimeters (or more). Alternatively, the height of one or more of the elements 76, 77, 78 and 81 is able to be higher or lower. In some embodiments, the height 63 of the slab 82 is able to be within the range of 1% to 25%, smaller or larger, of the heights of the elements 76, 77, 78 and 81. Alternatively, the height 63 of the slab 82 is able to be higher or lower. In some embodiments, each of the second electrodes 80 comprise between 836 to 504 partial rims 81 per square millimeter of the module 60 and/or each of the first electrodes 70 comprise between 836 to 504 rims 78 per square millimeter of the module 60. Alternatively, more or less partial rims 81 and/or rims 78 per square millimeter of the module 60 are contemplated.

FIG. 41 illustrates a partial plan view of the circular area 41 illustrated in FIG. 40 according to some embodiments. FIGS. 42A and 42B illustrate a cross section view of the circular portion 41 shown in FIG. 40 at the line 42A according to some embodiments. As shown in FIGS. 41, 42A and 42B, the electrically insulating film 90 (including a giant-colossal dielectric material) is positioned between the first electrode 70 and the second electrode 80 in order to electrically insulate the first electrode 70 from the second electrode 80.

FIG. 44 illustrates a plan or top view and FIGS. 49A and 49B illustrate an elevation or side view of one layer of modules 60 forming a triangular shape according to some embodiments. The module of FIGS. 44, 49A and 49B is able to be substantially similar to the modules 60 of FIGS. 1 and 15 except for the differences described herein. Although, FIGS. 44, 49A and 49B illustrate male terminals 72, 83 for each module 60, female terminals 74, 85 are able to be used.

FIG. 45 illustrates a plan or top view of a portion 45 shown in FIG. 44 according to some embodiments. In particular, like the areas 61 shown in FIGS. 7-9 and portions 22, 29, 36, the portion 45 is able to comprise a set of elements illustrated in FIG. 45 wherein the surface of the electrode module 60 of FIG. 44 is able to comprise a plurality of portions 45 in a grid, array or other symmetric or asymmetric formation. These portions 45 and the elements therein increase the overlapping surface area between the two electrodes 70, 80. In some embodiments, the portions 45 are able to be one square millimeter areas. Alternatively, the portions 45 are able to be larger or smaller sized squares or other shapes (e.g. circles, triangles, or other symmetrical and/or asymmetrical shapes as known in the art), wherein in any case the portions 45 are able to each include one set of the overlapping surface area increasing elements.

FIGS. 48A-48C illustrate an enlarged elevation or cross-sectional view at the line 49A of FIG. 45 according to some embodiments. As shown in FIGS. 45 and 48A-48C, each of the portions 45 of the module 60 are able to comprise one or more partial rim elements 81 of the second electrode 80 protruding from the slab portion 82 to the surface through gaps in the first electrode 70, wherein the gaps are defined by a hub element 76 and one or more rim elements 78 electrically and physically coupled to the hub 76 via one or more spoke elements 77. As a result, each of the portions 45 is able to have a set of such elements that increase the overlapping surface area between the first and second electrodes 70, 80 via the added overlapping surface area between the partial rims 81 and the hub 76, spokes 77 and rims 78. Alternatively, as discussed above, the portions 45 are able to comprise different sets of elements having different shapes, sizes and/or locations that differently increase the overlapping surface area between the electrodes 70, 80. For example, although in FIGS. 45 and 48A-48C, the elements comprise eight partial rims 81 (some partially not shown), four rims 78 (some partially not shown), a single hub 76 and two spokes 77, more or less of one, some or all of the above elements are contemplated. Also, the spokes 77 are able to be evenly, symmetrically, unevenly or asymmetrically distributed around the hub 76.

Additionally, as shown in FIGS. 48A-48C, the film 90 is not only between adjacent portions of the slab 82 and the first electrode 70, but also between the partial rim elements 81 and the first electrode 70 including the hubs 76, the spokes 77 and the rims 78. Indeed, as described above, in some embodiments the film 90 covers the entire surface of both the first electrode 70 and the second electrode 80. Alternatively, portions of the module 60 (e.g. the outer surface of the module 60) are able to be uncovered by the film 90. In some embodiments, the film or coating 90 is clear or translucent, 200 nanometers thick and made of the giant-colossal dielectric material of titanium oxide doped with 0.5 niobium and 0.5 aluminum. Alternatively, the film 90 is able to be thicker or thinner, non-translucent or opaque, and/or made of one or a combination of different giant-colossal dielectric or other electrically insulating materials. In some embodiments, the operating voltage is limited to a maximum of 68.75 volts. For example, the operating voltage is able to be based on the thickness of the film 90, wherein the maximum voltage decreases as the thickness of the film 90 decreases.

In some embodiments, the elements 76, 77, 78 and 81 are sized such that they have a high aspect ratio of height to width (or radius). For example, in some embodiments the spoke elements 77, the rim element 78 and/or the partial rim elements 81 have a height to width ratio of 100 (or greater) to 1 and/or the hub 76 has a height to radius ratio of 50 (or greater) to 1 such that they are at least one hundred or fifty times taller than they are wide. Alternatively, one or more of the elements 76, 77, 78 and/or 81 are able to have lower height to width/radius ratios (e.g. 25 to 1 or greater or 10 to 1 or greater). Indeed, all these high aspect ratios are beneficial because they increase overlapping surface area between the two electrodes 70, 80. In some embodiments, the hub element 76 has a radius of 0.5952 to 0.9905 micrometers (or 4× 0.5952 to 4×0.9905 micrometers), the spoke elements 77 have a width of 0.5952 to 0.9905 micrometers, the rim elements 78 have a width of 0.5952 to 0.9905 micrometers, and the partial rim elements 81 have a width of 0.5952 to 0.9905 micrometers. Alternatively, greater or smaller radiuses and/or widths are contemplated. In some embodiments, the height 62 of one or more of the elements 76, 77, 78 and 81 is 0.025 to 10 centimeters (or more). Alternatively, the height of one or more of the elements 76, 77, 78 and 81 is able to be higher or lower. In some embodiments, the height 63 of the slab 82 is able to be within the range of 1% to 25%, smaller or larger, of the heights of the elements 76, 77, 78 and 81. Alternatively, the height 63 of the slab 82 is able to be higher or lower. In some embodiments, each of the second electrodes 80 comprise between 1,680 to 1,000 partial rims 81 per square millimeter of the module 60 and/or each of the first electrodes 70 comprise between 1,680 to 1,000 rims 78 per square millimeter of the module 60. Alternatively, more or less partial rims 81 and/or rims 78 per square millimeter of the module 60 are contemplated.

FIG. 46 illustrates a partial plan view of the circular area 46 illustrated in FIG. 45 according to some embodiments. FIG. 47 illustrates a cross section view of the circular portion 46 shown in FIG. 45 at the line 47 according to some embodiments. As shown in FIGS. 46 and 47, the electrically insulating film 90 (including a giant-colossal dielectric material) is positioned between the first electrode 70 and the second electrode 80 in order to electrically insulate the first electrode 70 from the second electrode 80.

FIG. 50 illustrates a plan or top view and FIGS. 55A and 55B illustrate an elevation or side view of one layer of modules 60 forming a triangular shape according to some embodiments. The module of FIGS. 50, 55A and 55B is able to be substantially similar to the modules 60 of FIGS. 1 and 15 except for the differences described herein. Although, FIGS. 50, 55A and 55B illustrate male terminals 72, 83 for each module 60, female terminals 74, 85 are able to be used.

FIG. 51 illustrates a plan or top view of a portion 51 shown in FIG. 50 according to some embodiments. In particular, like the areas 61 shown in FIGS. 7-9 and portions 22, 29, 36, 45, the portion 51 is able to comprise a set of elements illustrated in FIG. 51 wherein the surface of the electrode module 60 of FIG. 50 is able to comprise a plurality of portions 51 in a grid, array or other symmetric or asymmetric formation. These portions 51 and the elements therein increase the overlapping surface area between the two electrodes 70, 80. In some embodiments, the portions 51 are able to be one square millimeter areas. Alternatively, the portions 51 are able to be larger or smaller sized squares or other shapes (e.g. circles, triangles, or other symmetrical and/or asymmetrical shapes as known in the art), wherein in any case the portions 51 are able to each include one set of the overlapping surface area increasing elements.

FIGS. 54A-54C illustrate an enlarged elevation or cross-sectional view at the line 54A of FIG. 51 according to some embodiments. As shown in FIGS. 51 and 54A-54C, each of the portions 51 of the module 60 are able to comprise one or more partial rim elements 81 of the second electrode 80 protruding from the slab portion 82 to the surface through gaps in the first electrode 70, wherein the gaps are defined by a hub element 76 and one or more rim elements 78 electrically and physically coupled to the hub 76 via one or more spoke elements 77. As a result, each of the portions 51 is able to have a set of such elements that increase the overlapping surface area between the first and second electrodes 70, 80 via the added overlapping surface area between the partial rims 81 and the hub 76, spokes 77 and rims 78. Alternatively, as discussed above, the portions 51 are able to comprise different sets of elements having different shapes, sizes and/or locations that differently increase the overlapping surface area between the electrodes 70, 80. For example, although in FIGS. 51 and 54A-54C, the elements comprise five partial rims 81 (some partially not shown), four rims 78 (some partially not shown), a single hub 76 and one spoke 77, more or less of one, some or all of the above elements are contemplated. Also, the spokes 77 are able to be evenly, symmetrically, unevenly or asymmetrically distributed around the hub 76.

Additionally, as shown in FIGS. 54A-54C, the film 90 is not only between adjacent portions of the slab 82 and the first electrode 70, but also between the partial rim elements 81 and the first electrode 70 including the hubs 76, the spokes 77 and the rims 78. Indeed, as described above, in some embodiments the film 90 covers the entire surface of both the first electrode 70 and the second electrode 80. Alternatively, portions of the module 60 (e.g. the outer surface of the module 60) are able to be uncovered by the film 90. In some embodiments, the film or coating 90 is clear or translucent, 100 nanometers thick and made of the giant-colossal dielectric material of titanium oxide doped with 0.5 niobium and 0.5 aluminum. Alternatively, the film 90 is able to be thicker or thinner, non-translucent or opaque, and/or made of one or a combination of different giant-colossal dielectric or other electrically insulating materials. In some embodiments, the operating voltage is limited to a maximum of 34.37 volts. For example, the operating voltage is able to be based on the thickness of the film 90, wherein the maximum voltage decreases as the thickness of the film 90 decreases.

In some embodiments, the elements 76, 77, 78 and 81 are sized such that they have a high aspect ratio of height to width (or radius). For example, in some embodiments the spoke elements 77, the rim element 78 and/or the partial rim elements 81 have a height to width ratio of 100 (or greater) to 1 and/or the hub 76 has a height to radius ratio of 50 (or greater) to 1 such that they are at least one hundred or fifty times taller than they are wide. Alternatively, one or more of the elements 76, 77, 78 and/or 81 are able to have lower height to width/radius ratios (e.g. 25 to 1 or greater or 10 to 1 or greater). Indeed, all these high aspect ratios are beneficial because they increase overlapping surface area between the two electrodes 70, 80. In some embodiments, the hub element 76 has a radius of 0.1976 to 0.3952 micrometers (or 4× 0.1976 to 4×0.3952 micrometers), the spoke elements 77 have a width of 0.1976 to 0.3952 micrometers, the rim elements 78 have a width of 0.1976 to 0.3952 micrometers, and the partial rim elements 81 have a width of 0.1976 to 0.3952 micrometers. Alternatively, greater or smaller radiuses and/or widths are contemplated. In some embodiments, the height 62 of one or more of the elements 76, 77, 78 and 81 is 0.025 to 10 centimeters (or more). Alternatively, the height of one or more of the elements 76, 77, 78 and 81 is able to be higher or lower. In some embodiments, the height 63 of the slab 82 is able to be within the range of 1% to 25%, smaller or larger, of the heights of the elements 76, 77, 78 and 81. Alternatively, the height 63 of the slab 82 is able to be higher or lower. In some embodiments, each of the second electrodes 80 comprise between 5,060 to 2,531 partial rims 81 per square millimeter of the module 60 and/or each of the first electrodes 70 comprise between 5,060 to 2,531 rims 78 per square millimeter of the module 60. Alternatively, more or less partial rims 81 and/or rims 78 per square millimeter of the module 60 are contemplated.

FIG. 52 illustrates a partial plan view of the circular area 52 illustrated in FIG. 51 according to some embodiments. FIG. 53 illustrates a cross section view of the circular portion 52 shown in FIG. 51 at the line 53 according to some embodiments. As shown in FIGS. 52 and 53, the electrically insulating film 90 (including a giant-colossal dielectric material) is positioned between the first electrode 70 and the second electrode 80 in order to electrically insulate the first electrode 70 from the second electrode 80.

FIG. 71 illustrates a plan or top view of a module 60 of the layer of FIG. 33 according to some embodiments. FIGS. 72A-D illustrate a cross-sectional view at the line 117 of FIG. 71 according to some embodiments. FIG. 73 illustrates a cross-sectional view at the line 118 of FIG. 72C according to some embodiments. As shown in FIGS. 72A-D and 73, the module 60 is able to comprise one or more triangle peg elements 81"" of the second electrode 80 protruding from the slab portion 82 into triangle apertures 71"" of the first electrode 70 with the film 90 in between the two. Alternatively, as discussed above, differently shaped, numbered, positioned and/or sized sets of elements 81"" and correspondingly sized apertures 71"" are able to be used. For example, although in FIGS. 68A-D and 69, the elements comprise sixteen triangle peg elements 81"" and sixteen apertures 71"" (within a square 1000 micrometer×1000 micrometer area), more or less of one, some or all of the above elements are contemplated. Also, the pegs/apertures 81"",71"" are able to be evenly, symmetrically, unevenly or asymmetrically distributed. Further, similar to the elements 71''', 81''', described above, the elements 71"", 81"" are able to be sized such that they have a high aspect ratio of height to width (e.g. 100 to 1).

FIGS. 74A-D illustrate an enlarged view of the area 119 in FIG. 73 according to some embodiments. As shown in FIGS. 72A-D, 73 and 74A-D, the electrically insulating film 90 (including a giant-colossal dielectric material) is positioned between the first electrode 70 and the second electrode 80 (including between the protrusions 71"" and the apertures 81"") in order to electrically insulate the first electrode 70 from the second electrode 80. Further, the film 90 comprises a giant-colossal dielectric material 95 sandwiched between a layer of low leakage dielectric material 92 and a layer of high break down dielectric material 94. In some embodiments, the film 90 is able to be 100 to 900 or 800 to 1200 nanometers in thickness. Alternatively, the film 90 is able to be thicker or thinner. The film 90 is able to have a high permittivity constant of 50,000 to 1,000,000 or more and a high breakdown element (e.g. 94) of 0.5 to 2 volts per nanometer of thickness or more, as well as a low electronic leakage element (e.g. 92) of 0.5 percent or less with a low probability of electronic tunneling.

The low leakage dielectric material 92 is able to be a single material solid solution and/or a super lattice of alternating materials. In some embodiments, the layer 92 has a thickness of 10 to 300 nanometers. Alternatively, the layer 92 is able to be thicker or thinner. The high break down dielectric material 94 is able to be a single material element (e.g. $TiO_2$) and/or a super lattice of dielectric materials. In some embodiments, the layer 94 has a thickness of 10 to 300 nanometers. Alternatively, the layer 94 is able to be thicker or thinner. The giant-colossal dielectric material 95 is able to be a single material element and/or a super lattice of giant-colossal dielectric materials. In some embodiments, the layer 95 has a thickness of 50 to 300 or 10 to 300 nanometers. Alternatively, the layer 95 is able to be thicker or thinner. Although the film 90 having multiple layers 92, 94, 95 is described in reference to FIGS. 74A-D, the film 90 is able to have a similar structure in the other embodiments described herein.

FIG. 75 illustrates a plan or top view of a module 60 of the layer of FIG. 33 according to some embodiments. FIGS. 76A-D illustrate a cross-sectional view at the line 120 of FIG. 75 according to some embodiments. FIG. 77 illustrates a cross-sectional view at the line 121 of FIG. 76C according to some embodiments. As shown in FIGS. 76A-D and 77, the module 60 is able to comprise one or more hexagonal peg elements 81""' of the second electrode 80 protruding from the slab portion 82 into hexagonal apertures 71""' of the first electrode 70 with the film 90 in between the two. Alternatively, as discussed above, differently shaped, numbered, positioned and/or sized sets of elements 81'''' and correspondingly sized apertures 71'''' are able to be used. For example, although in FIGS. 76A-D and 77, the elements comprise eight full hexagonal peg elements 81'''' and eight full hexagonal apertures 71'''' (within a square 1000 micrometer×1000 micrometer area), more or less of one, some or all of the above elements are contemplated. Also, the pegs/apertures 81'''',71'''' are able to be evenly, symmetrically, unevenly or asymmetrically distributed. Further, similar to the elements 71'''', 81'''', described above, the elements 71'''', 81'''' are able to be sized such that they have a high aspect ratio of height to width (e.g. 100 to 1).

FIGS. 78A and 78B illustrate an enlarged view of the area 122 in FIG. 77 according to some embodiments. As shown in FIGS. 76A-D, 77, 78A and 78B, the electrically insulating film 90 (including a giant-colossal dielectric material) is positioned between the first electrode 70 and the second electrode 80 (including between the protrusions 71'''' and the apertures 81'''') in order to electrically insulate the first electrode 70 from the second electrode 80. In some embodiments, the film 90 is able to be 100 to 900 or 800 to 1200 nanometers in thickness. Alternatively, the film 90 is able to be thicker or thinner. The film 90 is able to have a high permittivity constant of 50,000 to 1,000,000 or more and a high breakdown element of 0.5 to 2 volts per nanometer of thickness or more, as well as a low electronic leakage element of 0.5 percent or less with a low probability of electronic tunneling. Although the film 90 is described in reference to FIGS. 78A and 78B, the film 90 is able to have a similar structure in the other embodiments described herein.

Figure 56:
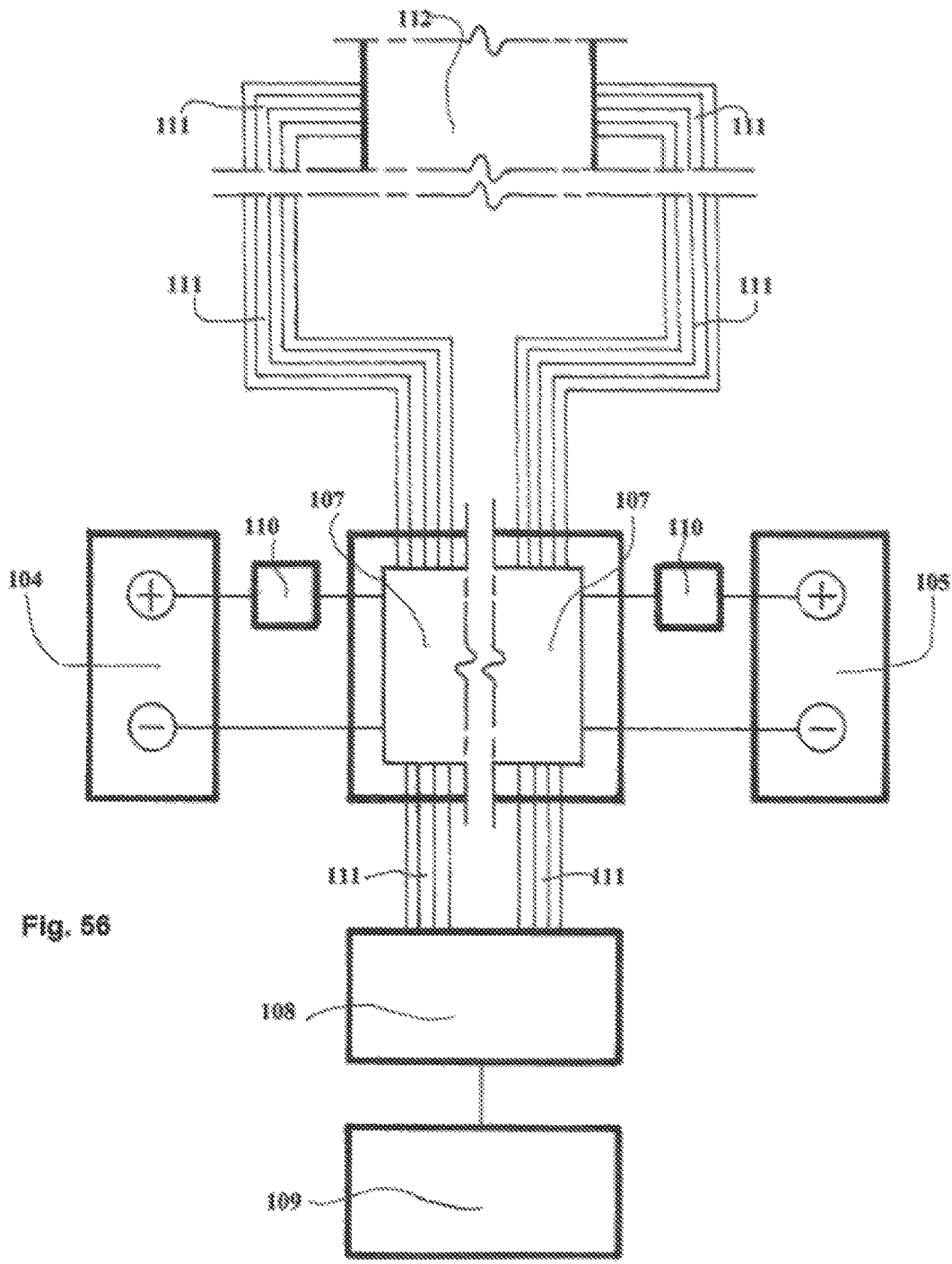
FIG. 56 illustrates a electrical schematic of the high energy capacitor control system according to some embodiments.

FIG. 56 illustrates a electrical schematic of a power system including a high energy capacitor module control system according to some embodiments. As shown in FIG. 56, the power system comprises a high energy density capacitor system 112 (e.g. systems of FIGS. 1-55) that is electrically coupled (via one or more wiring harnesses 111) with an electrical charging source 104, an electrical load 105 and a controller 108 via a high energy density capacitor module switching system 107, which is electrically coupled with an over voltage and over current circuit breaker 110. Specifically, switching system 107 is able to selectively electrically couple the changing source 104 and/or load 105 to one or more of the modules 60 of the system 112. In particular, the electrical coupling is able to couple one or more of the modules 60 of one or more system of the system 112 to the source 104 and/or load 105 in series and/or in parallel configurations. The controller 108 is able to be electrically and/or wirelessly coupled to a remote computer 109 (which is able to be coupled with one or more other networks (e.g. the Internet)). As a result, the controller 108 is able to control the switching and/or configuration of the coupling of the system 112 to one or more of the load 105 and/or charger 104 in order to receive energy to be stored in the modules 60 of the system 112 (from the charger 104) and/or output energy stored in the modules 60 of the system 112 (to the load 105 for powering the load 105).

Figure 57:
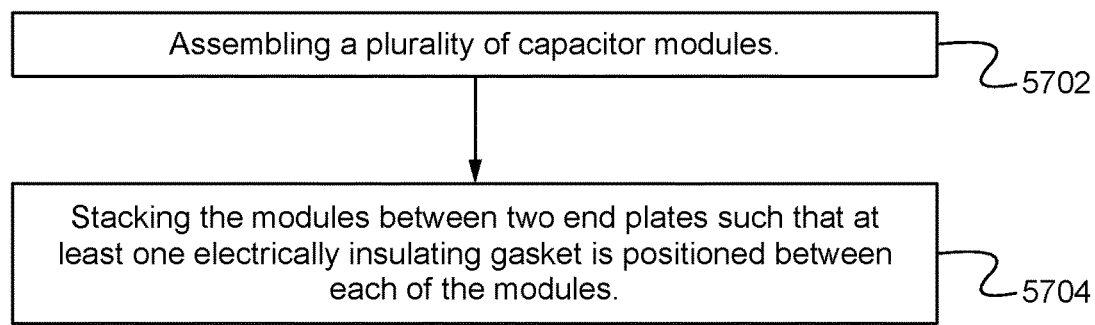
FIG. 57 illustrates a method of providing a high energy density capacitor system according to some embodiments.

FIG. 57 illustrates a method of providing a high energy density capacitor system according to some embodiments. As shown in FIG. 57, a plurality of capacitor modules 60 are assembled at the step S702. In some embodiments, the assembling of the capacitor modules 60 comprises coating an entirety of the first electrode 70, the second electrode 80 or both with the film 90 such that the film 90 covers the entirety of the first electrode 70, the second electrode 80 or both. In some embodiments, the assembling of the capacitor modules 60 comprises positioning the coating 90 in between some or all adjacent surfaces of the two electrodes 70, 80. In some embodiments, the assembling of the capacitor modules 60 comprises forming one or more protrusions (e.g. partial rims 81) of the second electrode 80 within gaps of the first electrode (e.g. formed by one or more hubs 76 surrounded by one or more rims 78 that are coupled to the hubs 76 via one or more spokes 77 extending from the hubs 76 through the rims 78). The modules 60 are then stacked between two end plates 100 such that at least one electrically insulating gasket 96 is positioned between each of the modules 60 at the step S704. In some embodiments, the stacking comprises coupling the end plates 100 together such that they forcibly hold the modules 60 and the gaskets 96 in place in between the end plates 100. In some embodiments, the method further comprises electrically coupling two or more of the capacitor modules 60 together in series, in parallel or both. For example, the modules 60 are able to be coupled together via corresponding male and female terminals and/or are able to be in the same layer, in different layers and/or in different stacks. Accordingly, the method provides the advantage of generating a high energy density energy storage system (e.g. capacitor system).

Electrical Property Calculations

Generally when calculating the high energy density capabilities Equation Five is used for first finding the capacitance of the high energy density capacitor as described herein. Calculating the capacitance is accomplished by adding together the areas of the overlapping areas of the first charged electrode hub elements and spoke elements and rim elements and the second charged electrode partial rims in square micrometers in each cubic millimeter. After having the total square micrometers in each cubic millimeter of electrically active area space per cubic millimeter and multiplying by the number of cubic millimeters in a liter which is one million. Then by converting this total number of square micrometers per liter of high energy density capacitor into square meters per liter we have the number of square meters in one liter of electrically active area and over lapping meters of each liter of high energy density capacitor. Then taking this number of square meters of electrically active and overlapping space in each liter and then dividing by the nanometer thickness of the single giant colossal dielectric material or compound giant-colossal dielectric material with or with out other thin film electrically insulating materials or with a complex giant-colossal dielectric material with out other thin film electrically insulating materials we have the ratio of square meters to dielectric thickness of the capacitance of the high energy density capacitor such as the high energy density capacitor system described herein.

Then taking this ratio product and by multiplying by the free space permittivity constant ($\varepsilon_0$_8.854×10$^{-12}$ F m$^{-1}$) and then taking this combined ratio product and free space permittivity product and multiplying it by the giant-colossal dielectric material constant (e.g. 300,000). This giant-colossal dielectric material constant has been measured at 10,000 up to 300,000 and projected to be as high or higher than 1,000,000 relative permittivity material constant of the giant-colossal dielectric material. The value of the product is the calculated capacitance of a one liter in volume of the high energy density capacitor. Second, and before using (Equation Six) for finding the energy density capacity, the operational voltage must be specified. This specified operating voltage is able to be engineered to match the dielectric breakdown voltage of the giant-colossal dielectric material with a large enough safety factor to prevent failure of the dielectric material caused by intrinsic internal stresses and by external stresses of the normal operation of the high energy density capacitor system.

Generally using two times to four times the dielectric breakdown voltage of the giant-colossal dielectric material will function for a long life cycle for the high energy density capacitor system. Then placing the product of the capacitance (Equation Five) into the energy density (Equation Six) and specifying a safe operating voltage gives the energy density in joules which is equivalent to watts per second capacity. Then converting the watts per second into watts per hour by dividing by 3600 and then dividing this product by 1000 gives the high energy density capacity in kilowatt per hour of the high energy density capacitor system. This product is the calculated capacitance of one liter in volume of the high energy density capacitor. The mathematical calculations evaluating the capacitance capacities and the high energy densities capacities are using circular hub elements, spoke elements (e.g. circular spoke elements) and circular rim elements of a each cubic millimeter and then adding together a whole liter of one million cubic millimeters. Other volumes of a cubic electrically active area micrometer structures may be calculated using these methods with other shapes and volumes of the two charged electrodes with other shapes, volumes and thicknesses of giant-colossal dielectric materials. Other thin film nanometer geometrical elements and volumes are possible to use in the high energy density capacitor system described herein. The mathematical calculations of the four examples herein are using a 300,000 giant-colossal electrical permittivity material constant for the capacitance calculations, and also herein using the dielectric breakdown voltage of 0.75 volts per nanometer of colossal-giant dielectric thickness. A safe operating voltage thickness over two times the titanium oxide dielectric breakdown voltage value per nanometer is able to be used for the value of the 800 nanometers thin film giant-colossal dielectric element material 90 for all the capacitance and energy density calculations.

Example One of the High Energy Density Capacitor Calculation

The energy density calculation for the example uses a single cubic millimeter of electrical capacitor active area and then adds together the cubic millimeters contained in one liter. The cubic millimeter is used as the calculated cubic space for the first charged electrode 70. The first charged electrode 70 comprises a singular circular hub element 76 (of radius of 49.6 micrometers and 1000 micrometers in height), four straight spoke elements 77 (of a width of 99.2 micrometers and a height of 1000 micrometers) and ten circular rim elements 78 (of 99.2 micrometers in width and 1000 micrometers in height). The giant-colossal dielectric element material 90 of electrically insulating material is 800 nanometers thick, in contact with and fully encasing the first charged electrode elements 70 on one side. Further, the giant-colossal dielectric element material 90 of electrically insulating material is in contact with the second charged electrode 80 (which comprises partial rim elements 81 of a width of 100 micrometers and of a height of 1000 micrometers) on the opposite side as the first electrode elements 70, such that they all together filling all the cubic space of the whole cubic millimeter with the overlapping electrode spaces, which is calculated to be $(3.45 \times 10^7)$ square micrometers per cubic millimeter. Converting this value into square meters per liter results in 34.5 square meters for the area of overlapping electrode active area in one liter. Finally, the material constant for the giant-colossal dielectric element 90 used in this and all four examples is 300,000.

Using these values the capacitance is able to be calculated using Equation Five as follows:

$$C = \varepsilon_r \varepsilon_0 (A/d) \Rightarrow C = (8.854 \times 10^{-12})*(300,000)*(34.5\ m^2/L)/(8.00 \times 10^{-7}\ m) = 114.68\ \text{capacitance in Farad/Liter.}$$

Using these values and 275V as the operating voltage, the energy density is able to be calculated using Equation Six as follows:

$$W_{stored} = 0.5\ CV^2 = 0.5\ \varepsilon_r \varepsilon_0 (A/d) V^2 = (0.5)*(114.68)*(275^2) = 4.34 \times 10^6\ \text{joules} = 1.2 \times 10^3\ \text{watt/hours} = 1.20\ \text{Kilowatt/hours per liter.}$$

Example Two of the High Energy Density Capacitor Calculation

The energy density calculation for the example uses a single cubic millimeter of electrical capacitor active area and then adds together the cubic millimeters contained in one liter. The cubic millimeter is used as the calculated cubic space for the first charged electrode 70. The first charged electrode 70 comprises a singular circular hub element 76 (of radius 24.8 micrometers and 1000 micrometers in height), eight straight spoke elements 77 (of a width of 49.2 micrometers and a height of 1000 micrometers), nineteen circular rim elements 78 (of 49.2 micrometers in width and 1000 micrometers in height). The giant-colossal dielectric element material 90 of electrically insulating material is 800 nanometers thick, in contact with and fully encasing the first charged electrode elements 70 on one side. Further, the giant-colossal dielectric element material 90 of electrically insulating material is in contact with the second charged electrode 80 (which comprises partial rim elements 81 of a width of 50 micrometers and a height of 1000 micrometers) on the opposite side as the first electrode element 70, such that they all together fill all the cubic space of the whole cubic millimeter with overlapping electrode spaces, which is calculated to be $(5.96 \times 10^7)$ square micrometers per cubic millimeter. Converting this product into square meters per liter is 59.59 square meters for the area of overlapping electrode active area in one liter. The material constant for the giant-colossal dielectric element material 90 used in this example is 300,000.

Using these values the capacitance is able to be calculated using Equation Five as follows:

$$C = \varepsilon_r \varepsilon_0 (A/d) \Rightarrow C = (8.854 \times 10^{-12})*(300,000)*(59.5\ m^2/L)/(8.00 \times 10^{-7}\ m) = 197.77\ \text{capacitance in Farad/Liter.}$$

Using these values and 275V as the operating voltage, the energy density is able to be calculated using Equation Six as follows:

$$W_{stored} = 0.5\ CV^2 = 0.5\ \varepsilon_r \varepsilon_0 (A/d) V^2 = (0.5)*(197.77)*(275^2) = 7.48 \times 10^6\ \text{joules} = 2.08 \times 10^3\ \text{watt/hours} = 2.08\ \text{Kilowatt/hours per liter.}$$

Example Three of the High Energy Density Capacitor Calculation

The energy density calculation for the example uses a single cubic millimeter of electrical capacitor active area and then adds together the cubic millimeters contained in one liter. The cubic millimeter is used as the calculated cubic space for the first charged electrode 70. The first charged electrode 70 comprises a singular circular hub element 76 (of radius of 12.1 micrometers and 1000 micrometers in height), twelve straight spoke elements 77 (of a width of 24.2 micrometers and height of 1000 micrometers), thirty-eight circular rim elements 78 (of 24.2 micrometers in width and 1000 micrometers in height). The giant-colossal dielectric element material 90 of electrically insulating material is 800 nanometers thick, in contact with and fully encasing the first charged electrode elements 70 on one side. Further, the giant-colossal dielectric element material 90 of electrically insulating material is in contact with the second charged electrode 80 (which comprises partial rim elements of a width of 25 micrometers and a height of 1000 micrometers) on the opposite side as the first electrode element 70, such that they all together fill all the cubic space of the whole cubic millimeter with overlapping electrode spaces, which is calculated to be ($1.11 \times 10^8$) square micrometers per cubic millimeter. Converting this product into square meters per liter is 110.5 square meters for the area of overlapping electrode active area in one liter. The material constant for the giant-colossal dielectric element material 90 used in this example is 300,000.

Using these values the capacitance is able to be calculated using Equation Five as follows:

$$C = \varepsilon_r \varepsilon_0 (A/d) \Rightarrow C = (8.854 \times 10^{-12}) * (300,000) * (110.5 \text{ m}^2/\text{L})/(8.00 \times 10^{-7} \text{ m}) = 408.69 \text{ capacitance in Farad/Liter.}$$

Using these values and 275V as the operating voltage, the energy density is able to be calculated using Equation Six as follows:

$$W_{stored} = 0.5 \, CV^2 = 0.5 \, \varepsilon_r \varepsilon_0 (A/d) V^2 = (0.5) * (408.69) * (275^2) = 1.55 \times 10^7 \text{ joules} = 4.29 \times 10^3 \text{ watt/hours} = 4.29 \text{ Kilowatt/hours per liter.}$$

Example Four of the High Energy Density Capacitor Calculation

The energy density calculation for the example uses a single cubic millimeter of electrical capacitor active area and then adds together the cubic millimeters contained in one liter. The cubic millimeter is used as the calculated cubic space for the first charged electrode 70. The first charged electrode 70 comprises a singular circular hub element 76 (of radius of 6.25 micrometers and 1000 micrometers in height), one straight spoke elements 77 (of a width of 11.7 micrometers and height of 1000 micrometers), seventy-five circular rim elements 78 (of 11.7 micrometers in width and 1000 micrometers in height). The giant-colossal dielectric element material 90 of electrically insulating material is 800 nanometers thick, in contact with and fully encasing the first charged electrode elements 70 on one side. Further, the giant-colossal dielectric element material 90 of electrically insulating material is in contact with the second charged electrode 80 (which comprises partial rim elements of a width of 12.5 micrometers and a height of 1000 micrometers) on the opposite side as the first electrode element 70, such that they all together fill all the cubic space of the whole cubic millimeter with overlapping electrode spaces, which is calculated to be ($2.21 \times 10^8$) square micrometers per cubic millimeter. Converting this product into square meters per liter is 221.2 square meters for the area of overlapping electrode active area in one liter. The material constant for the giant-colossal dielectric element material 90 used in this example is 300,000.

Using these values the capacitance is able to be calculated using Equation Five as follows:

$$C = \varepsilon_r \varepsilon_0 (A/d) \Rightarrow C = (8.854 \times 10^{-12}) * (300,000) * (221 \text{ m}^2/\text{L})/(8.00 \times 10^{-7} \text{ m}) = 734.05 \text{ capacitance in Farad/Liter.}$$

Using these values and 275V as the operating voltage, the energy density is able to be calculated using Equation Six as follows:

$$W_{stored} = 0.5 \, CV^2 = 0.5 \, \varepsilon_r \varepsilon_0 (A/d) V^2 = (0.5) * (734.05) * (275^2) = 2.78 \times 10^7 \text{ joules} = 7.71 \times 10^3 \text{ watt/hours} = 7.71 \text{ Kilowatt/hours per liter.}$$

The high energy density capacitor method, system and device described herein has numerous advantages. Specifically, it provides the advantage of providing a capacitor with the capability to store one or more kilowatt hours in a one liter volume weighing 5 to 7 kilograms and electric energy at a operating voltage of 30 to 300 volts that can also be charged in minutes and that also is able to have a long life cycle of more than five to ten years at a cost of under $500 per kilowatt hour by 2016 and under $250 per kilowatt by 2020. Specifically, the capacitor system, method and device provides the advantage of being able to store over 4 joules of electrical energy in one cubic millimeter and over four thousand joules of electrical energy in one cubic centimeter. For example, as shown by the example calculations above, the high energy density capacitor method, system and device described herein is able to provide the benefit of very high amounts of Kilowatt/hours per liter. Further, it provides the advantages of providing a high energy density capacitor with a electrical storage capacity two to four joules of electrical energy and more in each cubic millimeter, a capacity of one to seven kilowatt hours or more of electrical energy per liter in volume, weighing five to seven kilograms per liter, is solid state, exhibits intrinsically safe and robust electrical storage behaviors that can be mass produced with a retail sales price at or under $250 per kilowatt hour, has a life cycle of 5 to 10 years or longer, is recharged in one to fifteen minutes to a full recharge mode of operation from a fully discharged mode of operation, and increases electrode overlapping areas of micrometer and nanometer elements that can be improved with each successive generation of mass production manufacturing equipment to increase the electrical energy storage capacities.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications are able to be made in the embodiment chosen for illustration without departing from the spirit and scope of the invention. In some embodiments, the system is able to be used as stationary energy storage coupled to intermittent renewable solar energy generators and/or wind energy generators. In some embodiments, the system is able to be applied to the existing electrical grid for electrical energy storage and to uninterrupted electrical back up electrical energy storage systems. In some embodiments, the system is able to be electrical storage in mobile applications such as automobiles, trucks and other off the road mobile applications. In some embodiments, the system is able to be configured and controlled to mimic existing primary and secondary batteries. In some embodiments, the system is able to be practiced at a voltage as low as 1 to 12 volts and lower and higher than the above examples of 275 voltages. Operating voltages various current densities can be specified in between 12 volt to the 275 volts and at any current densities that an application would specify.

Further, the descriptions and examples given in the disclosure of this invention are for example purposes and used to describe the present invention. Once given the above disclosure other features, modifications and improvements will become apparent to the skilled artisan. Such other features modifications and improvements are therefore considered to be part of this invention, the scope of which is to be determined by the claims contained herein. For example, the portions/areas shown in FIGS. 9, 22, 29, 36, 40, 45 and 51 are able to be repeated and/or positioned adjacent to each other to form mirrored or tiled sections of the surface of any of the modules 60 described herein. Further, although each of the layers and/or systems of modules 60 each are shown as having all male terminals or all female terminals, modules 60 in a single layer and/or two or more of the layers are able to have different terminal "genders". For example, a portion of the modules 60 of a layer are able to have female terminals while the remainder have male terminals and/or one or more of the layers of a system are able to have male terminals or a combination of male and female terminals whereas the remainder of the layers have female terminals or a combination of male and female terminals.

Additionally, although the component shapes, widths/radiuses and/or heights, the film thicknesses/structure, the module shapes and/or types of terminals (male or female) may be described in relation to a single embodiment, it is contemplated that one or all of those aspects of the single embodiment are able to be used in addition to or in lieu of those aspects in one or more of the other embodiments described herein. Moreover, although throughout the calculation examples the first charged electrode 70 and the second charged electrode 80 and the giant-colossal dielectric material 90 has been specified as a 100 to 800 nanometer thickness with a breakdown voltage of 0.75 volts per nanometer of (e.g. $TiO_2$) dielectric thickness and a 300,000 giant-colossal dielectric material constant, the system or module 60 is able to comprise any giant-colossal dielectric thickness (e.g. wherein the specified thickness is matched to the specified operating voltage so that the intrinsic internal stresses propagated through the material used for the fabrication of the high energy density capacitor are within safety specifications of operating voltage). The entire disclosures of all references cited in this specification are hereby incorporated by reference in their entirety.

What is claimed is:

1. A high energy density capacitor system, the system comprising:
    a plurality of capacitor modules each including:
        a first electrode having a first electrical terminal, first protrusions with a height to width ratio of at least 100 to 1, and a first electrically conductive bus bar that electrically and physically couples each of the first protrusion together and to the first electrical terminal;
        a second electrode adjacent to the first electrode; and
        a non-conductive film comprising a giant-colossal dielectric material positioned between the first electrode and the second electrode such that the first electrode and the second electrode are not electrically coupled to each other.

2. The system of claim 1, wherein the first electrode comprises a first slab and the first protrusions are a plurality of first concentric rings that protrude from a bottom of the first slab, and the second electrode comprises a second slab, a second electrical terminal, second protrusions with a height to width ratio of at least 100 to 1, and a second electrically conductive bus bar that electrically and physically couples each of the second protrusion together and to the second electrical terminal, wherein the second protrusions are a plurality of second concentric rings that protrude from a top of the second slab.

3. The system of claim 2, wherein the plurality of first concentric rings and second concentric rings are configured to interlock when the bottom of the first electrode is positioned on the top of the second electrode.

4. The system of claim 3, wherein one or more of the capacitor modules comprise one or more cooling channels that extend through both the first electrode and the second electrode.

5. The system of claim 1, wherein the second electrode comprises a plurality of cavities and the first electrode comprises a slab and the first protrusions extend from the slab and fill the cavities.

6. The system of claim 5, wherein a perimeter of each of the cavities and each of the protrusions are hexagonal.

7. The system of claim 5, wherein a perimeter of each of the cavities and each of the protrusions are square.

8. The system of claim 5, wherein a perimeter of each of the cavities and each of the protrusions are triangular.

9. The system of claim 5, wherein a perimeter of each of the cavities and each of the protrusions are circular.

10. The system of claim 5, wherein the non-conductive film comprises a low leakage dielectric layer and a high break down dielectric layer that sandwich a layer of the giant-colossal dielectric material between the first electrode and the second electrode.

11. The system of claim 10, wherein a breakdown value of the high break down dielectric layer is 0.5 to 2 volts per nanometer of thickness and electronic leakage value of the low leakage dielectric layer is less than or equal to 0.5 percent.

12. The system of claim 10, wherein the giant-colossal dielectric material is comprised of compound dielectric material of two or more dielectric materials.

13. The system of claim 10, wherein the giant-colossal dielectric material is comprised of complex dielectric material of two or more dielectric materials.

14. The system of claim 1, wherein two or more of the capacitor modules are electrically coupled together in series, in parallel or both.

15. A high energy density capacitor, the capacitor comprising:
    a first electrode having a first electrical terminal, first protrusions with a height to width ratio of at least 100 to 1, and a first electrically conductive bus bar that electrically and physically couples each of the first protrusion together and to the first electrical terminal;
    a second electrode adjacent to the first electrode; and
    a non-conductive film comprising a giant-colossal dielectric material positioned between the first electrode and the second electrode such that the first electrode and the second electrode are not electrically coupled to each other.

16. The capacitor of claim 15, wherein the first electrode comprises a first slab and the first protrusions are a plurality of first concentric rings that protrude from a bottom of the first slab, and the second electrode comprises a second slab, a second electrical terminal, second protrusions with a height to width ratio of at least 100 to 1, and a second electrically conductive bus bar that electrically and physically couples each of the second protrusion together and to the second electrical terminal, wherein the second protrusions are a plurality of second concentric rings that protrude from a top of the second slab.

17. The capacitor of claim 16, wherein the plurality of first concentric rings and second concentric rings are configured to interlock when the bottom of the first electrode is positioned on the top of the second electrode.

18. The capacitor of claim 17, further comprising one or more cooling channels that extend through both the first electrode and the second electrode.

19. The capacitor of claim 15, wherein the second electrode comprises a plurality of cavities and the first electrode comprises a slab and the first protrusions extend from the slab and fill the cavities.

20. The capacitor of claim 19, wherein a perimeter of each of the cavities and each of the protrusions are hexagonal.

21. The capacitor of claim 19, wherein a perimeter of each of the cavities and each of the protrusions are square.

22. The capacitor of claim 19, wherein a perimeter of each of the cavities and each of the protrusions are triangular.

23. The capacitor of claim 19, wherein a perimeter of each of the cavities and each of the protrusions are circular.

24. The capacitor of claim 19, wherein the non-conductive film comprises a low leakage dielectric layer and a high break down dielectric layer that sandwich a layer of the giant-colossal dielectric material between the first electrode and the second electrode.

25. The capacitor of claim 24, wherein a breakdown value of the high break down dielectric layer is 0.5 to 2 volts per nanometer of thickness and electronic leakage value of the low leakage dielectric layer is less than or equal to 0.5 percent.

26. The capacitor of claim 24, wherein the giant-colossal dielectric material is comprised of compound dielectric material of two or more dielectric materials.

27. The capacitor of claim 24, wherein the giant-colossal dielectric material is comprised of complex dielectric material of two or more dielectric materials.

* * * * *